(12) United States Patent
Sugar

(10) Patent No.: US 7,835,319 B2
(45) Date of Patent: Nov. 16, 2010

(54) SYSTEM AND METHOD FOR IDENTIFYING WIRELESS DEVICES USING PULSE FINGERPRINTING AND SEQUENCE ANALYSIS

(75) Inventor: Gary L. Sugar, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 753 days.

(21) Appl. No.: 11/746,275

(22) Filed: May 9, 2007

(65) Prior Publication Data

US 2007/0264939 A1 Nov. 15, 2007

Related U.S. Application Data

(60) Provisional application No. 60/798,715, filed on May 9, 2006, provisional application No. 60/798,714, filed on May 9, 2006, provisional application No. 60/798,716, filed on May 9, 2006, provisional application No. 60/800,442, filed on May 16, 2006.

(51) Int. Cl.
*H04W 4/00* (2009.01)
(52) U.S. Cl. ............... 370/328; 455/462; 455/226.1; 455/67.11; 455/296
(58) Field of Classification Search ........... 455/462, 455/226.1, 67.11, 296
See application file for complete search history.

(56) References Cited

U.S. PATENT DOCUMENTS

| | | | |
|---|---|---|---|
| 3,609,553 | A | 9/1971 | Frazier et al. |
| 3,812,291 | A | 5/1974 | Brodes et al. |

(Continued)

FOREIGN PATENT DOCUMENTS

CA 2260336 8/2000

(Continued)

OTHER PUBLICATIONS

PCT International Search Report and Written Opinion in counterpart International Application No. PCT/US07/68569, dated Apr. 2, 2008.

(Continued)

*Primary Examiner*—Charles N Appiah
*Assistant Examiner*—Kwasi Karikari
(74) *Attorney, Agent, or Firm*—Edell, Shapiro & Finnan, LLC

(57) ABSTRACT

Methods are provided for identifying devices that are sources of wireless signals from received radio frequency (RF) energy. RF energy is received at a device called a sensor device herein. Pulse metric data is generated from the received RF energy. The pulse metric data represents characteristics associated with pulses of received RF energy. The pulses are partitioned into groups based on their pulse metric data such that a group comprises pulses having similarities for at least one item of pulse metric data. Sources of the wireless signals are identified based on the partitioning process. The partitioning process involves iteratively subdividing each group into subgroups until all resulting subgroups contain pulses determined to be from a single source. At each iteration, subdividing is performed based on different pulse metric data than at a prior iteration. Ultimately, output data is generated (e.g., a device name for display) that identifies a source of wireless signals for any subgroup that is determined to contain pulses from a single source.

72 Claims, 53 Drawing Sheets

U.S. PATENT DOCUMENTS

| | | | |
|---|---|---|---|
| 3,992,666 A | 11/1976 | Edwards et al. | |
| 4,054,785 A | 10/1977 | Lehmann | |
| 4,084,245 A | 4/1978 | Bunge | |
| 4,166,980 A | 9/1979 | Apostolos et al. | |
| 4,227,255 A | 10/1980 | Carrick et al. | |
| 4,271,523 A | 6/1981 | Gable | |
| 4,336,541 A | 6/1982 | Tsui et al. | |
| 4,501,020 A | 2/1985 | Wakeman | |
| 4,597,107 A | 6/1986 | Ready et al. | |
| 4,818,949 A | 4/1989 | Cohen | |
| 4,839,582 A | 6/1989 | Fukaya et al. | |
| 4,845,707 A | 7/1989 | Isaacson et al. | |
| 4,947,338 A | 8/1990 | Vistica | |
| 4,950,999 A | 8/1990 | Agnello et al. | |
| 4,965,759 A | 10/1990 | Uchida et al. | |
| 4,979,211 A | 12/1990 | Benvenuto et al. | |
| 5,005,210 A | 4/1991 | Ferrell | |
| 5,048,015 A * | 9/1991 | Zilberfarb | 370/312 |
| 5,144,642 A | 9/1992 | Weinberg et al. | |
| 5,210,820 A | 5/1993 | Kenyon | |
| 5,230,087 A | 7/1993 | Meyer et al. | |
| 5,271,036 A | 12/1993 | Lobert et al. | |
| 5,303,262 A | 4/1994 | Johnson | |
| 5,323,337 A | 6/1994 | Wilson et al. | |
| 5,353,346 A | 10/1994 | Cox et al. | |
| 5,432,862 A | 7/1995 | Hirsch | |
| 5,436,556 A | 7/1995 | Komninos | |
| 5,565,764 A | 10/1996 | Priebe et al. | |
| 5,574,979 A | 11/1996 | West | |
| 5,608,727 A | 3/1997 | Perreault et al. | |
| 5,651,030 A | 7/1997 | Wong et al. | |
| 5,687,163 A | 11/1997 | Fox et al. | |
| 5,697,078 A | 12/1997 | Peterson et al. | |
| 5,706,202 A | 1/1998 | Itahara et al. | |
| 5,745,777 A | 4/1998 | English et al. | |
| 5,808,463 A | 9/1998 | Nagano | |
| 5,832,038 A | 11/1998 | Carsello | |
| 5,905,949 A | 5/1999 | Hawkes et al. | |
| 5,912,922 A | 6/1999 | Koszarsky et al. | |
| 5,956,638 A | 9/1999 | Chang et al. | |
| 6,084,919 A | 7/2000 | Kleider et al. | |
| 6,105,015 A | 8/2000 | Nguyen et al. | |
| 6,130,907 A | 10/2000 | Chen | |
| 6,185,201 B1 | 2/2001 | Kiyanagi et al. | |
| 6,198,779 B1 | 3/2001 | Taubenheim et al. | |
| 6,226,508 B1 | 5/2001 | Takahashi et al. | |
| 6,226,537 B1 | 5/2001 | Namura et al. | |
| 6,226,680 B1 | 5/2001 | Boucher et al. | |
| 6,229,997 B1 | 5/2001 | Addy | |
| 6,229,998 B1 | 5/2001 | Hamdy et al. | |
| 6,233,529 B1 | 5/2001 | Nonaka | |
| 6,240,282 B1 | 5/2001 | Kleider et al. | |
| 6,240,372 B1 | 5/2001 | Gross et al. | |
| 6,263,031 B1 | 7/2001 | Beidas et al. | |
| 6,320,896 B1 | 11/2001 | Jovanovich et al. | |
| 6,349,198 B1 | 2/2002 | Carlson et al. | |
| 6,374,082 B1 | 4/2002 | Carlson | |
| 6,385,434 B1 | 5/2002 | Chiprun et al. | |
| 6,408,696 B1 | 6/2002 | Jong | |
| 6,463,294 B1 | 10/2002 | Holma et al. | |
| 6,466,614 B1 | 10/2002 | Smith | |
| 6,484,111 B1 | 11/2002 | Nara | |
| 6,509,728 B1 | 1/2003 | Uchino et al. | |
| 6,512,788 B1 | 1/2003 | Kuhn et al. | |
| 6,519,541 B1 | 2/2003 | Bitton | |
| 6,570,991 B1 | 5/2003 | Scheirer et al. | |
| 6,584,419 B1 | 6/2003 | Alexander | |
| 6,629,151 B1 | 9/2003 | Bahl | |
| 6,690,746 B1 | 2/2004 | Sills et al. | |
| 6,697,013 B2 | 2/2004 | McFarland et al. | |
| 6,708,146 B1 | 3/2004 | Sewall et al. | |
| 6,714,605 B2 | 3/2004 | Sugar et al. | |
| 6,718,297 B1 | 4/2004 | Pride, III et al. | |
| 6,804,511 B1 | 10/2004 | Kakinuma | |
| 6,850,735 B2 | 2/2005 | Sugar et al. | |
| 6,907,229 B2 | 6/2005 | Shpak | |
| 6,978,145 B2 | 12/2005 | Takaba et al. | |
| 7,035,593 B2 | 4/2006 | Miller et al. | |
| 7,116,943 B2 | 10/2006 | Sugar et al. | |
| 7,158,769 B2 * | 1/2007 | Okanoue et al. | 455/226.1 |
| 7,171,161 B2 | 1/2007 | Miller | |
| 7,224,752 B2 | 5/2007 | Sugar et al. | |
| 2001/0019543 A1 | 9/2001 | Mueckenheim et al. | |
| 2001/0055952 A1 | 12/2001 | Ficarra | |
| 2002/0080951 A1 | 6/2002 | Tanrikulu | |
| 2002/0086641 A1 | 7/2002 | Howard | |
| 2002/0137485 A1 | 9/2002 | Nilsson et al. | |
| 2002/0142744 A1 | 10/2002 | Okanoue et al. | |
| 2002/0154614 A1 | 10/2002 | Jagger et al. | |
| 2002/0155811 A1 | 10/2002 | Prismantas et al. | |
| 2002/0173272 A1 | 11/2002 | Liang et al. | |
| 2002/0177446 A1 | 11/2002 | Bugeja et al. | |
| 2003/0040277 A1 | 2/2003 | Deats | |
| 2003/0050012 A1 | 3/2003 | Black et al. | |
| 2003/0050014 A1 | 3/2003 | Cain et al. | |
| 2003/0067662 A1 | 4/2003 | Brewer et al. | |
| 2003/0123420 A1 | 7/2003 | Sherlock | |
| 2003/0198200 A1 | 10/2003 | Diener et al. | |
| 2003/0198304 A1 | 10/2003 | Sugar et al. | |
| 2003/0224741 A1 | 12/2003 | Sugar et al. | |
| 2004/0023674 A1 * | 2/2004 | Miller | 455/462 |
| 2004/0028003 A1 | 2/2004 | Diener et al. | |
| 2004/0028123 A1 | 2/2004 | Sugar et al. | |
| 2004/0137915 A1 | 7/2004 | Diener et al. | |
| 2004/0219885 A1 | 11/2004 | Sugar et al. | |
| 2005/0002473 A1 | 1/2005 | Kloper et al. | |
| 2005/0032479 A1 | 2/2005 | Miller et al. | |
| 2005/0075863 A1 | 4/2005 | Jiang et al. | |
| 2005/0159109 A1 * | 7/2005 | Kivekas et al. | 455/67.11 |
| 2006/0038677 A1 | 2/2006 | Diener | |
| 2006/0084382 A1 | 4/2006 | Ibrahim et al. | |
| 2006/0182064 A1 * | 8/2006 | Durand et al. | 370/332 |
| 2007/0082647 A1 | 4/2007 | Behzad et al. | |

FOREIGN PATENT DOCUMENTS

| | | |
|---|---|---|
| CA | 2298316 | 7/2007 |
| JP | 2000022712 | 1/2000 |

OTHER PUBLICATIONS

Agilent Publication, "Agilent 89400 Series Vector Signal Analyzer Product Overview," 2000.

Agilent Publication, "Agilent Technologies: Power 2 G & 3G Solutions-Accelerating Progress," 2002.

Agilent Publication, "Agilent Technologies: Powerful Solutions to Complex Measurement Problems; Burst, Transient and Modulated Signal Analysis," 2000.

Agilent Publication, "Agilent PN 89400-8 Using Vector Modulation Analysis in the Integration, Troubleshooting and Design of Digtal Rf Communications Systems," 2000 (and earlier).

Agilent Publication, "Agilent PN 89400-10 Time-Capture Capabilities of the Agilent 89400 Series Vector Signal Analyzers," 2000 (and earlier).

Agilent Publication, "Agilent 89440a-1 Frequency and Time-Selective Power Measurements with the Agilent 89410a and 89440a," 2001 (and earlier).

Canadian Communications Research Center, "Spectrum Explorer Project of Canadian Communications Research Center," 1998 (and later).

Stanford Research Systems, "Stanford Research Systems SR785 Two Channel Dynamic Signal Analyzer," 1998.

Carlemalm, Catharina, "Suppression of Multiple Narrowband Interferers in a Spread-Spectrum Communication System," Aug. 2000, IEEE Journal on Selected Areas in Communications, Special Issue on Broadband Communications, vol. 18.

Lo, Victor Yeeman, "Enhanced Spectral Analysis Tool (SAT) for Radio Frequency Interference Analysis and Spectrum Management," Milcom, 1998.

Tektronix, "Real-Time Spectrum Analysis Tools Aid Transistion to Third-Generation Wireless Technology," 1999.

Patenaude, Francois et al., "Spectrum Surveillance: System Architecture," CRC-TN-97-001, Canadian Communications Research Centre, Apr. 15, 1997.

Mobilian Corporation, "WI-FI (802.11b) and Bluetooth: an Examination of Coexistence Approaches," Mobilian Corporation, 2001.

RSMS Publication, "Radio Spectrum Measurement System (RSMS Program-Functional Measurements," Jan. 29, 2001, 5 pages.

Schreyogg, Christoph et al., "Robust Classification of Modulation Types Using Spectral Features Applied to HMM," 1997, 5 pages.

Tektronix, "Validation Testing of Bluetooth Wireless LAN Systems," Tektronix Application Note, 2001.

Lallo, Pauli, "Signal Classification by Discrete Fourier Transform," Milcom Conference Proceedings, 1999.

Quint et al., "Emitter Detection and Tracking Algorithm for a Wide Band Multichannel Direction-Finding System in the HF Band," Milcom Conference Proceedings, 1999.

Dubuc et al., "An Automatic Modulation Recognition Algorithm for Spectrum Monitoring Applications," ICC, 1999, Jun. 19, 1999.

Shull et al., "Modulation Classification by Wavelet Decomposition Entropy Anlysis1," ASME Press, vol. 10, Nov. 15-20, 2000.

* cited by examiner

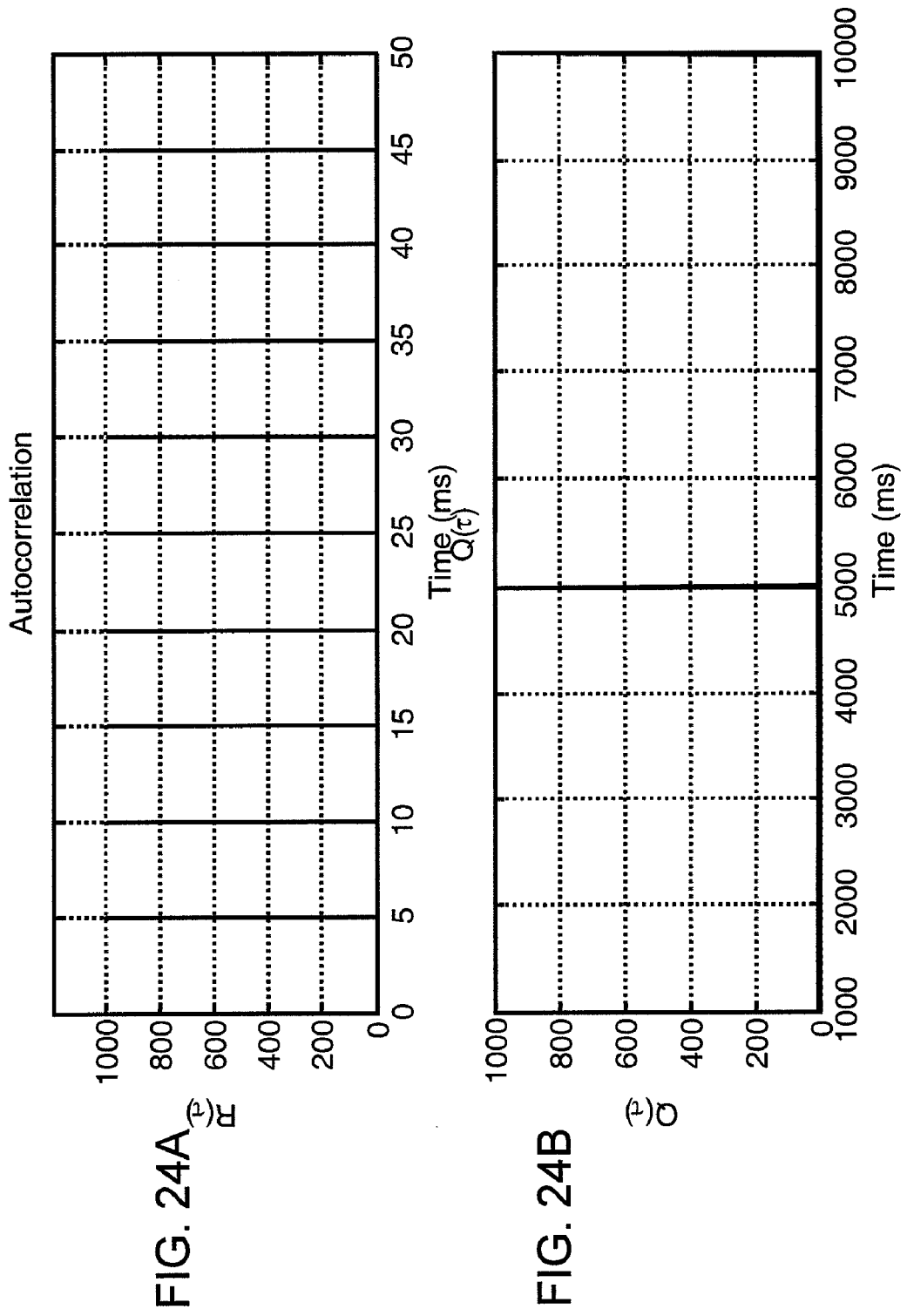

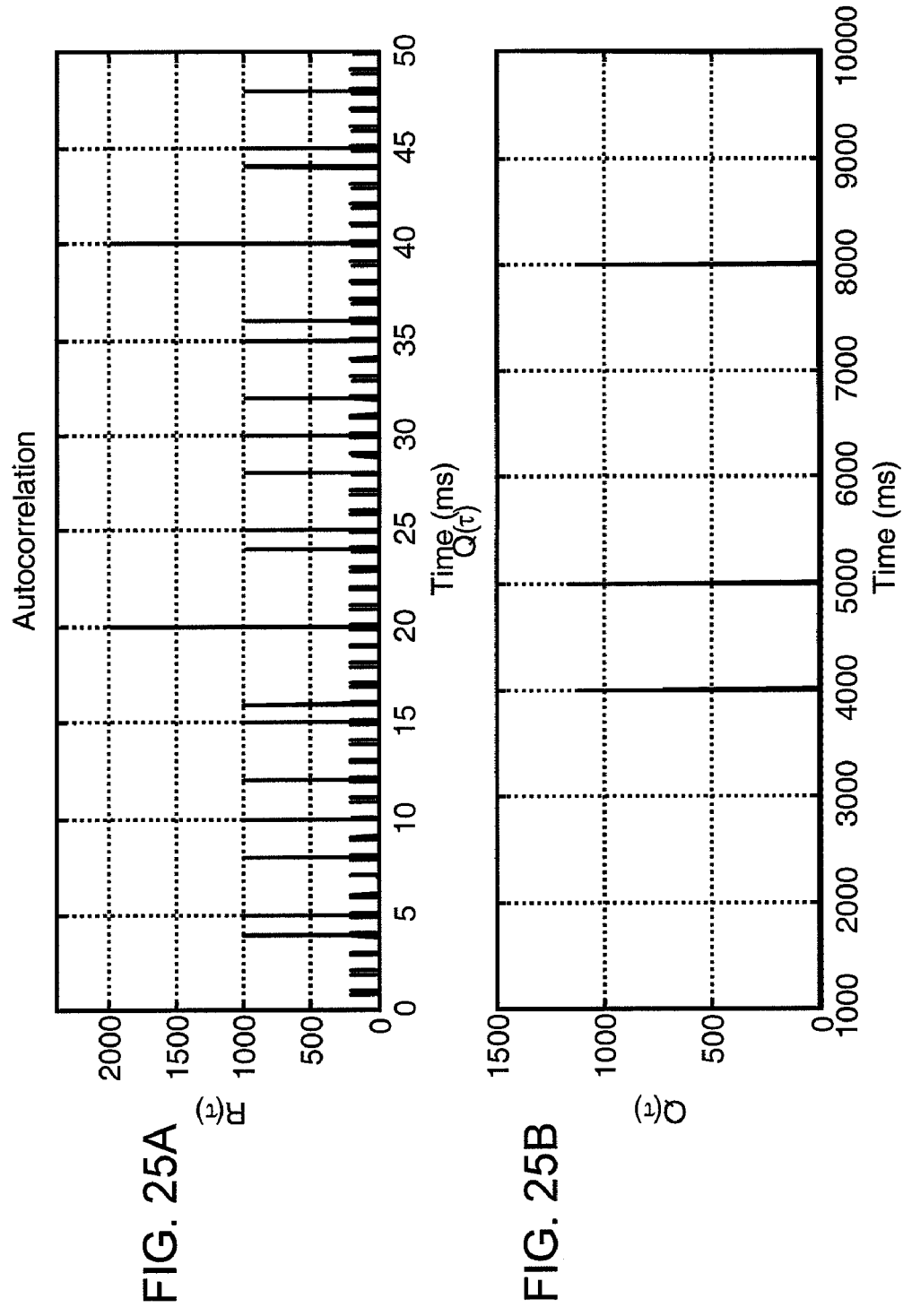

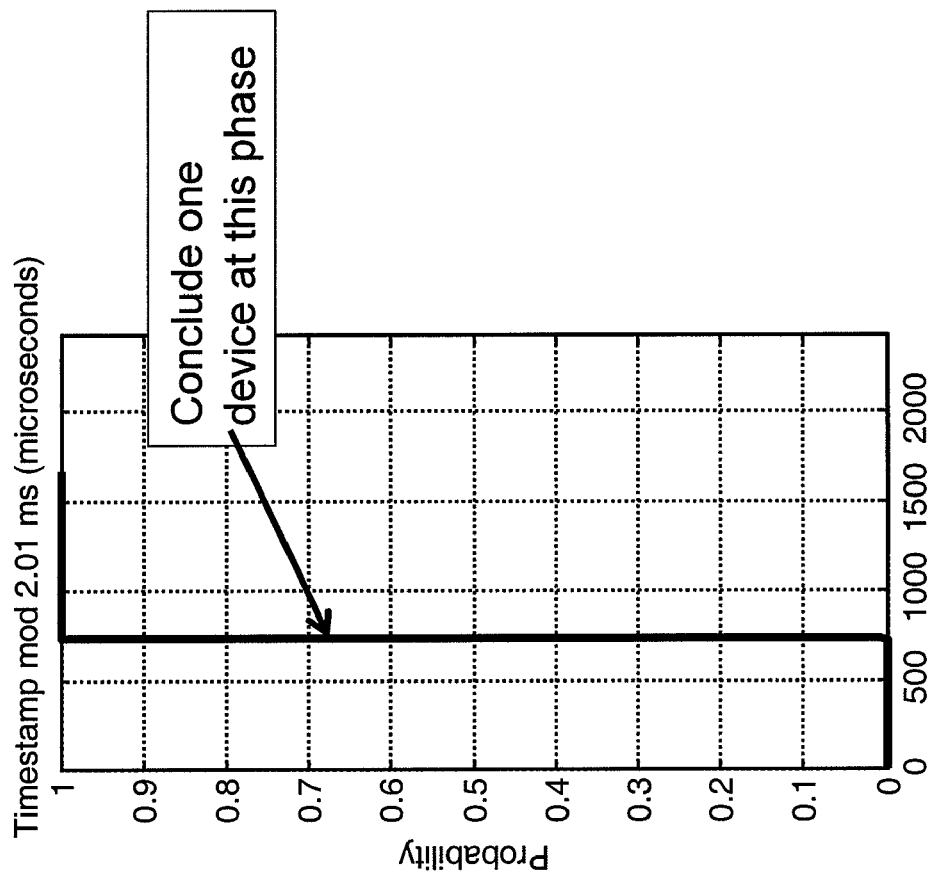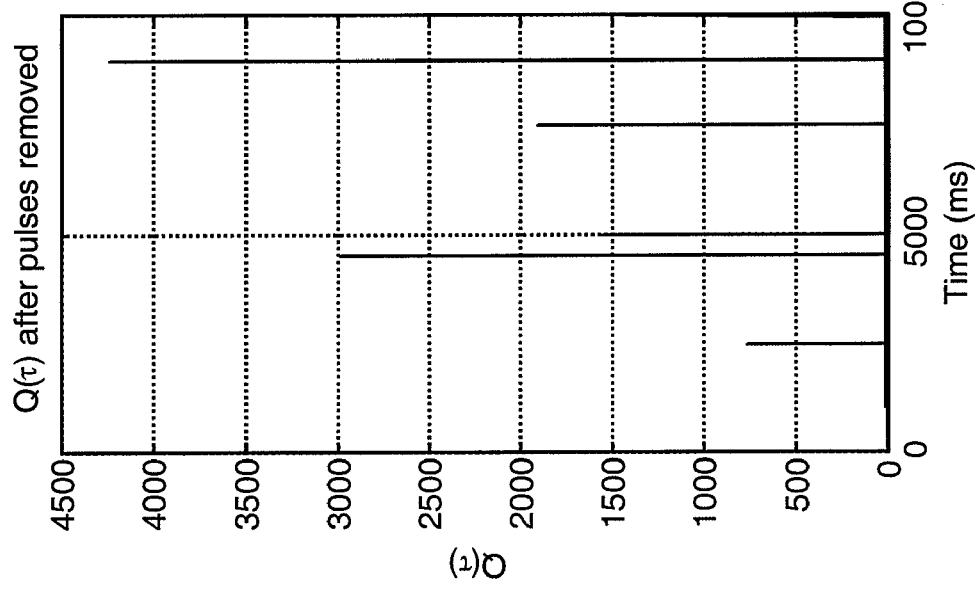

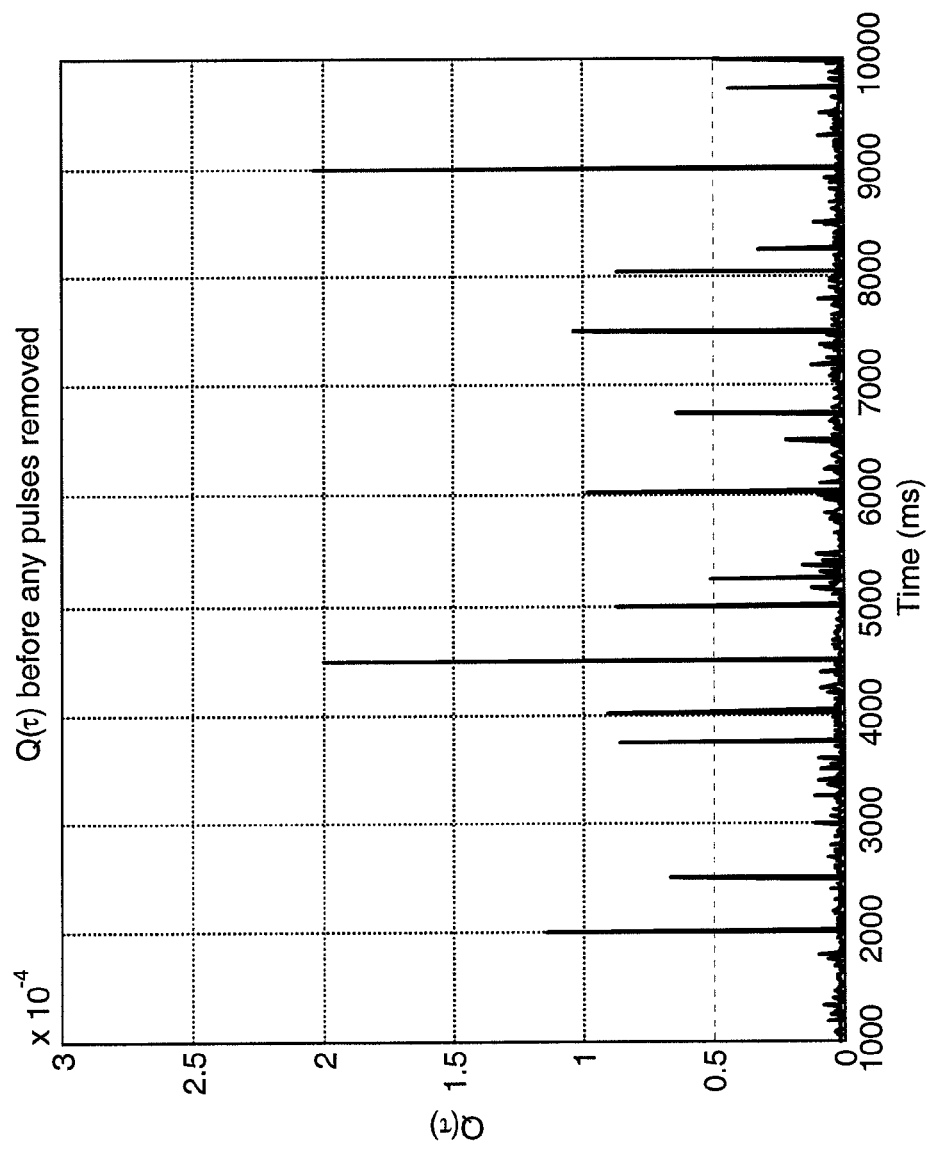

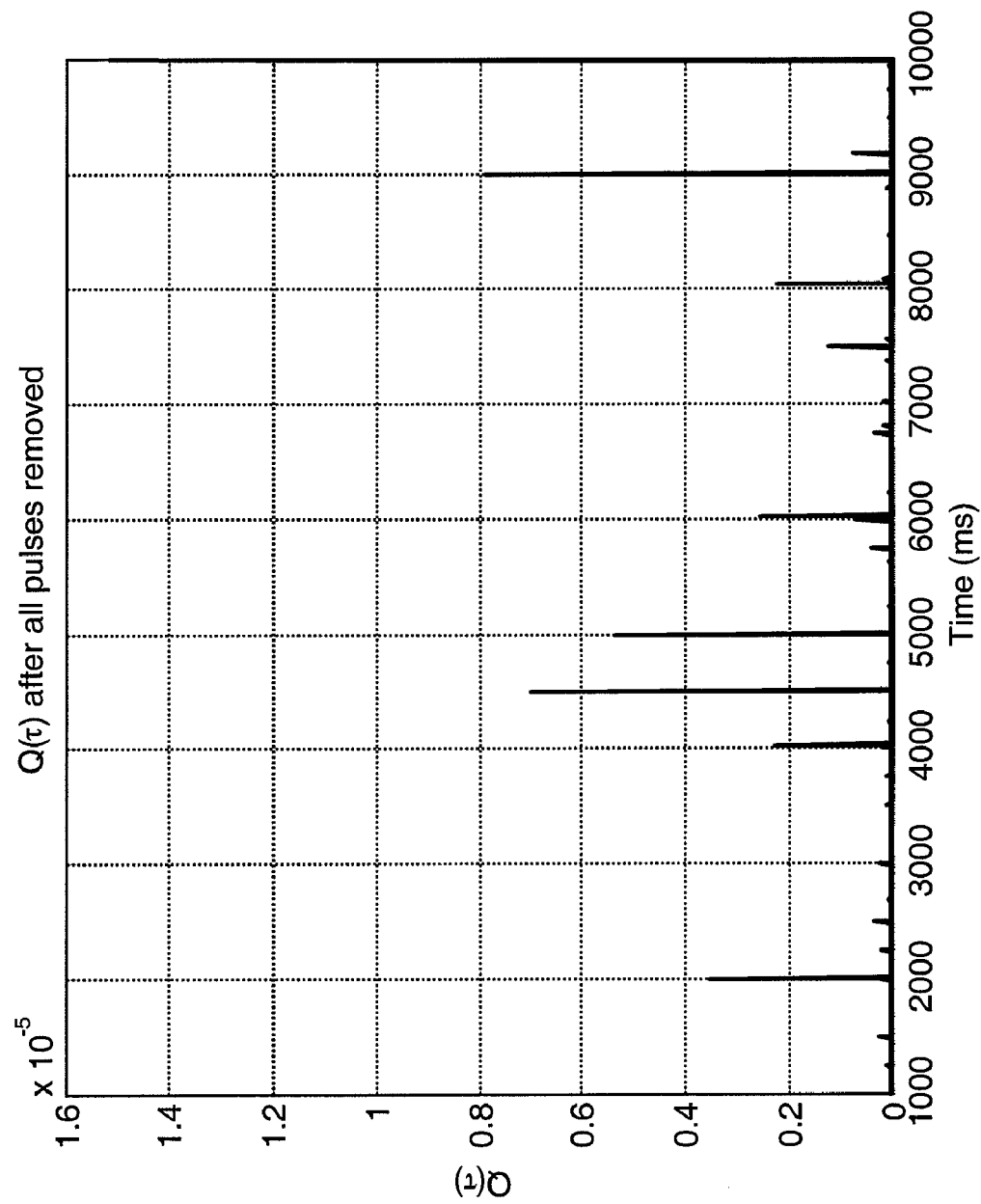

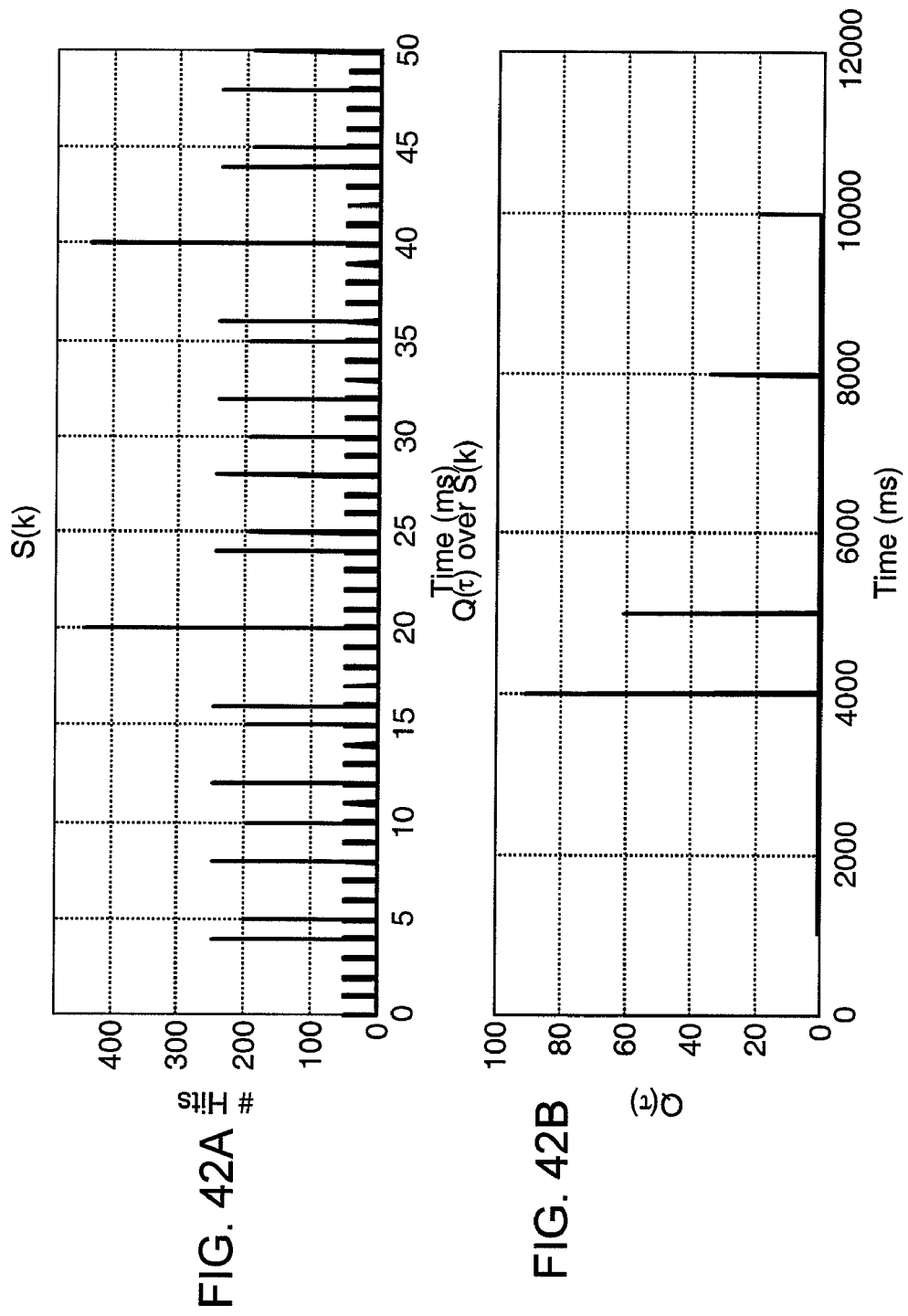

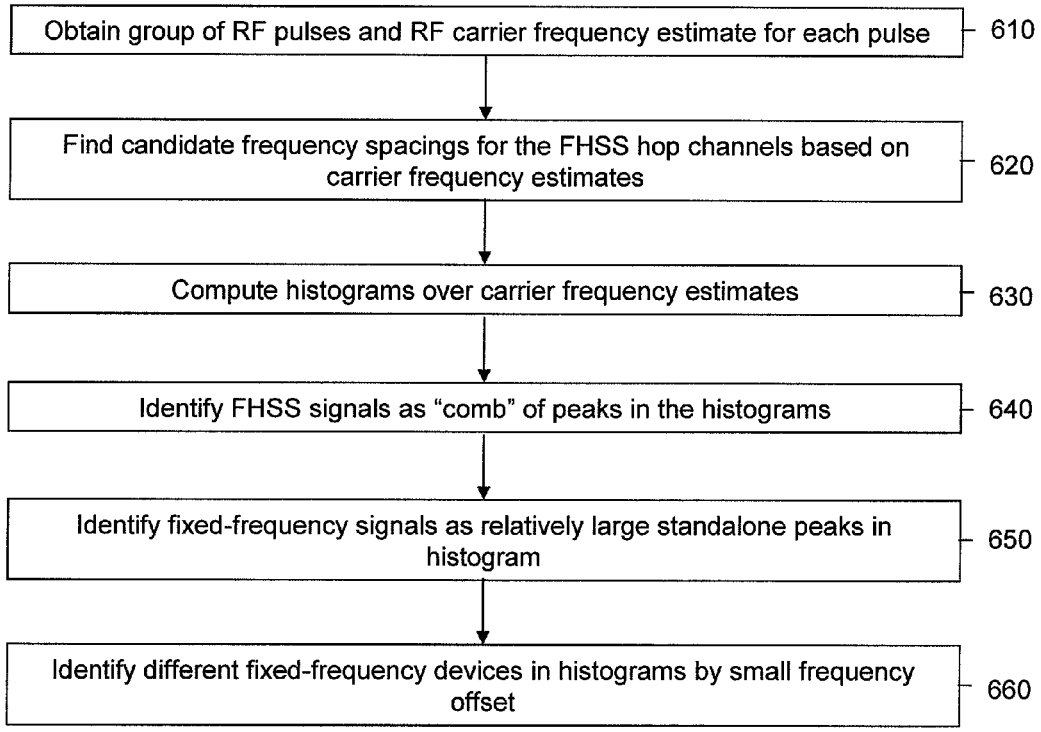

SYSTEM AND METHOD FOR IDENTIFYING WIRELESS DEVICES USING PULSE FINGERPRINTING AND SEQUENCE ANALYSIS

RELATED APPLICATIONS

This application claim priority to the following U.S. provisional applications, each of which is incorporated herein by reference:

U.S. Provisional Application No. 60/798,715, filed May 9, 2006;

U.S. Provisional Application No. 60/798,714, filed May 9, 2006;

U.S. Provisional Application No. 60/798,716, filed May 9, 2006; and

U.S. Provisional Application No. 60/800,442, filed May 16, 2006.

BACKGROUND OF THE INVENTION

The present invention is directed to techniques for identifying one or more devices that transmit wireless signals.

Systems are currently available to monitor over-the-air energy associated with transmissions or emissions of devices in order to determine the types of devices that may be active in a particular locale. See, for example, commonly assigned U.S. Pat. Nos. 6,850,735 B2; 7,035,593 B2; and 7,116,943 B2. These systems face challenges in environments where there are numerous devices transmitting at the same time and in the same frequency band, such as an unlicensed band defined in FCC part 15. For example, consider a radio receiver device that receives signals from an unknown device that operates using a frequency hopping spread spectrum (FHSS) protocol. The signal packets from a FHSS device jump around to different frequencies. Consequently, when there are numerous devices operating at the same time, it can become difficult to know when the signal packets are from a single device that operates using FHSS or whether there are multiple fixed-frequency devices. The situation becomes more complex when there are multiple devices that are transmitting and those devices use very similar communication protocols.

What is needed is a technique for identifying wireless devices in an environment where multiple devices are operating at the same time using a variety of signal protocols, such as a FHSS protocol and an asynchronous fixed-frequency protocol.

SUMMARY OF THE INVENTION

According to one aspect of the invention, a method is provided for identifying devices that are sources of wireless signals from received radio frequency (RF) energy. RF energy is received at a device called a sensor device herein. Pulse metric data is generated from the received RF energy. The pulse metric data represents characteristics associated with pulses of received RF energy. The pulses are partitioned into groups based on their pulse metric data such that a group comprises pulses having similarities for at least one item of pulse metric data. Sources of the wireless signals are identified based on the partitioning process. More specifically, the partitioning process involves iteratively subdividing each group into subgroups until all resulting subgroups contain pulses determined to be from a single source. At each iteration, subdividing is performed based on different pulse metric data than at a prior iteration. Ultimately, output data is generated (e.g., a device name for display) that identifies a source of wireless signals for any subgroup that is determined to contain pulses from a single source.

According to another embodiment of the invention, a method is provided for identifying devices that are sources of wireless signals from received RF energy, wherein the sources are so-called unnamed devices. Unnamed devices are devices whose transmission protocol is not a prior known to the sensor device that receives and analyzes the RF energy. According to this method, protocol-specific pulse data and device-specific pulse data are generated from for pulses of received RF energy. Pulses are sorted into groups to form a group of pulses whose transmission protocol is known and a group of pulses whose transmission protocol is not known. The group of pulses whose transmission protocol is not known is subdivided into subgroups based on protocol-specific pulse data for those pulses to produce one or more subgroups, where each subgroup comprises data for pulses having similar protocol-specific pulse data and thus corresponding to the same unknown transmission protocol. A protocol identifier is assigned to each subgroup that comprises pulse data for pulses from one or more devices using the same unknown transmission protocol. Each subgroup corresponding to an unknown transmission protocol is then iteratively further subdivided into further subgroups based on device-specific pulse data until resulting subgroups contain pulses determined to be from a single device. A device identifier is assigned to each resulting subgroup containing pulses from a single device. The protocol-specific pulse data for each protocol identifier is stored. For RF energy received thereafter (in the future), protocol-specific pulse data and device-specific pulse data are generated for received pulses of RF energy. The protocol-specific pulse data is compared with the stored pulse protocol-specific pulse data to determine when pulses of RF energy are received that match the pulse-specific pulse data for an unknown transmission protocol that has been previously recognized.

According to still another embodiment of the invention, a method is provided for identifying devices that are sources of wireless signals from received RF energy, where the devices use a transmission protocol that is not a priori known to the sensor device that receives and analyzes the received RF energy. Protocol-specific pulse data and device-specific pulse data are generated for received pulses of RF energy. The pulses are sorted into groups to form a group of pulses whose transmission protocol is known and a group of pulses whose transmission protocol is not known. The group of pulses whose transmissions protocol is not known is subdivided into subgroups based on protocol-specific pulse data for those pulses to produce one or more subgroups, where each subgroup comprising data for pulses having similar protocol-specific pulse data and thus corresponding to the same unknown transmission protocol. A protocol identifier is assigned to each subgroup that comprises pulse data for pulses from one or more devices using the same unknown transmission protocol. Each subgroup corresponding to an unknown transmission protocol is iteratively subdivided into further subgroups based on device-specific pulse data until resulting subgroups contain pulses determined to be from a single device. Demodulated data for pulses from multiple subgroups determined to be from a single device and having the same protocol identifier are examined to identify one or more bit fields that are constant across multiple packets from multiple subgroups having the same protocol identifier. The one or more bit fields are stored as a synchronization pattern (a so-called "pseudo-sync" pattern) for a corresponding transmission protocol for use as one type of protocol-specific pulse data to group pulses for subsequently received (in the future) RF energy.

According to yet another embodiment of the invention, a method is provided for identifying sources of wireless signals from received RF energy based on carrier frequencies of the pulses. In this method, pulses of RF energy are received and their carrier frequencies are determined. The carrier frequencies are analyzed to determine a set of zero or more candidate frequency spacings to be used for identifying a hopset of a frequency hopping channelization scheme. One or more channelization schemes associated with the pulses are determined using the set of candidate frequency spacings and the carrier frequencies for the pulses, wherein a channelization scheme comprises a set of one or more transmit frequencies. The pulses are partitioned into groups, wherein each group corresponds to a channelization scheme. Each group of pulses is subdivided into subgroups based on differences between the carrier frequencies for pulses in the group and a particular one of the transmit frequencies for the corresponding channelization scheme. Sources of wireless signals are then identified based on the subgroups of pulses.

According to still another embodiment of the invention, a method is provided for identifying sources of wireless signals from received RF energy using analysis of the arrival times of pulses, the so-called pulse timestamps. In this method, pulses of RF energy are detected and their arrival times are determined. Candidate periods are determined for the pulses based on the arrival times. Pulses are then partitioned into groups on their candidate periods. Phases are derived for pulses in each of the groups that have been formed based on candidate periods. The groups of pulses are then each partitioned into subgroups based on their phases. Sources of wireless signals are identified based on the subgroups formed by partitioning based on phase and other pulses remaining that were not grouped based on candidate period.

BRIEF DESCRIPTION OF THE DRAWINGS

FIGS. 24A and 24B illustrate plots for an autocorrelation function $R(.)$ and a normalized product of autocorrelation values $Q(.)$, respectively, for timestamps for a simulation comprising sequence of pulses associated with a single wireless source, according to an embodiment of the present invention.

FIGS. 25A and 25B illustrate plots for $R(.)$ and $Q(.)$, respectively, for timestamps for a simulation of a sequence of pulses associated with two wireless sources.

FIGS. 29A and 29B are plots for $Q(\tau)$ and a histogram of phases, respectively, generated at a first iteration in the course of the pulse timestamp analysis algorithm for a simulation.

FIG. 34 illustrates a plot for Q(τ) prior to removal of pulses by the pulse timestamp analysis algorithm shown in FIG. 28 for another simulation.

FIG. 40 illustrates a plot for Q(.) after all pulses are removed for remaining timestamps for the simulation of FIG. 34.

FIGS. 42A and 42B illustrates plot for S(k) and a histogram of Q(τ) over S(k), respectively, after a first set of pulses are removed in the course of the pulse timestamp analysis algorithm executed using alternative computations for the simulation of FIGS. 24A and 24B.

FIG. 44 illustrates a flow chart of a pulse frequency analysis algorithm according to an embodiment of the present invention.

DETAILED DESCRIPTION

Figure 1:
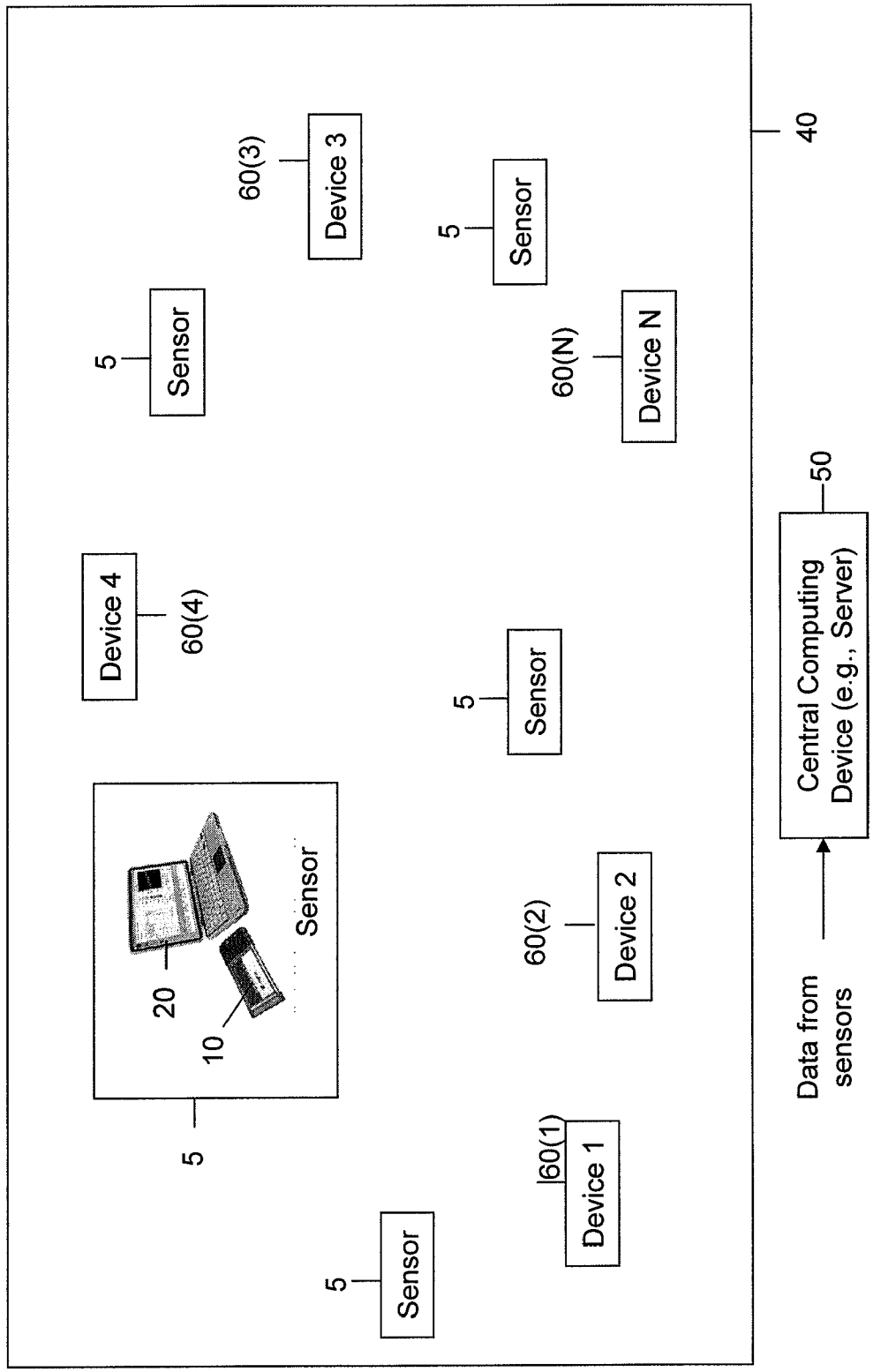
FIG. 1 is a diagram depicting an environment in which the techniques of the present invention are useful.

Referring first to FIG. 1, a system is shown comprising one or more radio sensor devices, hereinafter simply called sensors, 5 that are positioned throughout a region of interest 40. The region of interest may be inside a building or in an outdoor environment. Each sensor device 5 is a receiver device that may take on the form of a card device 10 and a host computing device 20. Alternatively, the functions of the card device 10 and host computing device 20 may be integrated into a single unit. One or more of the sensors may report data to a central computing device or server 50 via a wired or wireless link (not shown for simplicity). There are one or more devices, shown at reference numerals 60(1) to 60(N), that may be transmitting or emitting radio frequency (RF) energy in the region of interest 40 and it is desirable to be able to identify these devices based on RF energy received by at least one of the sensors 5.

Figure 2:
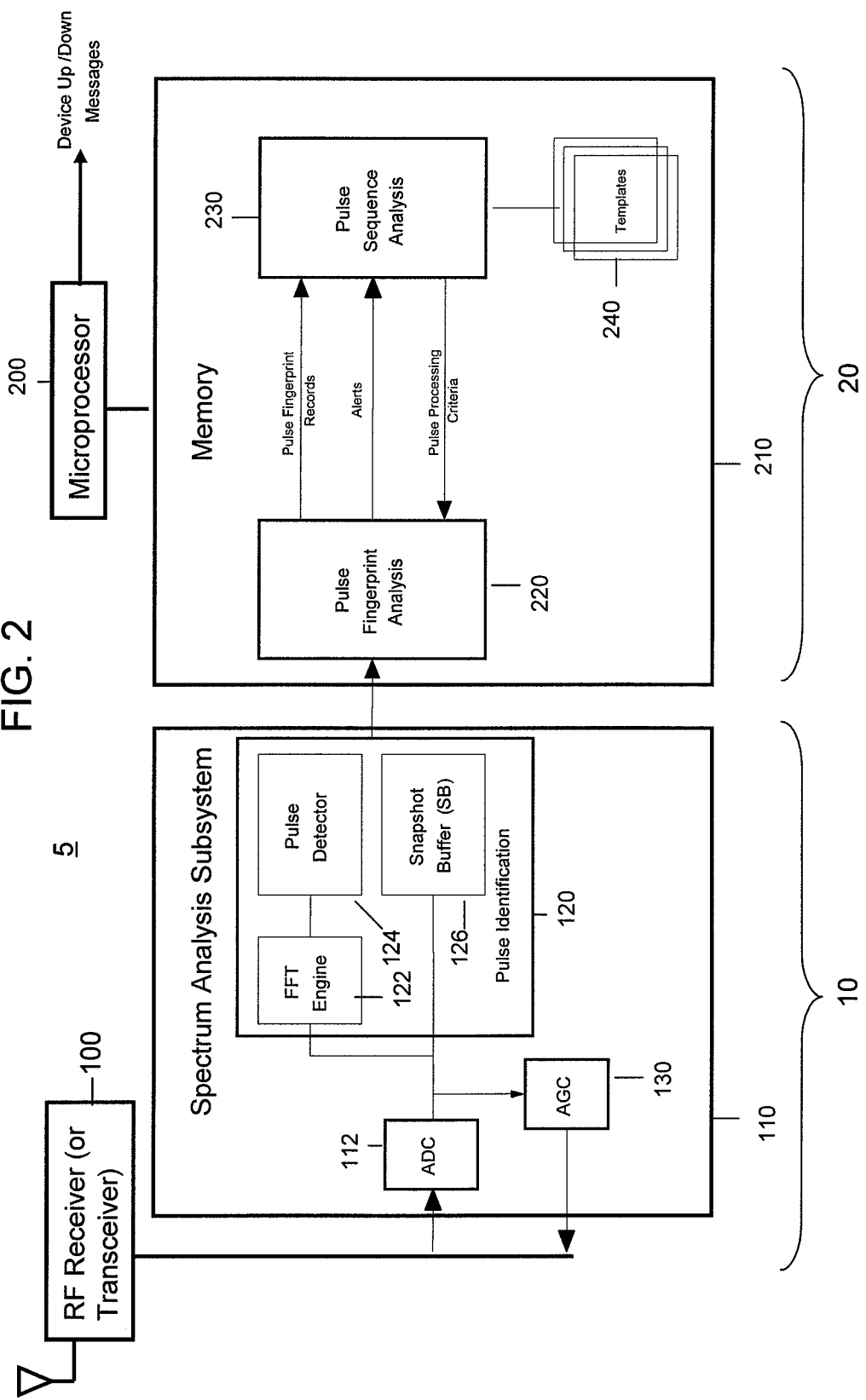
FIG. 2 is a block diagram of a sensor device according to an embodiment of the present invention.

Turning to FIG. 2, a block diagram of the significant components of a sensor 5 is described. FIG. 2 is just one example of many possible configurations for the hardware and software components for performing the techniques of the present invention. The card 10 of the sensor device 5 comprises a radio frequency (RF) receiver (or transceiver) 100 and a spectrum analysis subsystem 110. The spectrum analysis subsystem 110 comprises an analog-to-digital converter (ADC) 112, a pulse identification circuit 120 and an automatic gain control block 130. The ADC 112 receives the analog baseband signal produced by the RF receiver 100 that contains the amplitude and phase of the received signal. The ADC 112 converts the analog baseband signal to a digital signal for analysis by the pulse identification circuit 120. The receiver (or transceiver 100) may be capable of scanning across a frequency range in order to capture RF energy within a predetermined portion of the frequency range for a period of time, and then move to a next portion of the frequency range for a period of time and so on. A receiver 100 with this capability is referred to herein as a scanning receiver.

The pulse identification circuit 120 comprises a Fast Fourier Transform (FFT) engine 112, a pulse detector 124 and a snapshot buffer (SB) 126. The FFT engine 122 generates real-time power spectral data and the pulse detector 124 continuously monitors the output of the FFT to detect pulses worthy of further analysis by the device identification algorithms according to the present invention. The snapshot buffer 126 stores a segment of received (I/Q) waveform samples over time. For example, in one embodiment the snapshot buffer 126 stores a 35 ms segment of complex 20-bit I/Q waveform samples at a sample frequency of 40 M symbols per second (Msps). Examples of a spectrum analysis subsystem are described in commonly assigned U.S. Patent Publication No. 20050002473A1, entitled "Signal Pulse Detection Scheme for Use in Real-Time Spectrum Analysis" and U.S. Pat. No. 6,714,605 B2, the entirety of each of which are incorporated herein by reference. The pulse detector 124 determines where in the snapshot buffer 126 the I/Q samples are located for a particular pulse.

The pulse identification circuit 120 may be implemented as a plurality of digital logic gates on an integrated circuit (IC) in a VLSI implementation, such as on an application specification IC (ASIC). Alternatively, it should be understood that the functions of the pulse identification circuit 120 may be implemented by software in the host device 20. In either case, the pulse identification circuit 120 identifies pulses in time and frequency in the snapshot buffer 126.

The output data from the spectrum analysis subsystem 110 comprises pulse event records that are stored in a buffer, such as a circular buffer. For example, a pulse event record comprises data identifying the start time, duration, power, carrier frequency, and bandwidth of a pulse. In addition, the pulse event records points to the location in the snapshot buffer where the raw digital data is located for the I/Q waveform associated with a pulse.

The host device 20 comprises a microprocessor 200 and memory 210. The microprocessor 200 and memory 210 may be integrated on a single system-on-chip (SOC) or may be separate components in a device, such as a laptop computer. The memory 210 is a computer readable medium that stores the software instructions for performing the device identification techniques according to the embodiments of the present invention. The software instructions may be viewed as separate modules comprising a pulse fingerprint analysis module 220 and a pulse sequence analysis module 230. In addition, there are templates 240 stored in the memory that are data that specify how to identify devices based on their pulse fingerprints. The microprocessor 200 executes the software stored in the memory 210 and generates device up and device messages. A "device up" message indicates the name of a device that is detected and a device down message indicates the name of a device that was previously being detected and tracked that is no longer detected.

The device identification methods according to the embodiments of the present invention use a combination of RF fingerprinting, pulse event filtering, and pulse statistics to identify wireless emitters. The pulse identification circuit 120 outputs signal pulses detected by the pulse detector 124 and raw digital signal data stored in the snapshot buffer 126. The pulse fingerprint analysis module 220 characterizes each of the pulses received from the spectrum analysis subsystem 110. To this end, a useful set of pulse metrics are defined and are measured and recorded for each detected pulse. The pulse fingerprint analysis module 220 computes pulse metrics, described hereinafter, for each identified pulse in the snapshot buffer 126 and in so doing creates a record called a pulse fingerprint record that comprises the pulse metrics for a pulse, and the pulse fingerprint records are coupled as an input to the pulse sequence analysis module 230. The pulse sequence analysis module 230 partitions pulse records into groups and identifies devices and networks using the algorithms described herein. The pulse sequence analysis module 230 iteratively partitions the pulse groups into subgroups based on pulse metrics until each subgroup contains pulses that are determined to be from a single source. For purposes of the description of the embodiments of the invention herein, a "named device" is a device that emits or transmits a signal having an a priori known transmission protocol (known to the sensor device) and an "unnamed device" is a device that emits or transmits a signal having an unknown transmission protocol (unknown to the sensor device).

There is an interface between pulse fingerprint analysis module 220 and the pulse sequence analysis module 230 that allows the pulse sequence analysis module 230 to adjust the computational workload of the pulse sequence analysis module 230 based on device detection status. For example, after the pulse sequence analysis module 230 has detected a DECT-like connected pair of wireless devices, it can send a message to the pulse fingerprint analysis module 230 to do less fingerprinting on pulses that match a specific fingerprinting criteria (in this case, time frequency and phase, or bandwidth, etc.). As another example, when the pulse sequence analysis module 230 determines that a jamming signal may be present, it may send a message to the pulse fingerprint analysis module 220 to compute a bandwidth pulse metric for pulses matching specified fingerprint criteria. After the pulse sequence analysis module 230 confirms whether the signal is a jamming signal, it sends a follow-up message to pulse fingerprint analysis module 220 to remove the slew rate task from its list of operations to perform. According to still another variation, when the sensor first powers up, the pulse sequence analysis module 230 may analyze data to detect named devices only, followed by unnamed devices in order to distribute its workload.

The pulse sequence analysis module 230 captures a relatively long list of pulse fingerprint records and uses event filtering and statistics to infer which and how many devices are transmitting in the frequency band. The pulse sequence analysis module 230 executes a process that is similar to how one might use the primary, secondary, tertiary, etc., sort feature of a spreadsheet application in an iterative manner to filter, manipulate and group a set of records in a spreadsheet.

The pulse metrics used to partition the pulse records comprise characteristics associated with communication protocols, called protocol-specific characteristics, and characteristics associated with devices (but not protocols), called device-specific characteristics. The terms protocol-specific pulse data, protocol-specific characteristics and protocol-specific pulse metrics are used interchangeably herein and the terms device-specific pulse data, device-specific characteristics and device-specific pulse metrics are used interchangeably herein.

Examples of protocol-specific pulse metrics are:
Pulse type: continuous, burst or chirp (described hereinafter);
Protocol type (if known): Whether a known "protocol identifier" waveform was present in the pulse (this is usually a sync word or a known preamble that is used to allow the receiver to lock onto packets of a particular transmission protocol);
Modulation type e.g., FSK, BPSK, QPSK, QAM, OFDM, etc.;
Symbol alphabet size, e.g., 2, 4, 16, 32;
Data rate, bps;
RF Bandwidth, Hz;
Pulse duration, e.g., microseconds;
Carrier frequency;
Center frequency (if different than carrier frequency);
Peak-to-average power ratio;
Chirp type (linear or non-linear) if pulse type=chirp;
Frequency trajectory for non-linear chirp;
Pseudo-sync pattern (described hereinafter);
Frequency deviation; and
Synchronicity and periodicity (described hereinafter under the section heading "The Synchronicity and Periodicity Pulse Metrics").

The most basic way to partition a set of pulses received from multiple devices is based on whether the pulses are short bursts of energy at a particular frequency (which we refer to using the "burst" pulse type) or long pulses that persist for 35 ms or longer at a particular frequency (which we refer to using the "continuous" pulse type).

Certain types of devices, such as radar devices, emit so-called "chirp" pulses. Chirp pulses are short bursts of RF energy that are usually implemented by linearly increasing the transmit carrier frequency between the beginning and end of the burst. Although chirp pulses technically could be considered as a subtype under burst pulses, they are treated as a separate pulse type since they are somewhat of a special case (chirp pulses are the only burst waveforms that we consider that do not carry any digital information).

Some radars use non-linear frequency modulated (FM) chirp waveforms. The frequency vs. time "trajectory" or wave shape in this case is arbitrary. To characterize these pulses, the pulse fingerprinting analysis module 220 may fit one or multiple polynomials to the wave shape. A distortion metric between fitted polynomials (e.g., mean-square error) may then be used to distinguish one group of non-linear FM chirp pulses from another.

Examples of device-specific pulse metrics are:

Pulse start (arrival) time, microseconds, relative to the receiving device's local time reference, also referred to herein as the pulse time stamp;

Pulse power;

Carrier frequency error (difference between actual carrier frequency and expected carrier frequency for a device using a particular protocol);

Ramp up/down time—ramp up time is usually defined to be the time between the beginning of a burst and when the instantaneous power reaches 90% of the average power during the burst. Ramp down time is the time it takes for the instantaneous power to decrease to 10% of the average power during the burst;

Pulse timing period and phase (if synchronous or periodic);

Modulation start/stop times (relative to ramp up/down time); and

Device or MAC address (if the protocol is known and the address available);

Pseudo-MAC address (described hereinafter).

Carrier frequency error is the difference between a device's intended carrier frequency and its actual carrier frequency, as measured by a receiving device. Frequency errors are usually caused by inaccuracies in the transmitting device's reference oscillator. For simplicity, in this description, it is assumed that all devices attempt to use center frequencies that are multiples of 500 kHz. In reality, this simplification is often but not always true, e.g., some cell phones use frequencies that are multiples of 30 kHz, some DECT cordless phones use frequencies that are non-zero down to the Hertz. Thus, a more robust way to deal with this issue is to estimate the channelization schemes used by each of the devices from the received set of pulses, and to group the pulses by their associated channelization scheme. For the purposes of this description, a "channelization scheme" is defined as an indication of whether the device uses a fixed carrier frequency or is a frequency-hopped scheme, and the carrier frequency for each of the hop channels if a frequency-hopped is determined. In the case of a frequency-hopped scheme, the carrier frequency error is the difference between a device's intended carrier frequency and its actual or measured carrier frequency at any one of the hops.

After grouping the pulses by their channelization scheme, for each pulse group, one may compute the frequency error for each device in that group by subtracting its measured carrier frequency from the nearest transmit frequency for that group at the receiving device.

Pulse Grouping Algorithm

Figure 3:
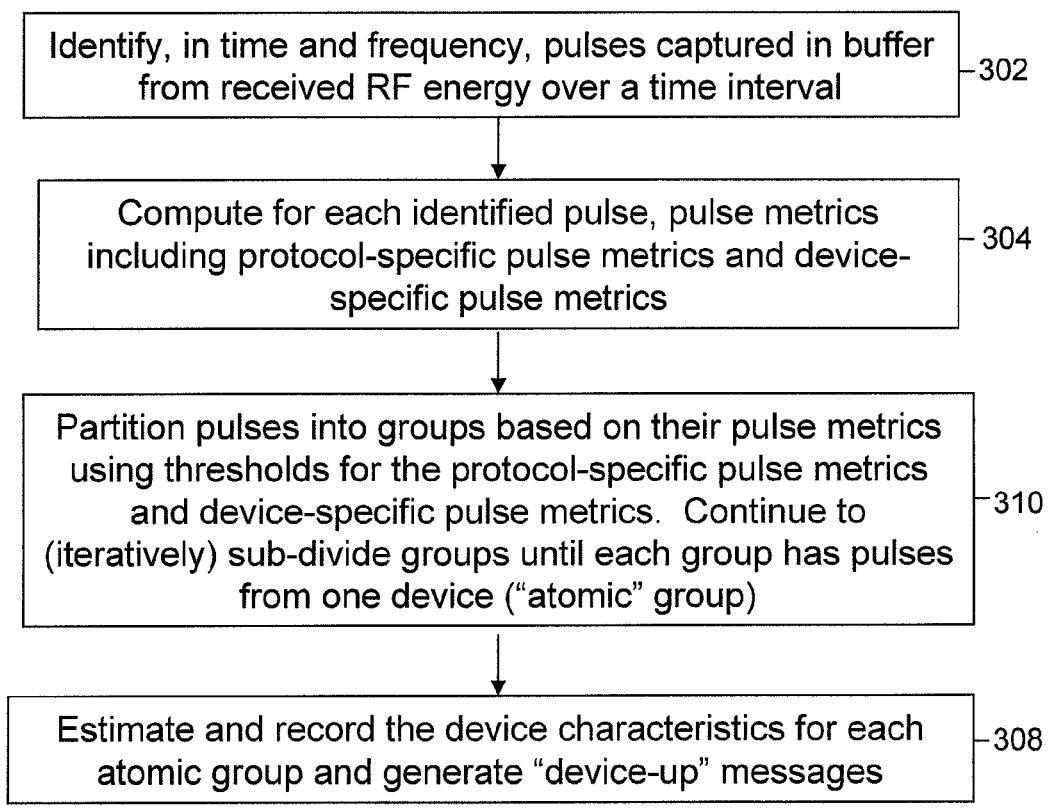
FIG. 3 is a flow chart for a device identification algorithm according to an embodiment of the present invention.

Turning now to FIG. 3, the pulse grouping device identification process shown at 300 depicting in more detail the operation and interaction of the pulse fingerprint analysis module 220 and pulse sequence analysis module 230 is described. At 302, the fingerprint analysis module 220 examines the output of the pulse detector 124 and the content of the snapshot buffer 126 to identify, in time and frequency, pulses in the received RF energy. Next, at 304, using data from the pulse detector 124 and the snapshot buffer 126, the pulse fingerprint module 220 computes protocol-specific pulse metrics and device-specific pulse metrics are computed for each identified pulse. Examples of these metrics are described above.

At 310, the pulses are partitioned into groups based on their protocol-specific pulse metrics and device-specific pulse metrics. The groups of pulses are each further subdivided until each group is determined to be an "atomic" group, i.e., has pulses that come from only one device. There are tests, described hereinafter, that are executed on a group to determine whether it is an atomic group. For example, at 310, pulses are parsed or partitioned into groups based on their protocol-specific pulse metrics, e.g., pulse type, modulation type, data rate, etc., and then each group of pulses is further sub-divided based on device-specific pulse metrics, e.g., carrier frequency error, power, timing phase. Pulse groups continue to be subdivided until each resulting subgroup becomes an "atomic" group, i.e., it is comprised of pulses from only one device. Next, at 308, the device characteristics are estimated and recorded for each atomic group and a device up message is accordingly generated using statistics.

Thus, to summarize, the pulse grouping algorithm provides a method to identify devices that are sources of wireless signals from received radio frequency (RF) energy, comprising receiving RF energy; generating pulse metric data from the received RF energy, the pulse metric data representing characteristics associated with pulses of received RF energy; partitioning the pulses into pulse groups based on their pulse metric data; and identifying the sources of the received wireless signals based on said partitioning. Furthermore, the partitioning comprises iteratively subdividing each group into subgroups until all resulting subgroups contain pulse metric data for pulses determined to be from a single source. At each iteration, subdividing and formation of new subgroups is performed based on one or more different items of pulse metric data than what was used for subdividing at the prior iteration. Ultimately, output data is generated that identifies a source of wireless signals for any subgroup that is determined to contain pulse metric data for a single source.

Figure 4:
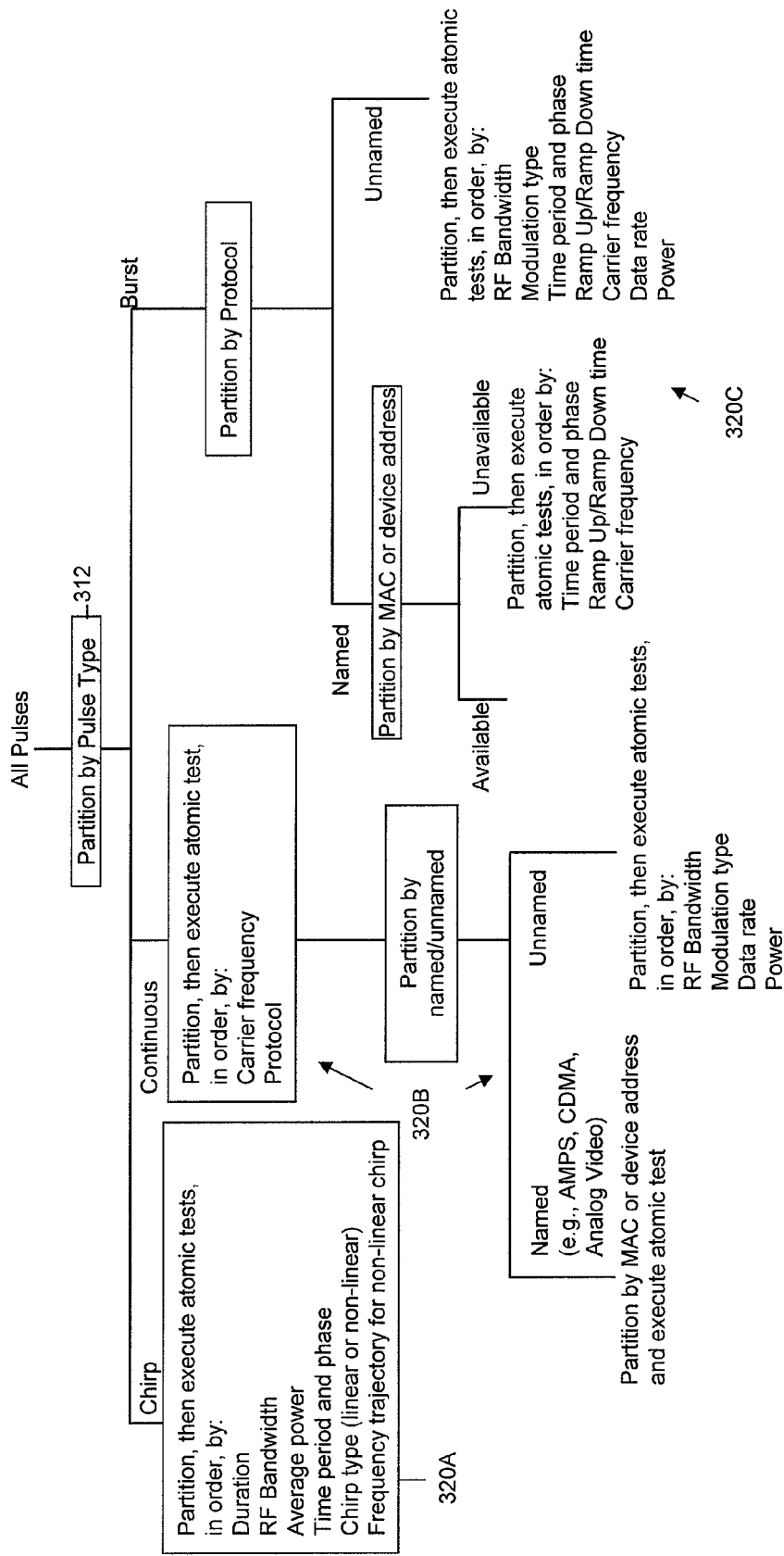
FIG. 4 is a tree-like diagram depicting a pulse grouping technique according to an embodiment of the present invention.

FIG. 4 illustrates a tree-like paradigm depicting a method by which pulses are partitioned into groups according to an embodiment of the present invention. The flow charts shown in FIGS. 5-8 illustrate in further detail the pulse partitioning process at 310 in FIG. 3 and depicted by the tree-like diagram of FIG. 4. The partitioning technique represented by FIG. 4 is an example of one methodology to partition groups of pulses into atomic groups. It should be understood that there are numerous other possible partitioning sequences that would work, and nothing contained in FIG. 4 or this description is intended to limit the present invention to a particular partitioning sequence.

The pulse sequence analysis module 230 may have two operation states or modes: an acquisition mode and a tracking mode. In the acquisition mode, the pulse sequence analysis module 230 searches for new (not yet detected) devices, and declares a device "up" when it identifies an atomic group of pulses that have not been claimed by any of the other devices that are already "up". In the tracking mode, the pulse sequence analysis module 230 looks to see that a sufficient number of pulses matching the original fingerprint criteria found in acquisition mode are still present for the devices that are "up". If the pulse sequence analysis module 230 determines that the criteria for a device are no longer met, then that device is declared "down". Thus, the state information for all detected devices may be maintained between invocations for tracking purposes.

When a group of pulse records cannot be subdivided into atomic subgroups, the pulse records for that group may be simply discarded or exported to a software tool that in a user interface to allow for further manual filtering or statistical analysis.

Figure 5:
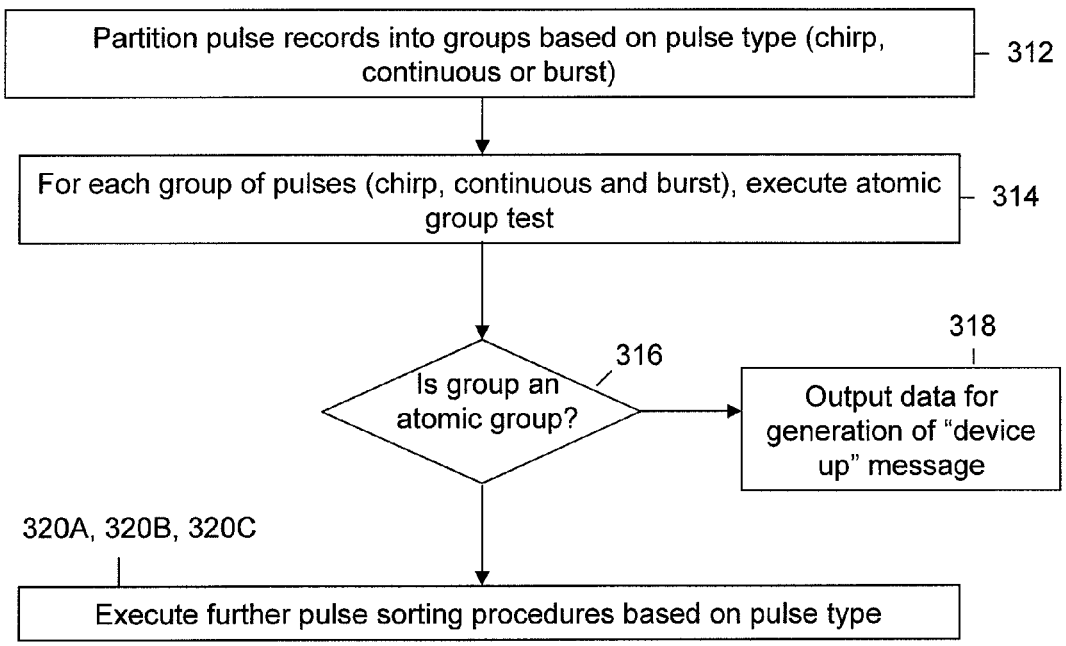
FIG. 5 is a flow chart depicting a first level of the pulse grouping technique according to an embodiment of the present invention.

Referring initially to FIGS. 4 and 5, the pulse partitioning scheme starts at the top and traverses downward until all or nearly all of the pulses are in atomic groups. Initially, 312, the pulses records are divided or partitioned into groups based on pulse type. That is, a group of pulse records is created for all pulse records whose pulse type is classified as chirp by the fingerprint analysis module 220, a group of pulse records is created for all pulse records whose pulse type is continuous and a group of pulse records is created for all pulse records whose pulse type is burst. This is depicted in FIG. 4 as the first level of pulse grouping and this first grouping procedure at 312 can create at most 3 groups of pulse records: chirp, continuous and burst. Next, at 314, for each resulting group of pulses created at 312, an atomic group test is executed to determine whether any of the groups contains pulse records from one device.

The following are the atomic group tests, that is, those tests that are performed after a grouping procedure to determine whether any of the resulting groups are atomic groups. In one embodiment of the invention, this atomic group testing procedure is performed after any grouping procedure throughout the pulse partitioning process 310.

As used herein, "named devices" refers to devices that have an a priori known transmission protocol at the sensor (radio receiver) device and "unnamed devices" refers to devices that have a transmission protocol that is unknown to the sensor device.

Atomic Group Test for Group of Pulses that are Continuous Type Pulses:

A group of pulses having pulse type=Continuous is considered to be an Atomic Group if (1) or (2-4) are true:
(1) If the pulses correspond to so-called named devices, it is possible to demodulate and identify the MAC or other address associated with the pulses, and all pulses in the group have that same address;
(2) The carrier (or center) frequency of each pulse is the same within an appropriate threshold;
(3) The modulation type, data rate, and one or more other protocol-specific pulse metrics are the same for all pulses in the group; and
(4) All pulses in the group have a power within a predetermined range of their average power (e.g., +12 and −30 dB of their average pulse power to account for fading).

Atomic Group Test for Group of Pulses that are Burst Type Pulses:

A group of pulses having pulse type=Burst is considered to be an Atomic Group if (1) or (2) or (3-5) are true:
(1) If the pulse records in the group correspond to a named device, it is possible to demodulate and identify the MAC or other address, and all pulses in the group have that same MAC address;
(2) The computed synchronicity (defined hereinafter) for all pulses records in the group is below an appropriate threshold (and the pulse records correspond to an unnamed device);
(3) All pulse records in the group have a carrier frequency error (i.e., the difference between the nominal and actual carrier frequency for all devices using the same protocol) within approximately a predetermined range (corresponding to a measurement accuracy tolerance) of other pulses in the group (e.g., 400 Hz);
(4) All pulse records in the group have a power within a predetermined range of their average power (e.g., +12 and −30 dB) to account for fading; and
(5) All pulse records in the group have ramp up/down times within an appropriate tolerance window.

Atomic Group Test for Group of Pulses that are Chirp Type Pulses:

A group of pulses having pulse type=Chirp is considered to be an Atomic Group if conditions 1, 2, 5 and 6 (defined below) are all true, and either 3 or 4 is true:
(1) The RF bandwidth, duration, timing period and timing phase pulse metrics for all of the pulse records in the group are each within a tolerance of each other;
(2) The synchronicity pulse metric (defined hereinafter) for all pulses in the group is below an appropriate threshold;
(3) All pulse records in the group have a linear chirp type pulse metric;
(4) All pulse records in the group have a non-linear chirp type pulse metric and have the same frequency trajectory pulse metric within a tolerance;
(5) All pulse records in the group have a carrier frequency error (i.e., the difference between the nominal and actual carrier frequency for all devices using the same protocol) within approximately a predetermined range (corresponding to a measurement accuracy tolerance) of other pulses in the group (e.g., 400 Hz);
(6) All pulse records in the group have a power within a predetermined range of their average power (e.g., +12 and −30 dB) to account for fading; and In many real-world situations, it is often true that two or more devices are time-division multiplexed together on the same network (e.g., a DECT-like cordless phone and base station). The following is a description of tests that may be used to determine which devices are networked together in such a fashion.

If the pulse type is burst, then pulse records for two or more devices are said to belong to the same TDM network if any of (1) through (3) are true:
(1) The pulses are synchronous as defined hereinafter, and they have the same period within a predetermined tolerance (e.g., +/−0.2 ppm);
(2) The pulses are periodic as defined herein, and they have the same period within a predetermined tolerance (e.g., +/−0.2 ppm) and they are offset in phase such that their transmissions do not overlap in time;
(3) The pulses are asynchronous, but share the same carrier frequency within a predetermined tolerance.

Thus, when an atomic group test involves the synchronicity pulse metric and/or periodicity pulse metric, these metrics are computed for a sequence of pulses derived from arrival times (pulse timestamps) of pulses in the sequence. The computed synchronicity pulse metric and/or periodicity pulse metric is then examined to determine whether that pulse metric is such that it indicates that a subgroup of pulses corresponding to the sequence of pulses is from a single source.

Still referring to FIG. 5, at 316 it is determined whether any of the groups created in 312 are atomic groups and if so, data for that group of pulses is output for generation of a "device up" message as depicted at 308 in FIG. 4. For all groups of pulses determined not be atomic groups at 316, further pulse sorting procedures are performed at 320A, 320B or 320C, depending on pulse type as described herein. Thus, a plurality of pulse type specific groups are created at 312, wherein each pulse type specific group comprising pulse metric data for pulses having the same pulse type. In the example shown in FIG. 4, there can be a chirp type group of pulses, a burst type group of pulses and a continuous type group of pulses. Each pulse type specific group is then subdivided (unless it is determined to be an atomic group) into subgroups using partitioning rules that are unique to each pulse type (320A, 320B and 320C).

Figure 6:
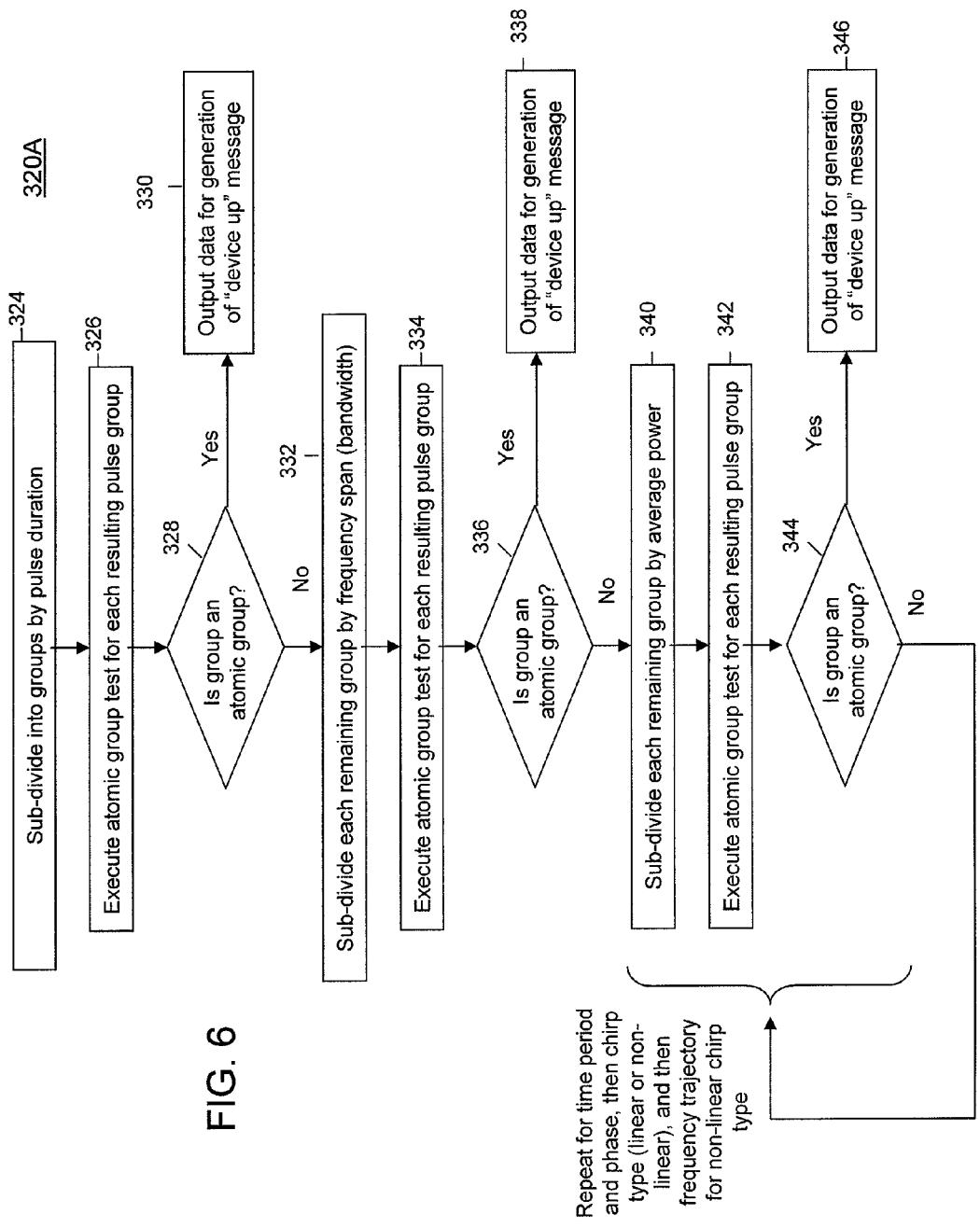
FIG. 6 is a flow chart depicting a pulse grouping technique for chirp type pulses according to an embodiment of the present invention.

Turning now to FIG. 6, with continued reference to FIG. 4, a procedure 320A is described for further sorting of groups of pulses that are chirp type pulses. At 324, the (chirp type) groups of pulse records are further sub-divided into groups by pulse duration such that a plurality of sub-groups of pulse records are created, wherein each sub-group comprises pulse records of the same duration. Next, at 326, the atomic group tests described above for chirp type pulses are executed to determine whether any of the sub-groups created from the partitioning at 324 are atomic groups. At 328, for any sub-group that is determined to be an atomic group, at 330 data is output for generation of an appropriate "device up" message. Otherwise, all sub-groups that fail the atomic group test at 328 are processed further.

At 332, all of the remaining non-atomic sub-groups are further sub-divided into sub-groups by frequency span (RF bandwidth) such that a plurality of sub-groups are created where pulse records in each sub-group have the same RF bandwidth. Next, at 334, the atomic group tests are performed for each of the resulting sub-groups from the partitioning by bandwidth at 332. At 336, for any of the sub-groups determined to be atomic, data is output at 338 for generation of an appropriate "device up" message. All sub-groups that fail the atomic group test at 336 are further processed.

At 340, the remaining non-atomic sub-groups are further sub-divided based on average power. At 342, each of the sub-groups resulting from the partitioning at 340 are subjected to the atomic group tests. At 344, for any sub-group determined to be atomic, data is output at 346 for generation of an appropriate "device up" message.

As indicated in FIG. 6, any non-atomic sub-groups remaining after 344 are further sub-divided next by time period and phase, then by chirp type (linear or non-linear) and then by frequency trajectory for non-linear chirp types. After each sub-division, the resulting groups are subjected to the atomic group tests, data for "device up" messages for atomic sub-groups is output, and only non-atomic subgroups pass on to the next level of partitioning. It should be understood that the atomic group tests performed in the chirp type pulse partitioning process 320A are those tests described above for chirp type pulses.

Figure 7:
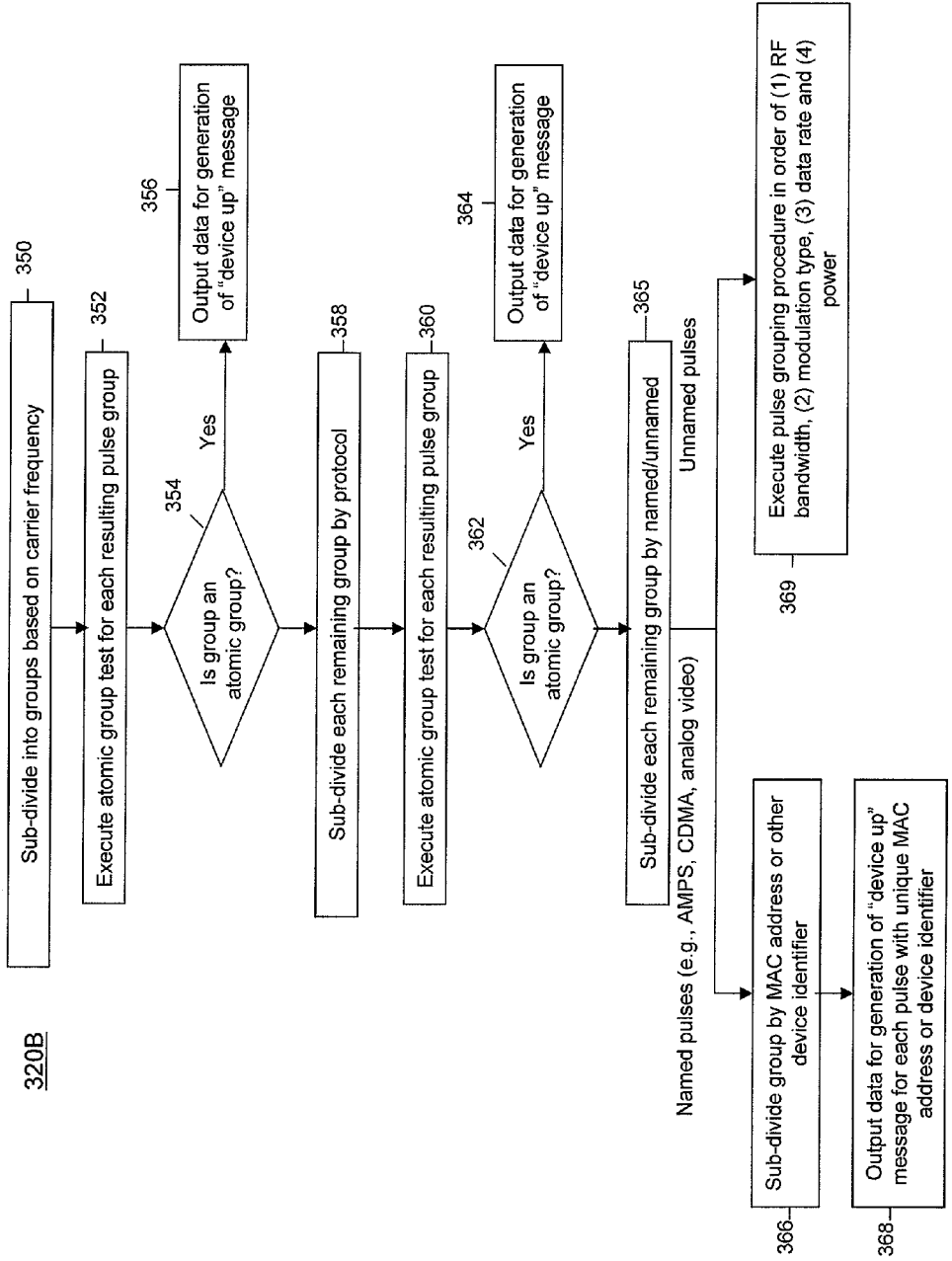
FIG. 7 is a flow chart depicting a pulse grouping technique for continuous type pulses according to an embodiment of the present invention.

Reference is now made to FIG. 7, in conjunction with FIG. 4, for a description of the pulse partitioning process 320B for continuous pulses. At 352, the non-atomic continuous type pulses remaining after 316 in FIG. 5 are sub-divided by carrier frequency. At 354, the resulting sub-groups are then subjected to the atomic group tests for continuous type pulses, described above. At 354, all sub-groups that are determined to pass the atomic group tests and identified and at 356 data is output for generation of a "device up" message for each atomic sub-group. At 358, any remaining non-atomic sub-groups are further sub-divided by protocol and the resulting sub-groups are subjected to the atomic group tests at 360. At 362, all sub-groups that are determined to pass the atomic group tests are identified and at 364 data is output for generation of a "device up" message for each atomic sub-group.

The non-atomic sub-groups remaining up to this point are then further sub-divided based on whether their pulses correspond to named or unnamed devices. For the sub-group of named devices, the pulse records are further sub-divided by MAC address or other device at 366 and at 368 data is output for generation of a "device up" message for each of sub-groups that are atomic, i.e., made up of pulse records with the same MAC address or other device record. For sub-groups of unnamed pulses, the sub-groups are further partitioned and subjected to atomic group tests in order, at 369 by: RF bandwidth, then modulation type, then data rate and then by power. Data for each of the atomic sub-groups resulting from partitioning at 369 is output for generation of a "device up" message.

Figure 8:
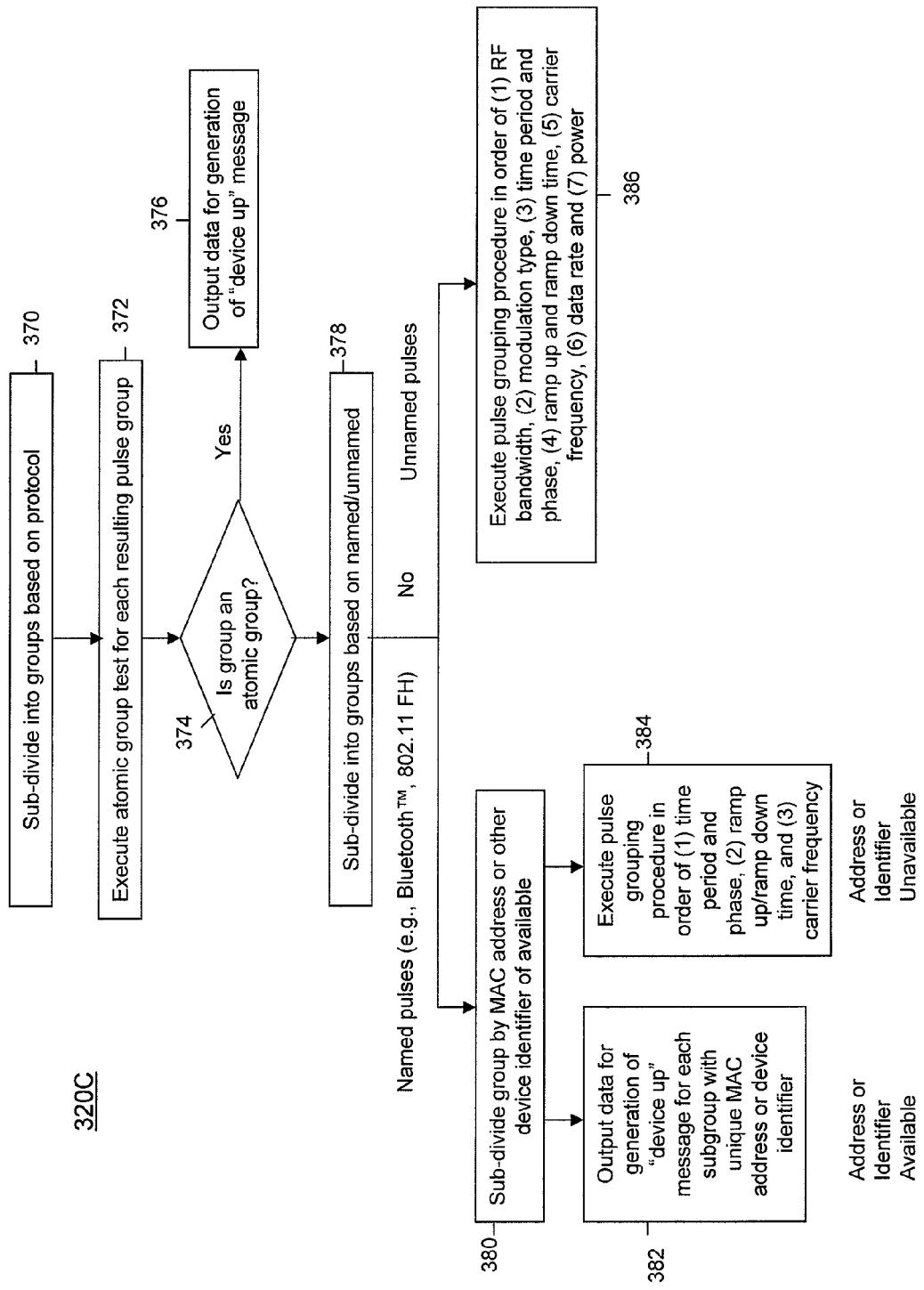
FIG. 8 is a flow chart depicting a pulse grouping technique for burst type pulses according to an embodiment of the present invention.

Referring now to FIG. 8, with continued reference to FIG. 4, the pulse partitioning process 320C for burst type pulses is now described. At 370, the group of burst type pulse records are sub-divided into subgroups based on protocol. The resulting groups are then subjected to the atomic group tests for burst type pulses that are described above. At 374, any sub-groups that are determined to pass the atomic group tests are identified and at 376, data is output for generation of a "device up" message. The non-atomic subgroups are sub-divided by named/unnamed at 378. Then, at 380, the subgroup of named pulse records are sub-divided by MAC address or device identifier if available and at 382 data is output for generation of a "device up" message for each subgroup of pulse records having a unique MAC address or device identifier. Those pulse subgroups for which a MAC address or device identifier are not available are subjected to further partitioning and atomic group test analysis at 384 in order of the time period and phase pulse metric, then ramp up/ramp down time pulse metric and then the carrier frequency pulse metric. Data for each of the atomic sub-groups resulting from partitioning at 384 is output for generation of a "device up" message.

In the flow charts describe above, when pulse records are to be grouped by time period and phase, it should be understood that synchronous pulses are grouped by time period and phase, and non-synchronous pulses are kept in one group. Further, when pulse records are to be grouped by carrier frequency, fixed frequency pulse records are grouped by their carrier frequency and sub-grouped by their carrier frequency error; frequency hopping pulse records are grouped first by their channelization scheme (start, stop and step frequencies) and then by their carrier frequency error. Thus, two devices with the same nominal frequency hopset may be differentiated by small differences in their start frequencies.

Figure 9:
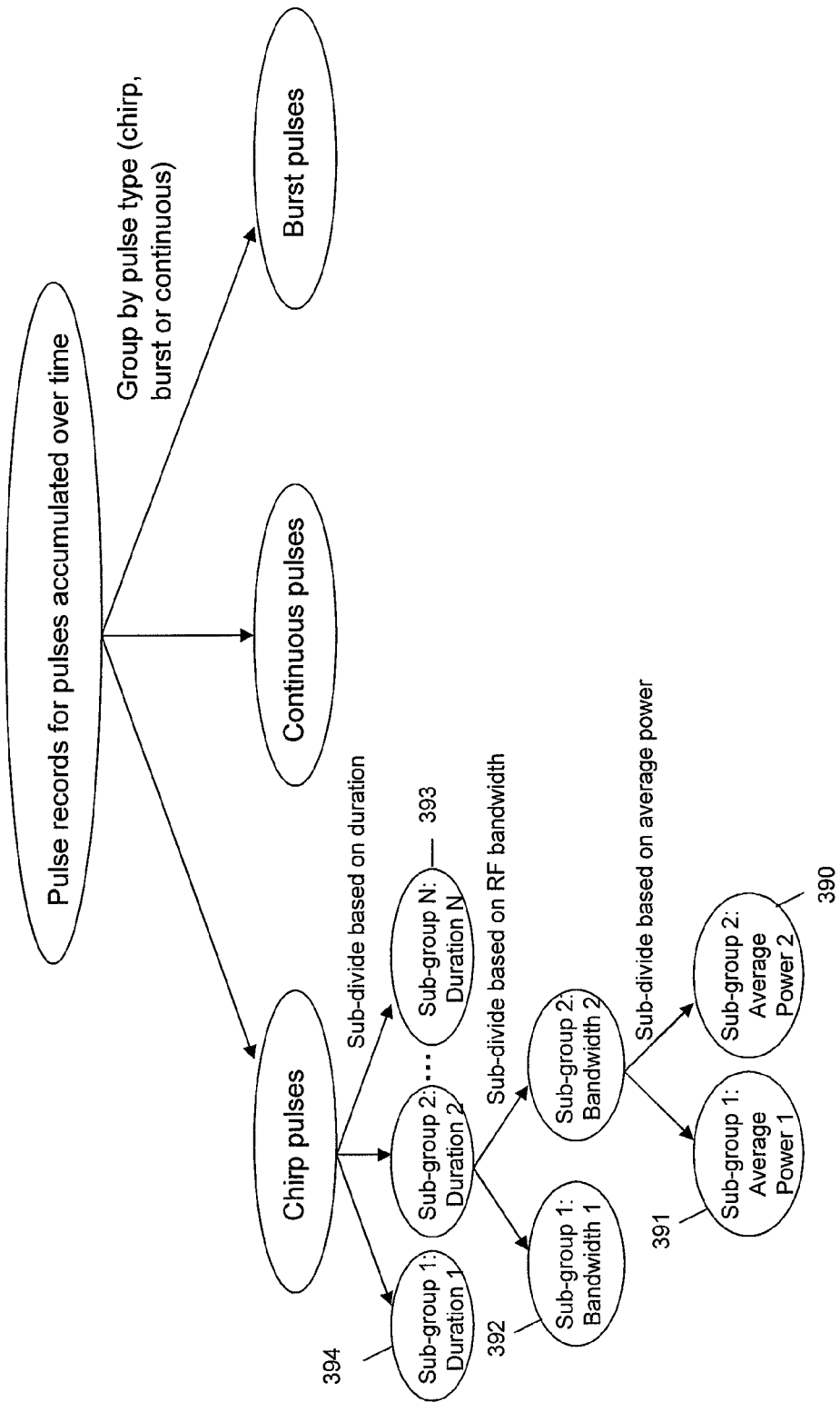
FIG. 9 is a diagram depicting yet another paradigm for the pulse grouping technique according to the embodiments of the present invention.
Figure 10C:
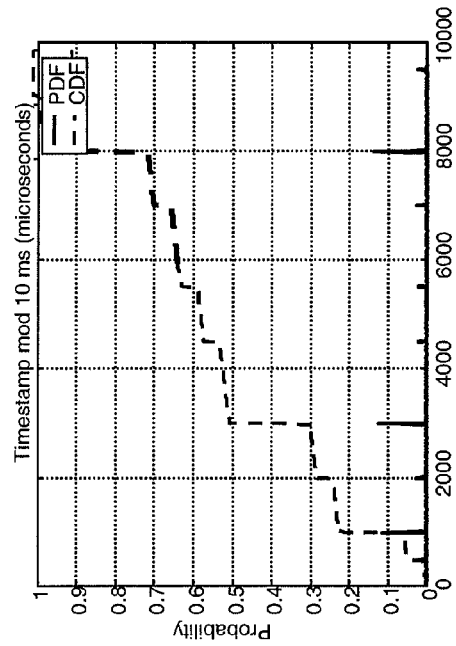
FIGS. 10A, 10B, 10C and 10D are plots for histograms of cumulative distribution functions and probability density functions for exemplary pulse metrics computed for a simulation to demonstrate aspects of the present invention.
Figure 10D:
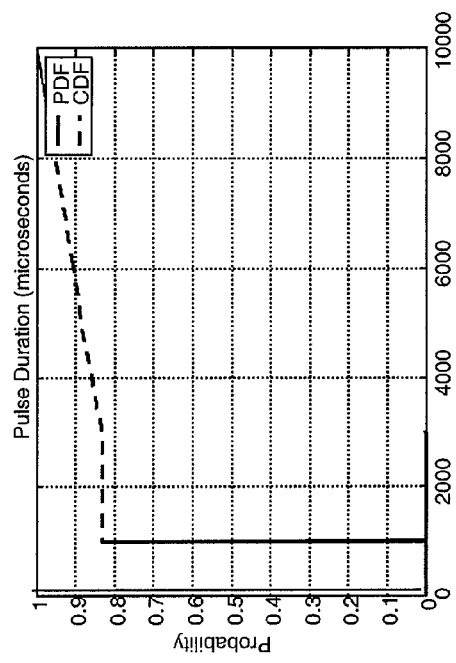
Figure 10A:
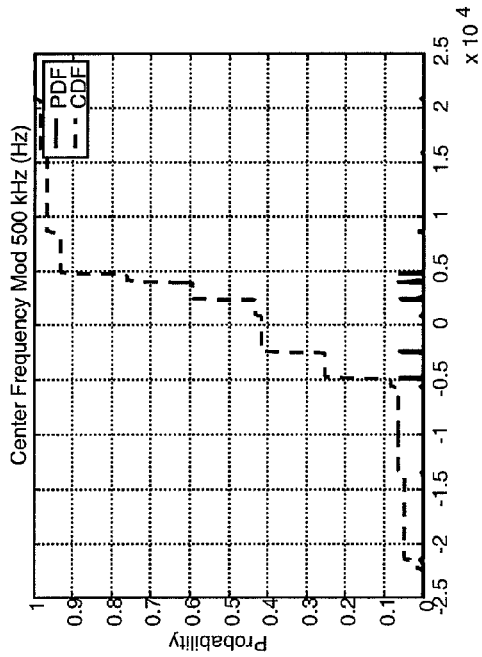
Figure 10B:
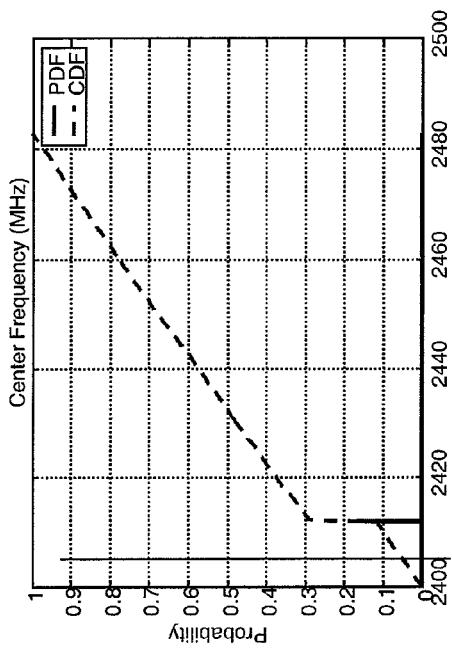
Figure 11C:
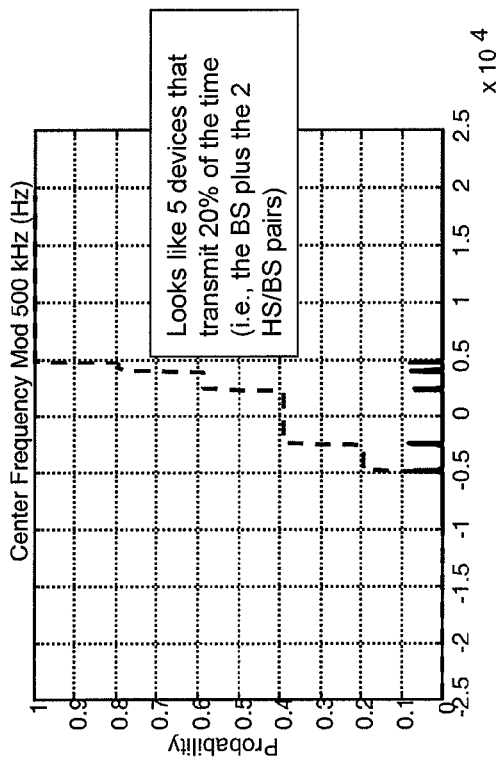
FIGS. 11A, 11B, 11C and 11D are plots for histograms of pulses in the simulation depicted in FIGS. 10A-10D, but sorted by a particular pulse duration.
Figure 11D:
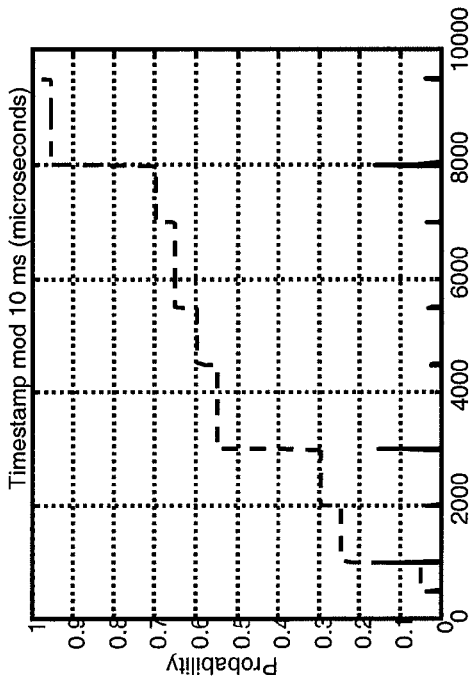
Figure 11A:
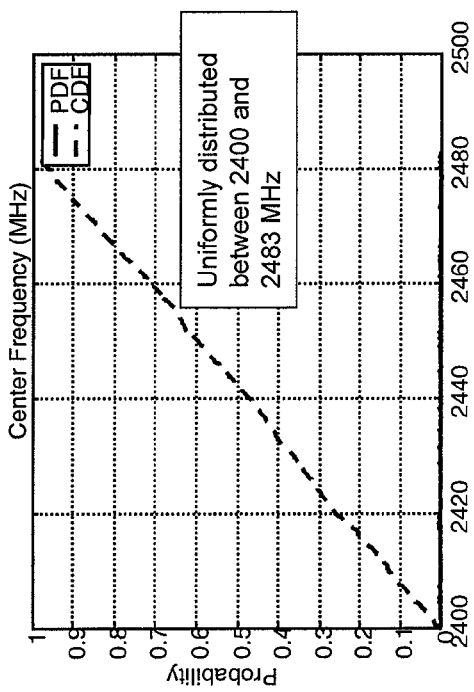
Figure 11B:
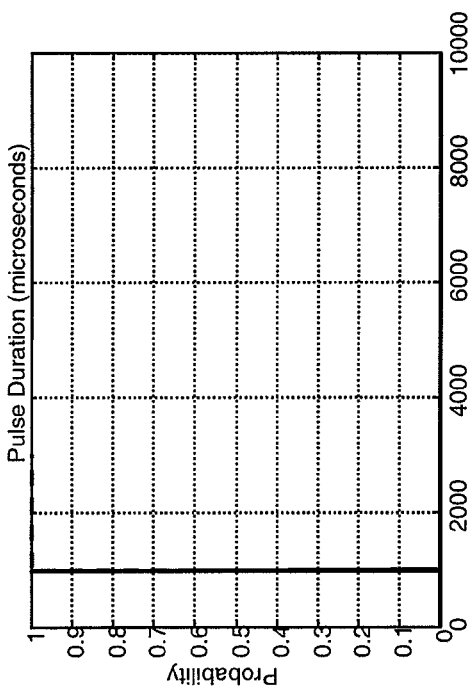
Figure 12C:
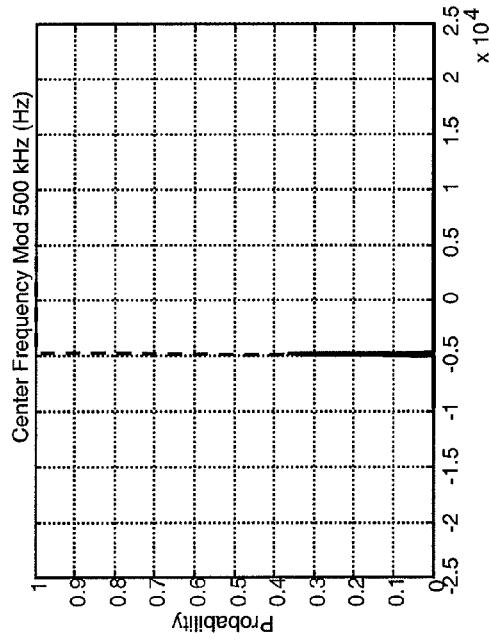
FIGS. 12A, 12B, 12C and 12D are plots for histograms of pulses in the simulation depicted in FIGS. 10A-10D, but sorted by carrier frequency (error).
Figure 12D:
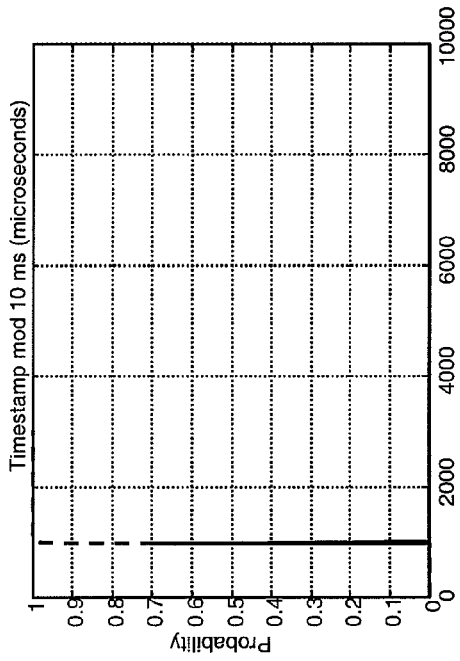
Figure 12A:
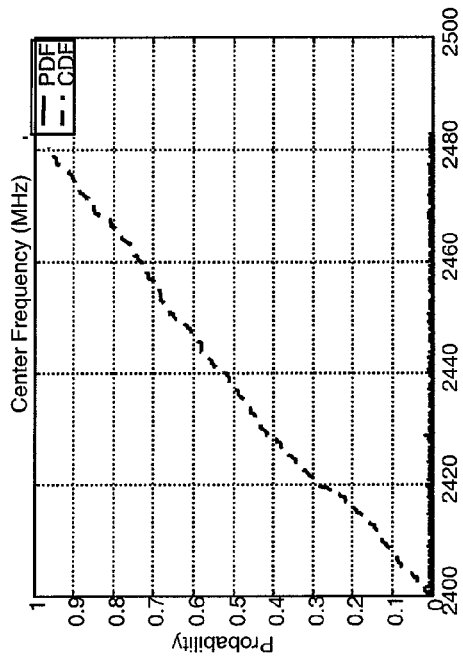
Figure 12B:
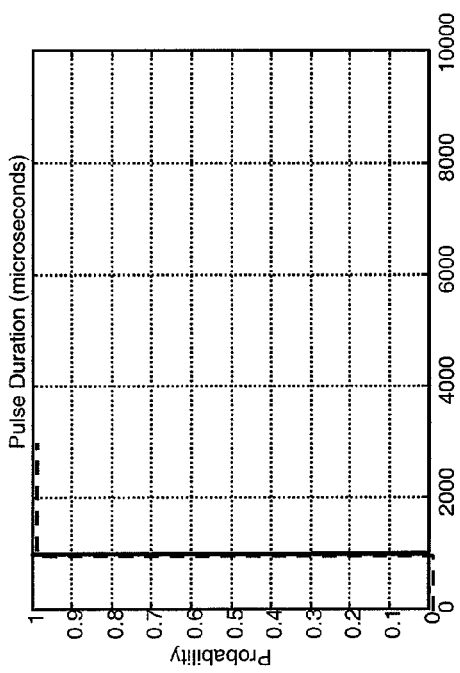
Figure 13C:
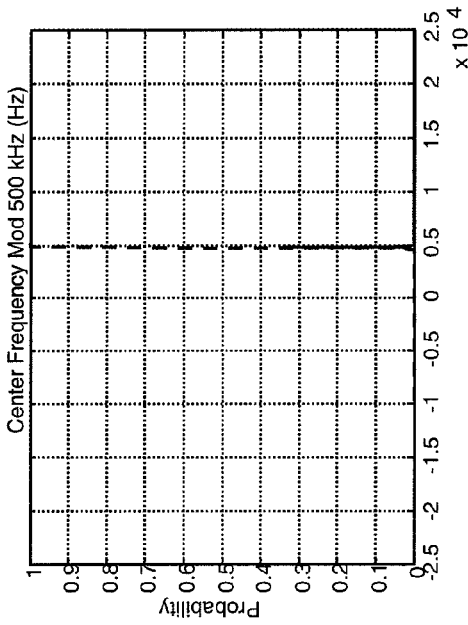
FIGS. 13A, 13B, 13C and 13D are plots for histograms of pulses for a particular source of pulses in the simulation depicted in FIGS. 10A-10D.
Figure 13D:
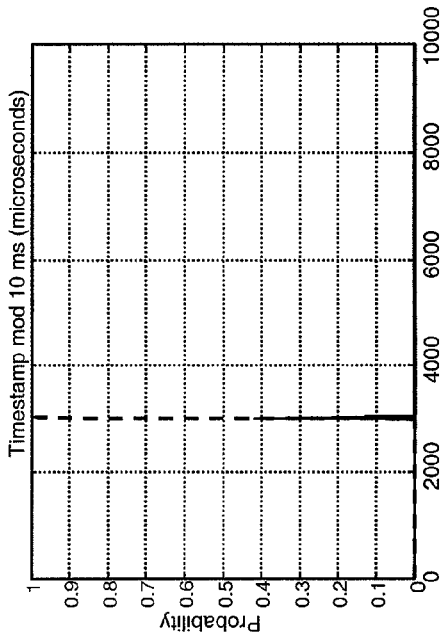
Figure 13A:
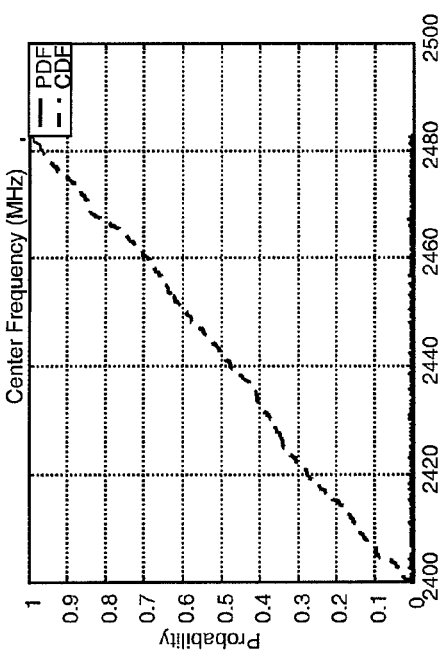
Figure 13B:
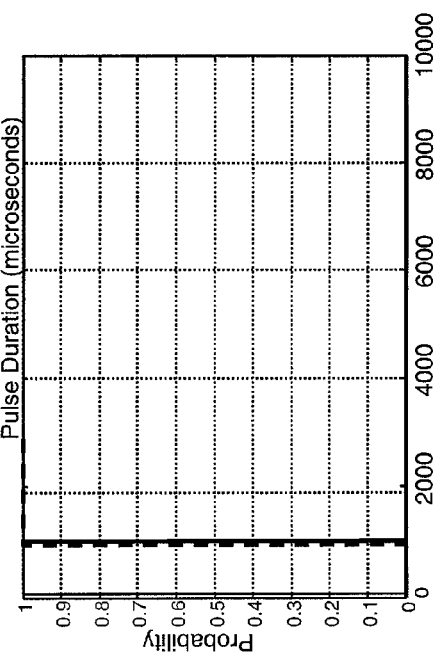
Figure 14A:
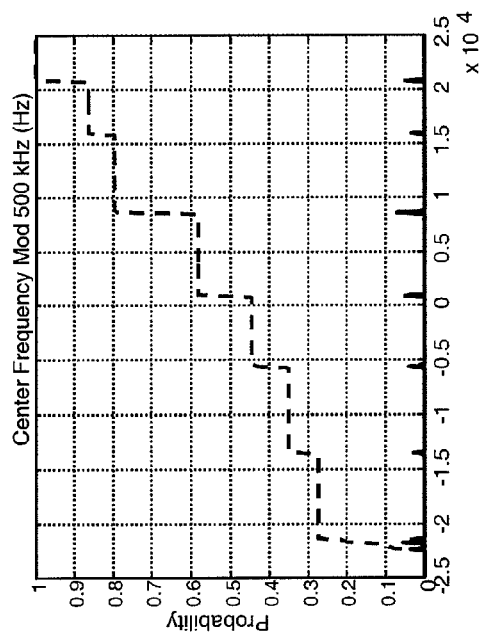
FIGS. 14A, 14B, 14C and 14D are plots for histograms of pulses did not fall within the grouping by pulse duration represented by the plots in FIGS. 11A-11D.
Figure 14C:
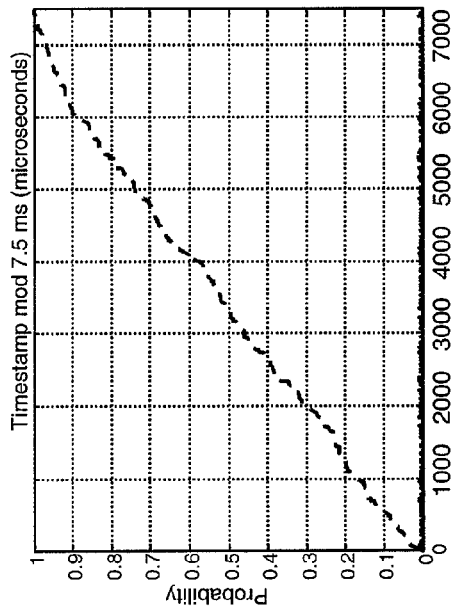
Figure 14B:
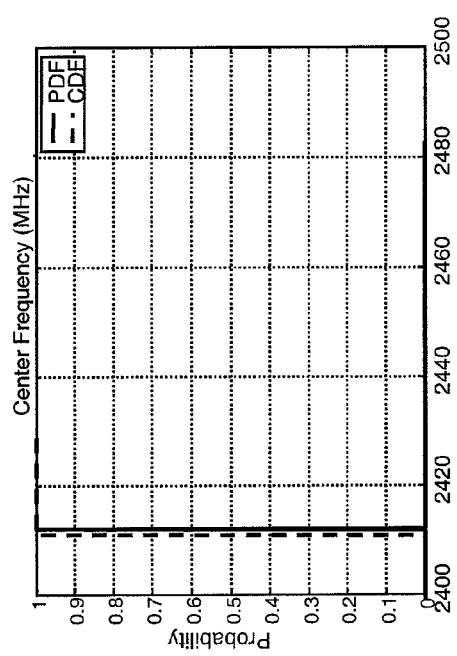
Figure 14D:
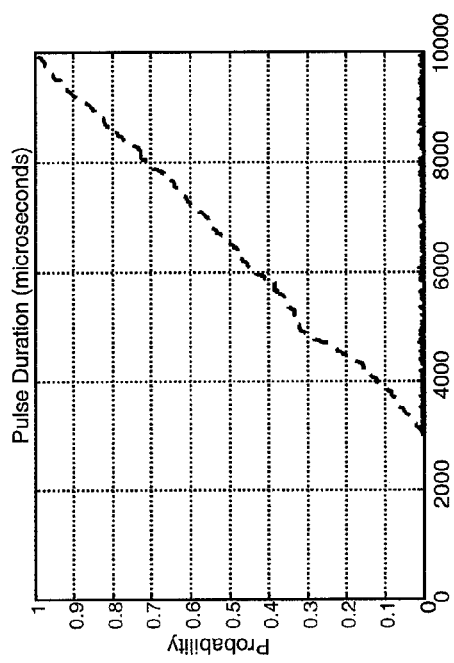

FIG. 9 illustrates yet another paradigm whereby pulse records accumulated over time for pulses are grouped as described above in connection with FIGS. 4-8. In this example, it is assumed that there are only chirp type pulses. The pulse sub-groups at reference numerals 390-394 are atomic groups because they meet the criteria for an atomic pulse group (for chirp type pulses) and are therefore not further subdivided.

Consider still another example where pulse records are accumulated for the following pulses:

1. Continuous pulses at 2431 MHz
2. Bluetooth pulses from a BT handset
3. Unnamed frequency-hopped GFSK pulses A valid set of pulse grouping traversals through the tree-like diagram on FIG. 4 for this example is:

Continuous pulses at 2431 MHz: Pulse type, Continuous, Carrier frequency.

Bluetooth pulses: Pulse type, Burst, Protocol, Bluetooth, MAC address available.

Unnamed frequency-hopped GFSK pulses: Pulse type, Burst, Protocol, Unnamed, RF Bandwidth, Modulation type, Time period and phase.

Further Examples of Pulse Grouping Procedures

Suppose the following unnamed devices are present.

A. 5 isochronous FHSS devices, comprising:
   2 FHSS Handset (HS)/Base station (BS) pairs with the following characteristics:
      Carrier frequency uniformly distributed among 2.4 GHz channels 1 and 83;
      All 4 devices use 1.0 Mbps 2-GFSK modulation;
      All 4 devices have a 1.0 ms transmit burst; and
      Pair #1 uses a 10 ms frame period; pair #2 has a 7.5 ms frame period.
   1 FHSS BS with the following characteristics:
      Carrier frequency uniformly distributed among 2.4 GHz channels 1 and 83;
      1.0 Mbps 2-GFSK modulation;
      1.0 ms transmit burst; and
      10 ms frame period.

B. Fixed-frequency narrowband asynchronous carrier sense multiple access (CSMA) data network with the following characteristics:
   10 devices;
   1.0 Mbps 2-GFSK modulation;
   Burst duration: uniformly distributed between 3 and 10 ms; and
   Burst gap: uniformly distributed between 1 and 11 ms.

For the purposes of this example, it is assumed that all of the above devices have the same average received signal strength, identical ramp up/down characteristics, and they have randomly assigned carrier and clock frequency errors from their nominal frequencies (normal distribution, 7.5 ppm standard deviation).

A simulation was run using a Matlab script to generate pulse records one would expect to see after a 10 second duration for this example. The simulation randomly discarded 75% of all pulses to simulate a scanning receiver in a sensor. The simulated time stamp jitter standard deviation was 5 μs. The histograms for the probability density functions (PDFs) and cumulative distribution functions (CDFs) are shown in FIGS. 10A-10D for 1500 pulses records obtained during a 10 second measurement duration for the following pulse metrics: center frequency, carrier frequency error (which is just center frequency modulo 500 kHz, since all nominal carrier frequencies in this example are integer multiples of 500 kHz), pulse duration and pulse timing modulus. It is very difficult to determine the nature of the devices just by looking at the plots. This is where pulse grouping/sorting is performed.

To apply pulse grouping the four PDF plots are examined to determine the plot having the highest peak. In this case, the highest peak occurs in the pulse duration PDF (83% probability at 1000 microseconds). FIGS. 11A-11D show the histograms for only those pulses that have pulse durations of 1000+/−25 microseconds (there are 1238 of these out of the original 1500 in the simulation).

Sorting the pulse records by duration helped somewhat but it is still difficult to determine the nature of the received energy. Additional grouping is performed. Next, one of the five peaks in the carrier frequency error PDF is the focus. FIGS. 12A-12D show the plots for the pulse records from the previous step that have a carrier frequency error within +/−200 Hz of −4825 Hz. There are 242 of these pulses in the simulation. Now we seem to have honed in on pulse records for a single device. From the statistics, one can conclude that there is a FHSS device that hops uniformly between 2400 and 2483 MHz, and transmits once per 10 ms at a timing phase of 1 ms modulo 10 ms, and with a fixed pulse duration of 1.0 ms. This turns out to be the unpaired FHSS base station and the plots for this device are shown in FIGS. 13A-13D. This process can be repeated for the remaining 4 peaks in the carrier frequency error PDF plot to find the remaining 4 FHSS devices.

The histograms for the remaining pulses (i.e., the original 1500 with all the FHSS pulses removed) are shown in FIGS. 14A-14D. There are about 250 of these pulses in the simulation. These figures reveal that 100% of the pulses occur at 2412 MHz, come from 9-10 different devices, are between 3 and 10 ms in duration, and do not appear to have any synchronicity or periodicity.

The pulse grouping approach described herein uses statistics based on relatively large batches of data, for example pulse data spanning as much as five to ten seconds, rather than small chunks (e.g., 35 ms), in order to group pulses for device identification/classification. As a result, this approach involves less time-critical processing. The only time-critical aspect of the approach occurs during pulse fingerprinting, not pulse sequence analysis. Moreover, essentially the same pulse grouping algorithm is invoked to identify all types of signals rather than multiple loosely related frameworks. This algorithm may identify certain "generic" devices that use a FHSS transmission protocol and devices that use an asynchronous time-division duplex (TDD) transmission protocol. Current signal identification approaches do not scale in order to detect these kinds of devices because they do not use enough pulse metrics. The use of such secondary pulse metrics as carrier frequency error, ramp-up/ramp-down time, etc., enable the algorithm to perform better in terms of detection time, false alarm rate, etc.

As shown in FIG. 1, there may be multiple sensor devices 5 each of which reports data to a central computing device 50. At the central computing device 50, a method may be invoked to determine when multiple sensors are receiving signals from the same device by measuring and tracking the pulse metric data generated from multiple sensors for the same pulses. The central computing device 50 may use device-specific pulse metrics (e.g., carrier frequency error, timing period and phase) that are sufficiently close to each other to conclude that the multiple sensors receiving signals from the same device. The probability that two or more devices (out of N devices) will have a carrier frequency error that falls within the same detection window, and thus be confused for the same device, is very low.

More generally speaking, the central computing device 50 may be used to clarify any ambiguity as to whether pulse metric data generated by two or more sensors are caused by the same or different devices. In this scenario, each sensor wherein receives RF energy, generates pulse metric data for pulses of RF energy, and partitions pulses into groups based on the pulse metric data. The central computing device 50 may transmit on a periodic or occasional basis a message to each of the sensors to synchronize them with respect to a common clock such that each sensor receives RF energy, generates pulse metric data and partitions pulse metric data with respect to a common clock. This allows the central computing device to look for similarities (within some tolerance) in the pulse metric data across multiple sensors for the same pulses in order to resolve whether certain pulses are for the same source device or different source devices. Alternatively, the sensor devices may operate with respect to their own clocks (without being synchronized) and the central computing device processes the pulse metric data that it receives from the plurality of sensor devices to adjust for offsets of system clocks among the plurality of sensor devices, and then makes its comparisons of the pulse metric data to look for similarities in order to resolve whether certain pulses are from the same source device, or different source devices.

The Synchronicity and Periodicity Pulse Metrics

A periodic transmitter emits data bursts every T seconds, where T is its transmit period. A synchronous transmitter transmits at (some but not necessarily all) integer multiples of a reference period T. We define the synchronicity of a sequence of pulses with timestamps $t_1, \ldots, t_N$ to be $$\min_T sdev\{(t_n/T+0.5) \bmod 1, n=1, \ldots, N\} \quad (1)$$

Synchronicity is expressed in terms of periods or ppm. The synchronicity measured for a truly synchronous transmitter is the RMS sum of the transmitter's RMS timing jitter and the RMS timing error in the sensor's pulse arrival time (i.e., time stamp) estimator. As an example, in one digital logic hardware implementation of the pulse detector circuit 124, the standard deviation is approximately about 12 µs at a clock frequency of 40 MHz. If the pulse detection function is performed by software rather than hardware, the standard deviation can be made to be approximately 5 µs or less. If transmitter happens to be a Bluetooth™ data device such as a mouse or a keyboard (T=625 µs) that has, say, 50 ns timing jitter on its transmit pulses, the measured synchronicity would be approximately $\sqrt{(0.05^2+5^2)}/625=0.8\%$.

The signal identification algorithms used herein will declare a sequence of pulses to be synchronous with synchronicity period $T_0$ and phase to if $T_0$ minimizes equation (1) with a synchronicity below a pre-determined threshold, where $$t_0 = \text{mean}\{t_n/T_0 \bmod 1, n=1, \ldots, N\}.$$

It can be shown that this definition yields maximum likelihood estimates for $t_0$ and $T_0$.

The periodicity of a sequence of pulses with timestamps $t_1, \ldots, t_N$ is defined as $$\max_{M \in \{1, 2, \ldots, \text{floor}(T/tN)\}} NMT \cdot p/t_N, \quad (2)$$

where p is the probability that the sensor device "sees" the pulses (i.e., the probability that the transmit pulse appears at the output of the sensor's baseband filter).

The signal identification algorithms used herein will declare a sequence of pulses to be periodic with period MT and phase $t_0$ if (a) it is determined to be synchronous with synchronicity period $T_0$, and (b) M maximizes equation (2) with periodicity that exceeds a pre-determined threshold (e.g., 0.9), where $t_0 = \text{mean}\{t_n/(MT_0) \bmod 1, n=1, \ldots, N\}$.

These equations are used by the pulse fingerprint analysis module 220 to compute the synchronicity pulse metric and periodicity pulse metrics. Recall that the synchronicity and periodicity pulse metrics are used in the atomic group tests referred to above. In addition, these pulse metrics are used when grouping pulses by time period and phase as described above.

Consider the following example. A Bluetooth (BT) device transmitting with the asynchronous control link (ACL) function transmits at times $t1_n = T1_0 \cdot M1_n + t1_0$, where $T1_0$ is nominally 625 µs, $M1_n$ is an increasing (but usually not sequentially) sequence of integers starting at $M1_0=0$, $M1_n$, n=1, 2, ... are relatively prime, and $t1_0$ is the transmit time of the first pulse. The packets captured in a sensor with a scanning receiver for this device will have timestamps $r_n = T_0 \cdot M_n + t_0 + v_n$, where $T_0$ and $t_0$ are the measured period and phase using the sensor's time reference, $v_n$ is the measurement noise of the time stamp algorithm used in the pulse detector circuit 124 (modeled as real, zero mean additive white Gaussian noise (AWGN)), and $M_n$ is a subset of $M1_n$ to account for the asynchronous scanning of the sensor and BT device.

Figure 15:
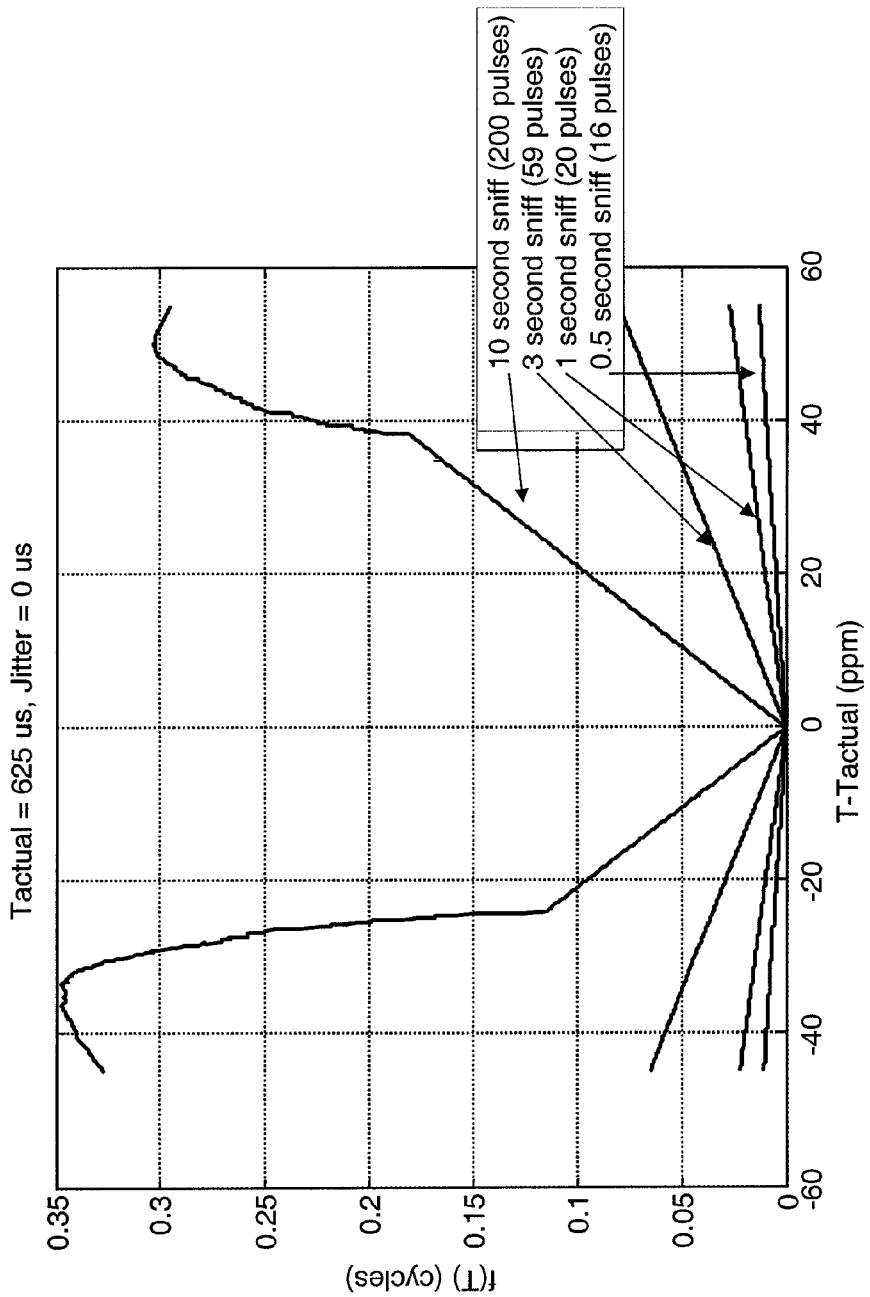
FIG. 15 illustrates a plot showing a synchronicity pulse metric versus synchronicity period for a simulation where the sensor uses a scanning receiver.

Consider the following assumptions for purposes of explaining how synchronicity and periodicity are used to identify devices for this example. The clock drift between the BT device and the sensor receiver is approximately 2.1 ppm. The BT device randomly decides to transmit every 2.625 µs with probability 0.25. The sensor can detect pulses from the BT device with probability 10% since the sensor has a scanning receiver. A Matlab simulation was used to generate pulse records for the above scenario, and to compute and display various statistics. FIG. 15 illustrates a plot of $f(T) = sdev\{t_n/T+0.5 \bmod 1, n=1, \ldots, N\}$ vs. candidate synchronicity period T for various capture lengths. No timestamp jitter was used in this case. Note that the steepness of the null in the plot increases with increasing capture time.

Figure 16:
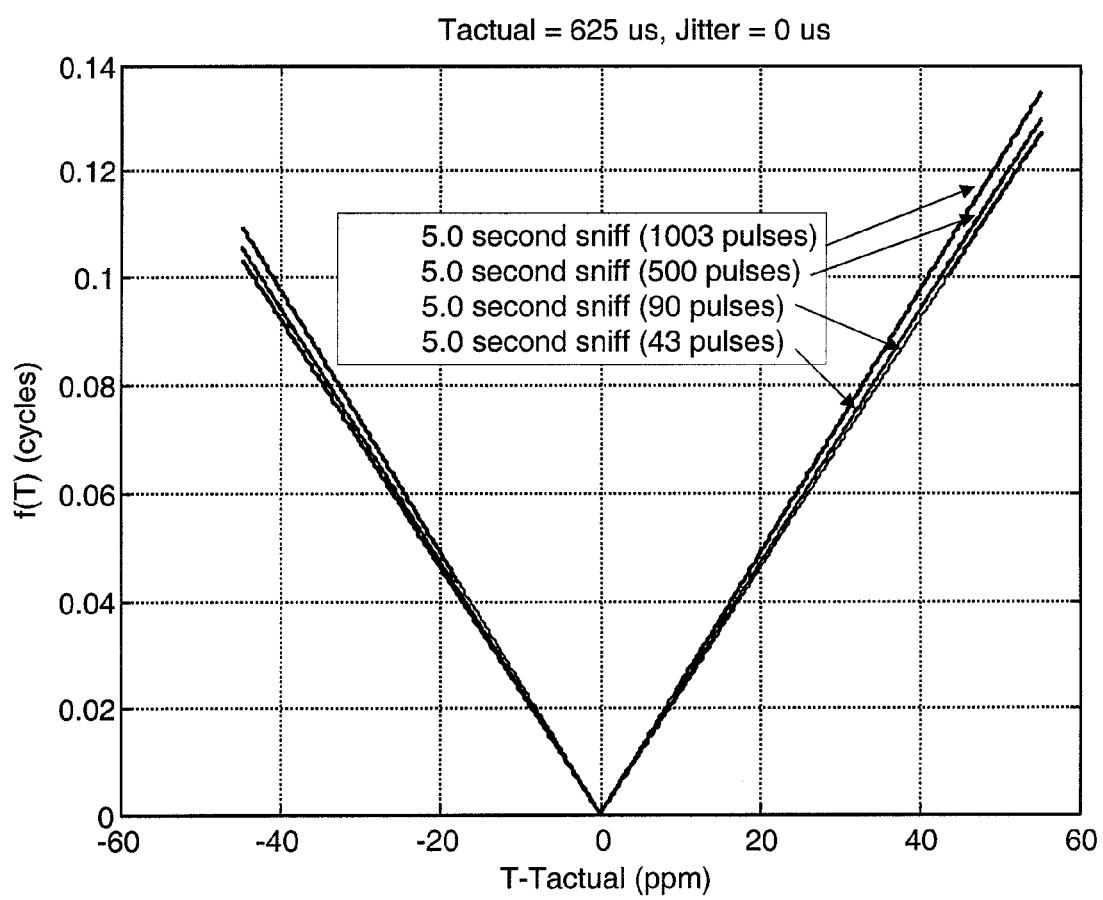
FIG. 16 illustrates a plot showing a synchronicity pulse metric for the simulation of FIG. 15, but where the sensor detects more of the pulses than in the case of the plots in FIG. 15.

FIG. 16 illustrates a plot of f(T) if the sensor could detect more pulses from a BT device, e.g., 50% of the BT pulses instead of 10%. FIG. 16 shows that detecting more pulses achieves very little improvement in terms of shape, but more pulses improves noise averaging of time stamp jitter. The shape of the plot f(T) depends only on the time duration of the experiment divided by the sync period, i.e., f(T) vs. T looks the same when (tN−t1)/T=constant. The plot for f(T) only has a sharp minimum when the timestamps $t_n$ are taken from a truly synchronous signal from one device. In all other cases, e.g., multiple devices that are synchronized and out of phase, nominally synchronized and slowly drifting asynchronous devices, etc., the min f(T) is a approximately a quarter of a period (much higher than for a synchronous source).

Figure 17:
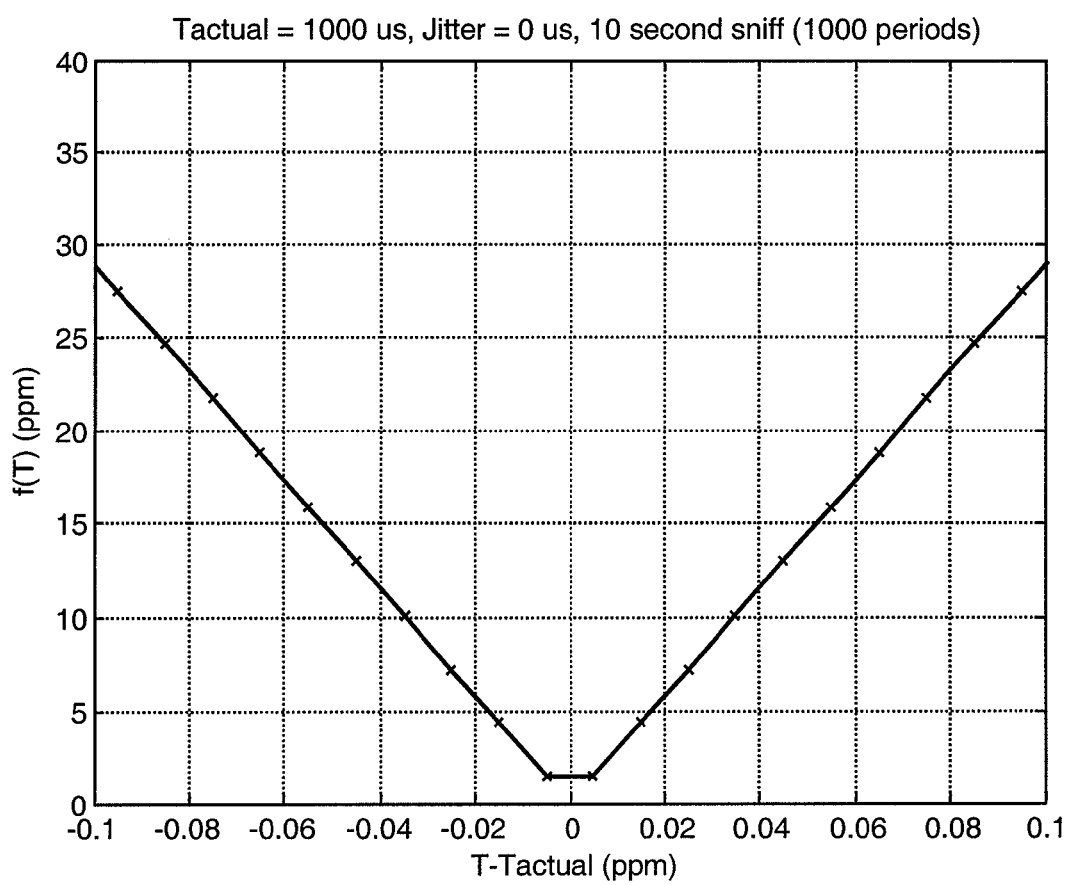
FIG. 17 illustrates a plot for a synchronicity pulse metric according to a simulation example.

Approximately 0.1 ppm measurement accuracy on the sync period is needed to discriminate between different devices, or to determine whether multiple devices are time-synchronized. FIG. 17 shows a close-in plot of f(T) for $t_N − t_0 = 1000T$. This plot suggests that the jitter variance (after averaging) needs to be significantly less than 30 ppm in order to reliably find the true minimum of f(T) within +/−0.1 ppm.

Figure 18A:
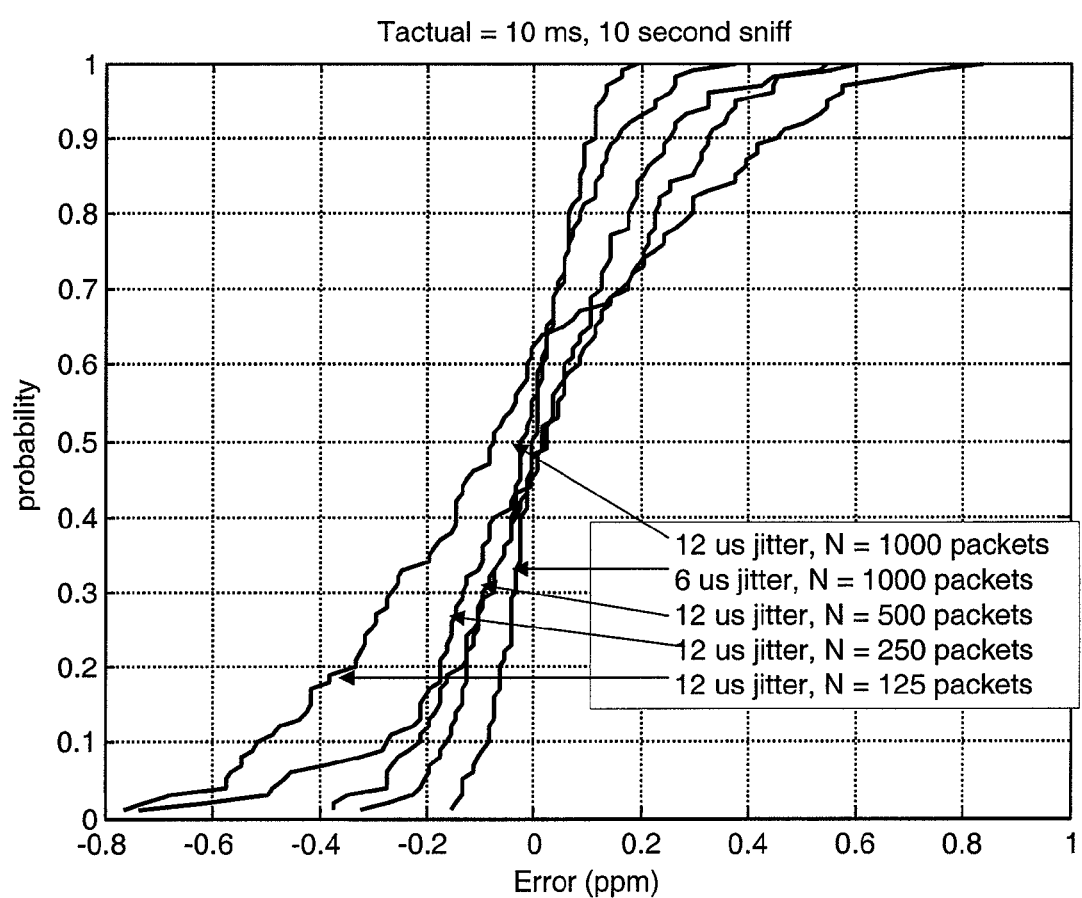
FIGS. 18A, 18B and 18C illustrate plots of histograms of a cumulative distribution function for the synchronicity period under different conditions of a simulation.
Figure 18B:
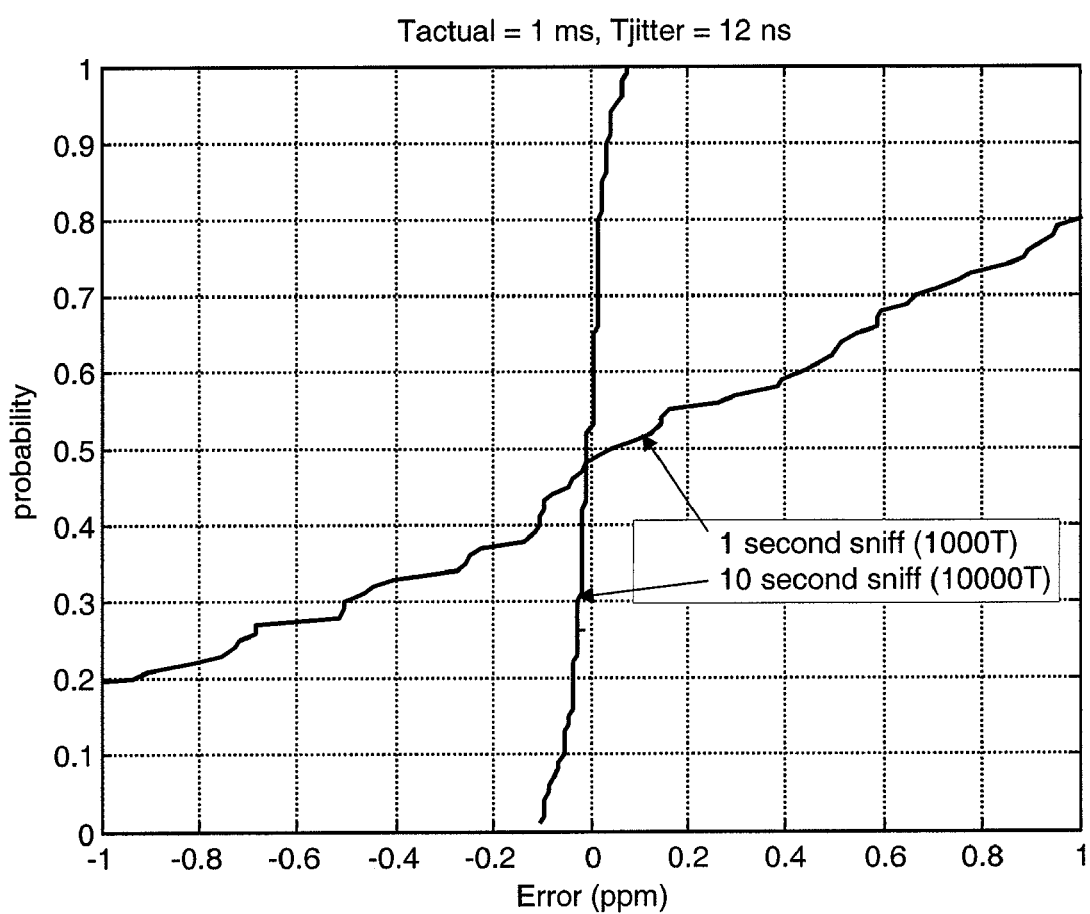
Figure 18C:
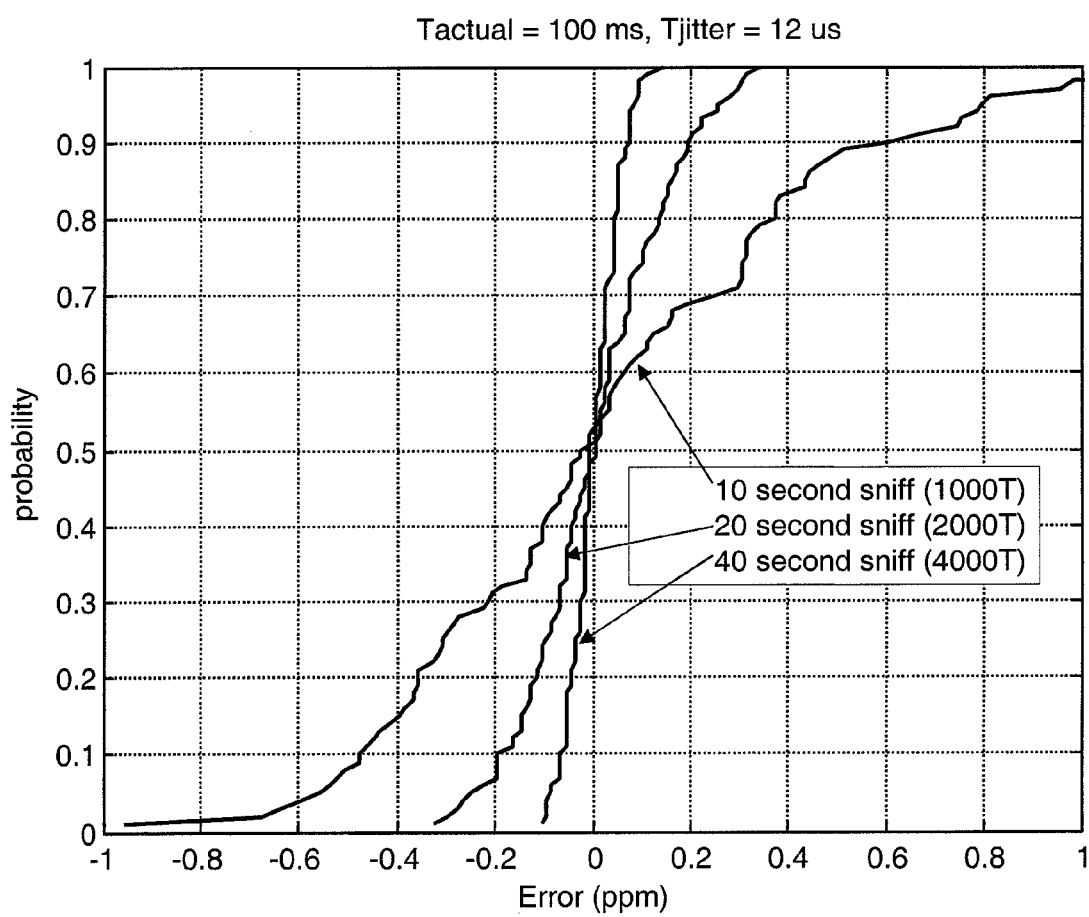

A simulation was run to characterize sync period estimation error for various sync periods and measurement durations. FIG. 18A shows a plot for the cumulative distribution function (CDF) for the sync period estimation error for Tactual=10 ms, $t_1 − t_N = 10$ seconds=1000·Tactual for (a) 12 µs time stamp jitter, (b) 6 µs time stamp jitter, (c) 12 µs time stamp jitter, the sensor sees 500 out of 1000 packets [sensor sees 1000 out of 1000 packets for (a) and (b)], (d) 12 µs time stamp jitter, the sensor sees 250 out of 1000 packets. FIG. 18B shows the CDF for Tactual=1 ms, 12 µs time stamp jitter, (a) $t_1 − t_N = 1$ seconds=1000·Tactual, (b) $t_1 − t_N = 10$ seconds=10,000·Tactual. FIG. 18C shows the CDF for Tactual=100 ms, 12 µs time stamp jitter, and $t_1 − t_N = 10$, 20 and 40 seconds.

Figure 19:
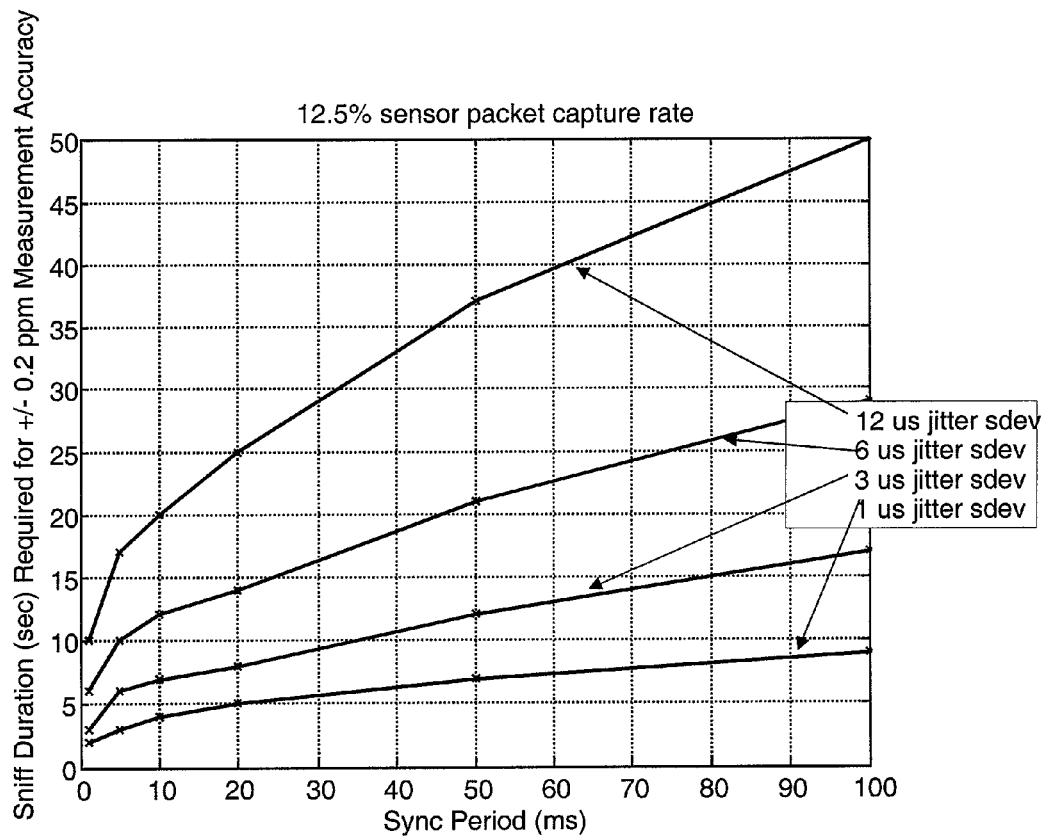
FIG. 19 illustrates a plot depicting a measurement duration for computing a suitable synchronicity period measurement according to an embodiment of the present invention.

The following observations about the sync period measurement error can be made based on the simulation results shown in FIGS. 18A-18C. The sync period measurement error appears Gaussian when the time stamp jitter is AWGN. The standard deviation (sdev) is inversely proportional to the time stamp jitter sdev, e.g., halving the jitter sdev halves the sync period error sdev. For a fixed measurement duration $t_N − t_1$, the sync period measurement error sdev is inversely proportional to the square root of N, the number of packets seen by the sensor. For example, if the sensor sees 4 times more packets in a measurement duration of 10 seconds, the error sdev will decrease by a factor of 2. The plot in FIG. 19 shows simulated measurement duration required to achieve +/−0.2 ppm with probability 90% for a 12.5% sensor packet capture rate, and various sync periods and jitter variances.

With reference back to FIGS. 2 and 3, the pulse sequence analysis module 230 may measure periodicity and/or synchronicity of pulses for purposes of identifying a source device of a received wireless signal, where the synchronicity and periodicity pulse metrics are used in the pulse grouping algorithm described herein. The pulse fingerprint analysis module 220 computes the arrival times (time stamps) of pulses that are detected by the pulse detector. Thus, according to a further embodiment of the present invention, a method is provided for identifying sources of wireless signals comprising storing data representing pulses of received RF energy; determining arrival times of the pulses; measuring periodicity and/or synchronicity of pulses represented by the data; and identifying a source of a wireless signal based thereon.

Pulse Metrics Based on Pulse Timestamps

According to another embodiment, a method is provided for identifying one or more synchronous or periodic wireless transmitters using only a sequence of timestamps for their transmissions. This pulse timestamp device identification technique may be used alone to identify a device from a batch of pulse records. Alternatively, the pulse timestamp metrics may be a subset of the pulse metrics in the pulse grouping algorithms described earlier to reduce the chance that pulse records for two or more devices are confused as the same device. There are two pulse metrics based on pulse timestamps: timing period and timing phase. Pulse records may be grouped and subgrouped based on these metrics assuming the pulses come from a periodic or synchronous device. In addition, timing period and timing phase may be used to separate periodic from aperiodic pulses. The timing period and timing phase pulse metrics are measured relative to a reference clock in the sensor. The pulse timestamp is also referred to herein as the start time of a pulse. The output of the pulse timestamp signal identification algorithm includes (1) the number of synchronous or periodic transmitter devices detected; (2) the period and phase for each device, (3) an indication of which devices are time division multiplexed on the same network(s).

More specifically, a sensor with a scanning receiver captures and fingerprints pulses from one or more wireless devices and generates a sequence of pulse records comprising timestamp pulse metrics (timing period and timing phase), and identifies: (1) the number of wireless transmitters; (2) whether each transmitter is synchronous or periodic; (3) the timing period and phase for the synchronous and periodic transmitters; (4) which synchronous/periodic transmitters are on the same network; and (5) which pulses are from one or more asynchronous devices.

Figure 20:
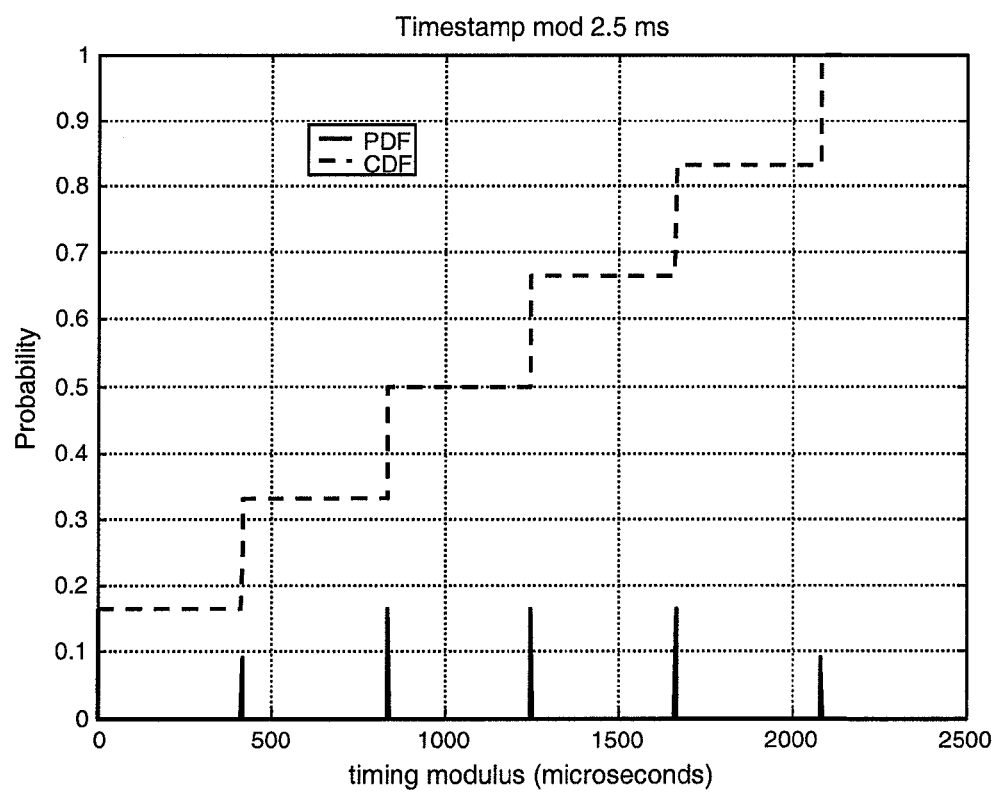
FIG. 20 illustrates plots for histograms of cumulative distribution functions and probability density functions for timestamp pulse metric for a simulation.

FIG. 20 illustrates plots for PDF and CDF for timestamps (modulo 2.5 ms) received from six devices using a Matlab simulation. The six devices are:

Device 1: Period 5 ms, phase 0 ms
Device 2: Period 5 ms, phase 0.4 ms
Device 3: Period 7.5 ms, phase 0.8 ms
Device 4: Period 7.5 ms, phase 1.25 ms
Device 5: Period 10 ms, phase 1.67 ms
Device 6: Period 10 ms, phase 2.1 ms The pulse timestamp approach is based on autocorrelation analysis. To begin with, an appropriate sampling rate is defined (fs=100 kHz in the simulations for the examples described herein), and a discrete time sequence x(n) is defined by placing impulses at the nearest sampling instants to each of the time stamps ts(k), i.e., $$x(n) = \sum_{k=1}^{N} \delta(n - \lfloor ts_k / T + 0.5 \rfloor)$$

where T=1/fs is the sampling period. Next, an autocorrelation function is defined:

$$R(k) = \sum_{n=0}^{\infty} x(n+k) \cdot x(n)$$

Figure 21:
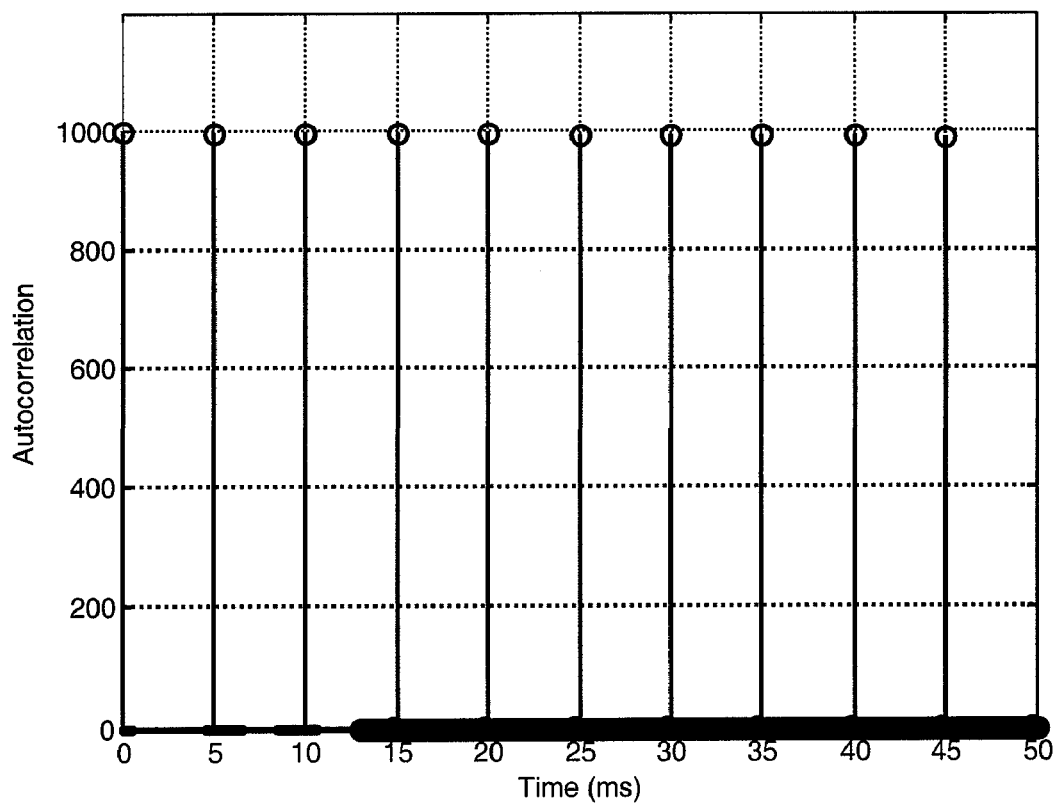
FIG. 21 illustrates a plot for an autocorrelation function derived from timestamps from a single source derived from a simulation.

FIG. 21 illustrates a plot for the autocorrelation function for x(n) when the timestamps are taken from a single device that transmits a pulse once per 5 ms. FIG. 21 shows that there is a harmonic structure to x(n), i.e., pulses at integer multiples of 5 ms.

Figure 22:
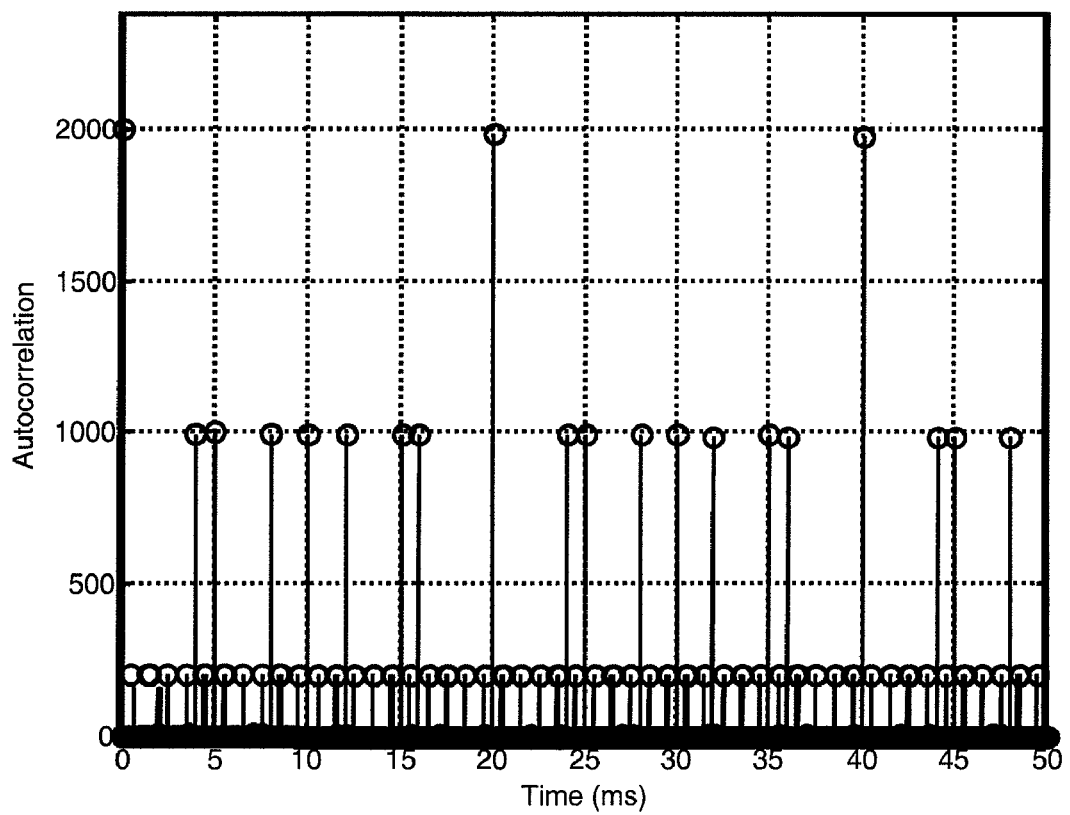
FIG. 22 illustrates a plot for an autocorrelation function derived from timestamps from two periodic sources derived from a simulation.

FIG. 22 shows a plot for the autocorrelation x(n) for two periodic transmitters, one with a pulse period of 5 ms, the other with a pulse period of 4 ms. The autocorrelation function in this case is the superposition of the 4 and 5 ms harmonic "combs".

Figure 23:
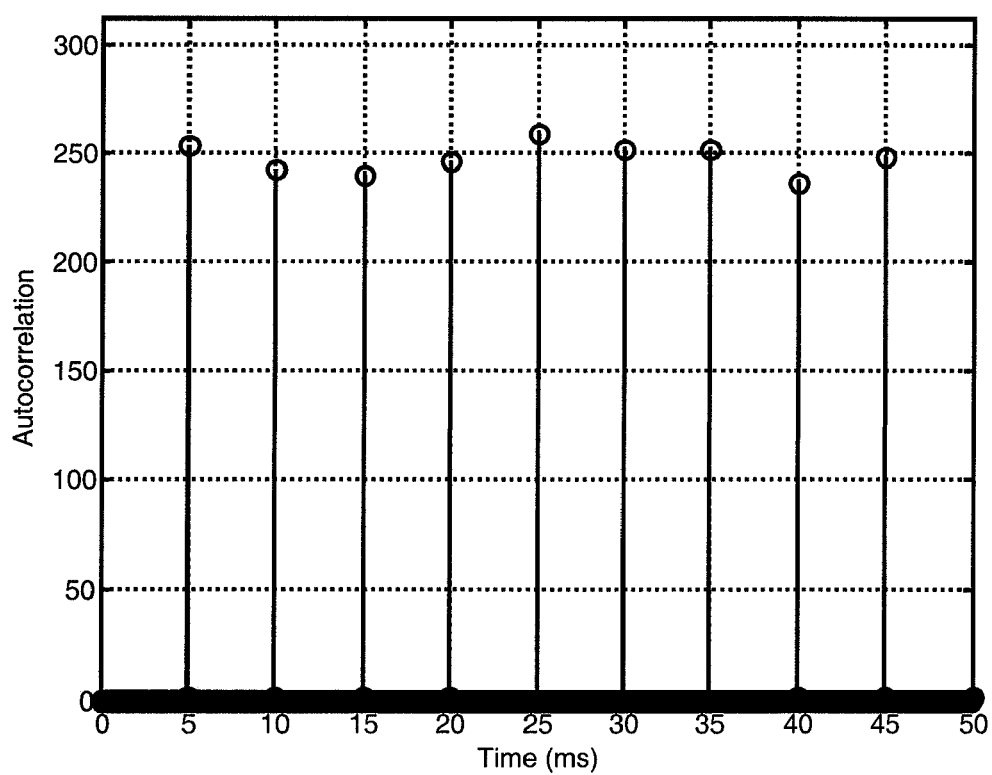
FIG. 23 illustrates a plot for an autocorrelation function derived from timestamps for a single source with pulses removed at randomly selected times from a simulation.

FIG. 23 illustrates a plot of the autocorrelation function for the single 5 ms transmitter when 50% of the pulses are removed at randomly selected times. This plot shows the impact on the autocorrelation function when not all of the pulses (e.g., due to a FH transmitter hopping outside of the sensor's stare band) transmitted by a device are detected. The harmonic structure remains, but the amplitudes have changed somewhat.

A new function Q(.) is defined to quantify the amount of synchronous activity at a candidate time period n or τ:

$$Q(n) = \prod_{k=1}^{M} |R(n \cdot k)|^{1/M} \quad \text{Discrete Time}$$

$$Q(\tau) = \prod_{k=1}^{M} |R(\lfloor k \cdot \tau / T + 0.5 \rfloor)|^{1/M} \quad \text{Continuous Time}$$

where M is some appropriate number of terms to use in the sum. Q(.) is a normalized product of harmonics of the autocorrelation values. The product structure is used to ensure that all the harmonics are present, i.e., Q(.) will be zero if even one harmonic is zero.

FIGS. 24A,24B through FIGS. 27A,27B illustrate plots for R(.) and Q(.) for several exemplary signals.

Figure 26A:
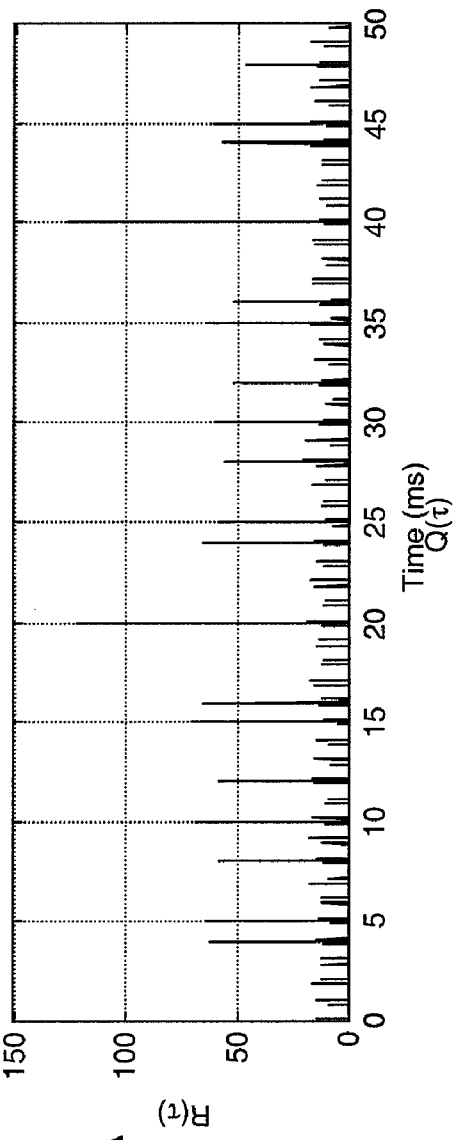
FIGS. 26A and 26B illustrate plots for $R(.)$ and $Q(.)$, respectively, for timestamps for the simulation of FIGS. 25A and 25B, but pulses removed to simulate a scanning receiver.
Figure 26B:
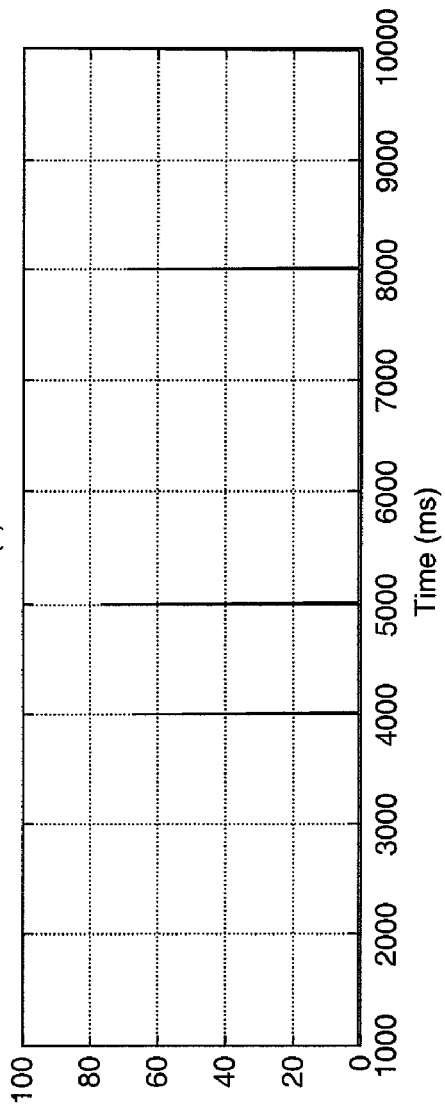
Figure 27A:
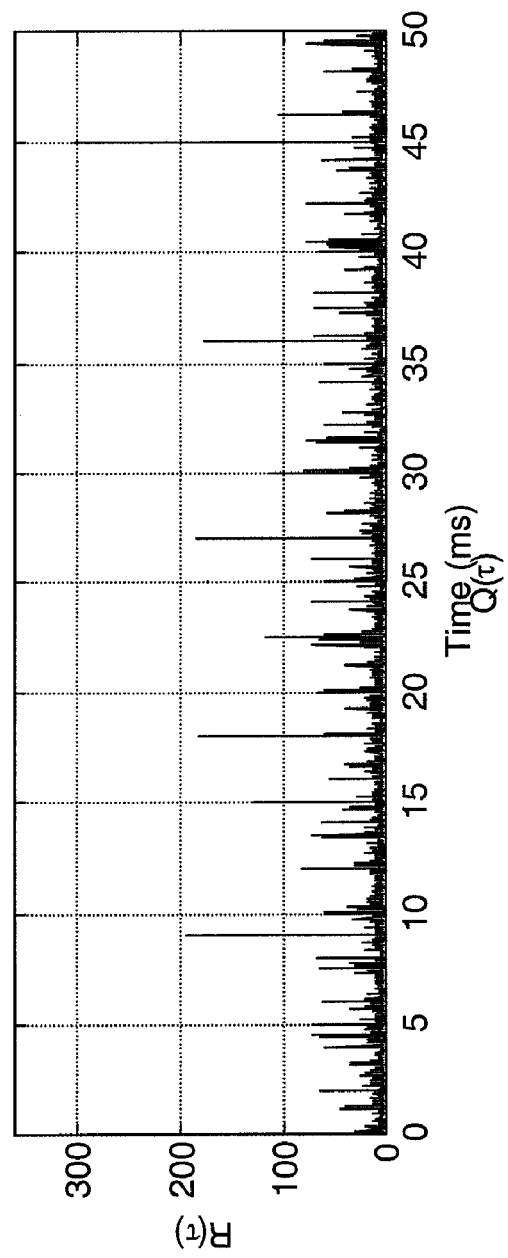
FIGS. 27A and 27B illustrate plots for $R(.)$ and $Q(.)$, respectively, for timestamps for a simulation of a sequence of pulses associated with seven wireless sources.
Figure 27B:
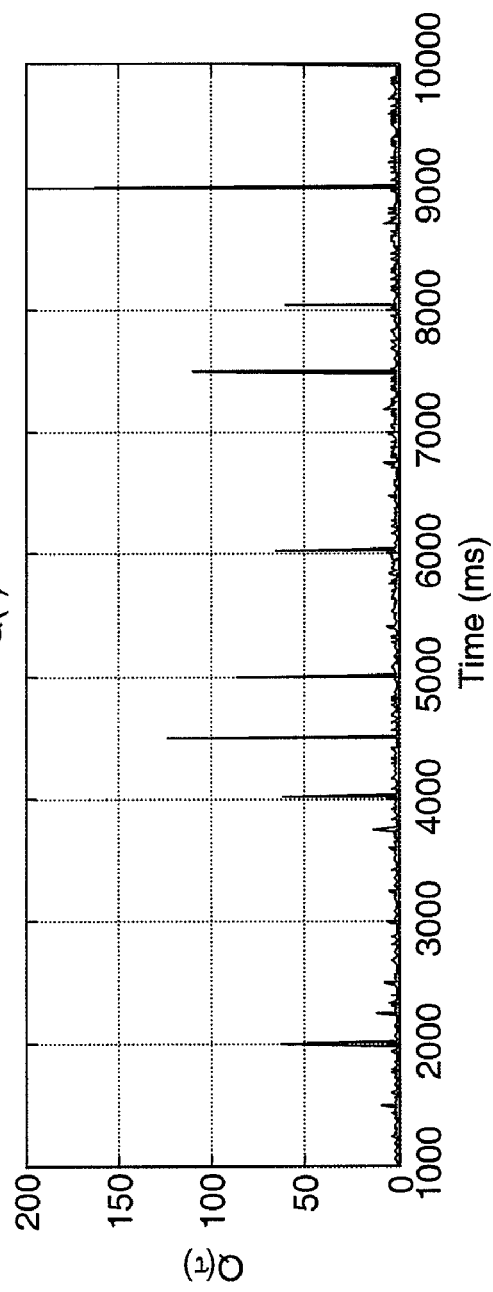

FIGS. 24A and 24B illustrate plots for R(.) and Q(.), respectively, for a single 5 ms periodic transmitter. Note that Q(.) has peaks not only at 5 ms, but at integer multiples of 5 ms. FIGS. 25A and 25B illustrate plots for R(.) and Q(.) for two periodic transmitters, with periods of 4 ms and 5 ms, respectively. FIGS. 26A and 26B illustrate plots for the two transmitter case when 75% of the pulses are removed in randomly selected positions to simulate a scanning receiver in a sensor. Note that Q(.) still has peaks at the 4 and 5 ms periods even after pulse removal. The next example shown in FIGS. 27A and 27B shows plots for R(.) and Q(.) in an extreme case. There are 7 transmitters: six are periodic with periods 2.01, 4.5, 5, 7.5, 9 and 9 ms, respectively, and randomly selected phases; the 7th transmitter transmits asynchronously, waiting between 1 and 9 ms (uniformly distributed) between consecutive transmissions. Also, 75% of the pulses are removed in randomly selected positions to simulate a scanning radio receiver in a sensor. Plots for R and Q are shown on the next slide. Note that even in the presence of asynchronous transmissions and randomly removed pulses, the Q(.) function still contains very accurate information about the signal periods present.

Now that the Q(.) function has been motivated and defined, a signal identification algorithm based on pulse timestamp data is defined. The Q(.) function is used to identify a set of candidate pulse periods for the received RF signals. Then, successive pulse filtering and histogram analysis are used to identify the number of devices and pulse phases for each candidate pulse period.

Figure 28:
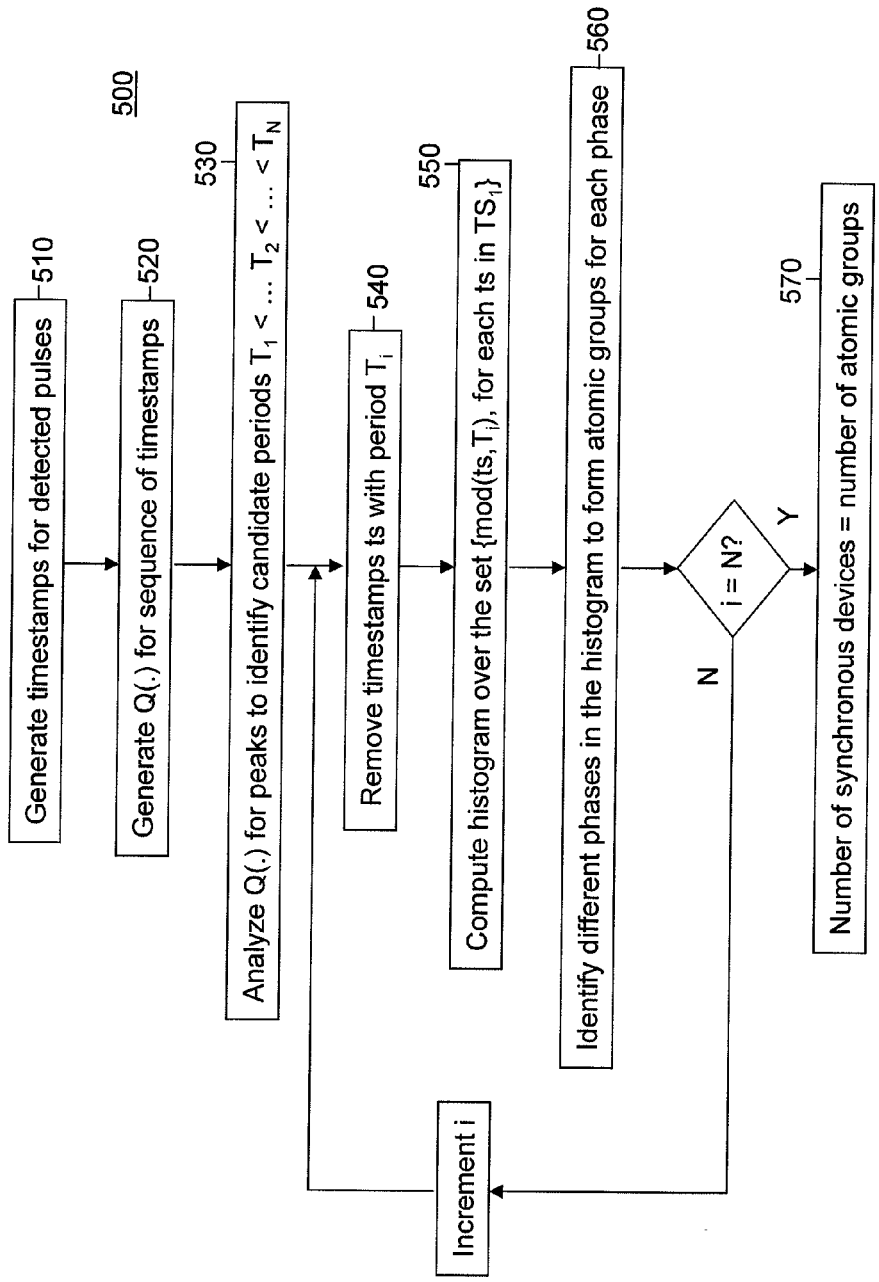
FIG. 28 is a flow chart illustrating a pulse timestamp analysis algorithm according to an embodiment of the present invention.

Turning to FIG. 28, the pulse timestamp analysis algorithm 500 is described in more detail. At 510, the pulse timestamps $ts_1, \ldots, ts_M$ generated by the pulse fingerprint module 220 (FIG. 2) for identified pulses of RF energy are stored in a buffer to await further processing. We will use TS to denote a first buffer that stores the set of timestamps that are being analyzed. Next, at 520 the Q(.) function is computed for the timestamps $ts_1, \ldots, ts_M$. The Q(.) function data is analyzed at 530 for peaks in order to identify candidate periods $T_1 < \ldots T_2 < \ldots < T_N$. The peaks correspond to the candidate periods. Appropriate thresholds for detecting peaks in Q(.) are assigned. Then, at 540, synchronous pulses with period $T_1$ are removed from the first buffer TS by noting which pulses line up (with each other) within a certain tolerance δ (such as δ=2.5 microseconds) after they are time shifted by period $T_1$. More precisely, any timestamp values $ts_i$ and $ts_j$ in the buffer TS satisfying $|ts_i - ts_j - T_1| < \delta$ are removed from the buffer and stored in a second buffer $TS_1$.

The next step is to further subdivide the timestamps in the second buffer $TS_1$ to identify different devices that transmit at different phases in the period $T_1$. To do so, at 550, a histogram is computed over the extracted timestamps stored in $TS_1$ modulo the period $T_1$ (i.e., the histogram is computed over the set {mod(ts,$T_1$), for each ts in $TS_1$}). At 560, the different phases are identified as peaks $p_1, \ldots, p_K$ in the histogram computed at 550 to form atomic groups $G_1, \ldots, G_K$ for each phase, where atomic groups are groups of pulses that appear to be received from a single source device as described above in connection with the pulse grouping algorithm 300 shown in FIG. 3. Specifically, for the kth atomic group $G_k$, k=1, ..., K, pulses having timestamp values ts satisfying $|\text{mod}(ts,T_1) - p_k| < \delta$ are removed from $TS_1$ and placed in a new buffer associated with $G_k$.

The above process of extracting synchronous pulses from the buffer TS and subdividing the extracted pulses by their phase is repeated for each remaining candidate period $T_2$, $T_3, \ldots, T_N$ as shown by the loop in FIG. 28. The number of synchronous source devices is simply the number of atomic groups that have been accumulated over iterations of the loop. Any timestamp values that remain in the buffer TS after this process is complete (because they were not grouped based a candidate period) are considered to be associated with pulses received from asynchronous source devices, and may or may not be further subdivided using other techniques (such as subdividing by carrier frequency) described herein.

Next, at 570, the number of synchronous devices is equal to the number of atomic groups determined at 560 over the iterations of the loop ($T_1$ to $T_N$). A set of devices are concluded to be in the same (time-synchronized) wireless network if they share the same pulse period (within some tolerance, e.g., +/−0.2 ppm), and their phases and pulse durations are offset such that their transmissions do not overlap in time.

Figure 30B:
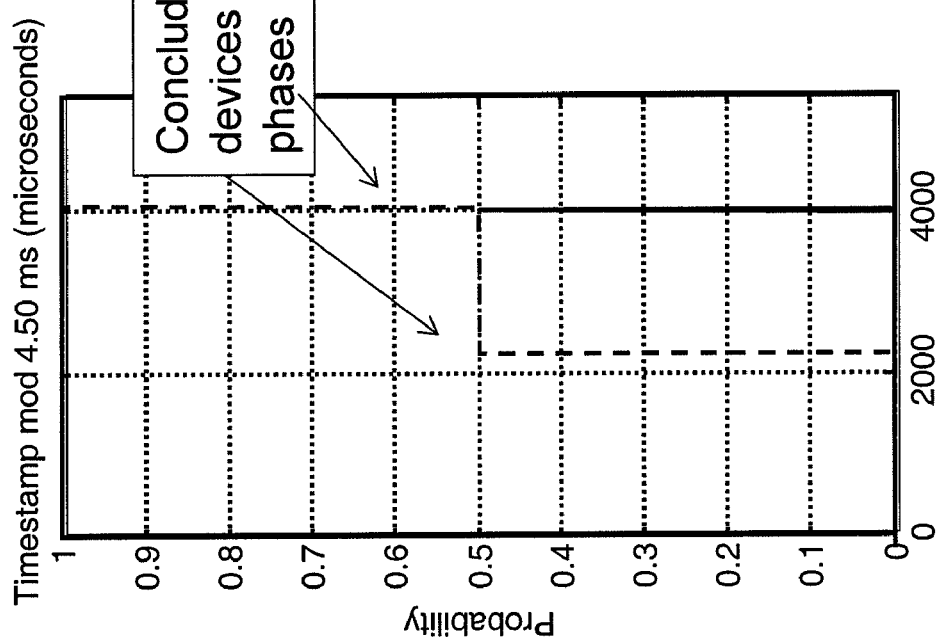
FIGS. 30A and 30B are plots for $Q(\tau)$ and a histogram of phases, respectively, generated at a second iteration in the course of the pulse timestamp analysis algorithm for the simulation of FIGS. 29A and 29B.
Figure 30A:
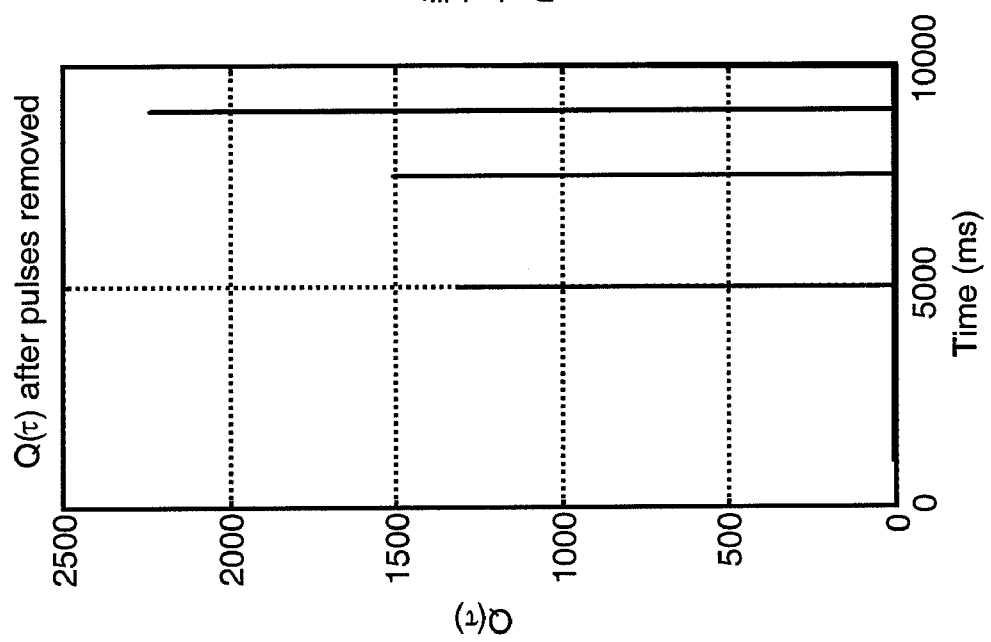
Figure 31B:
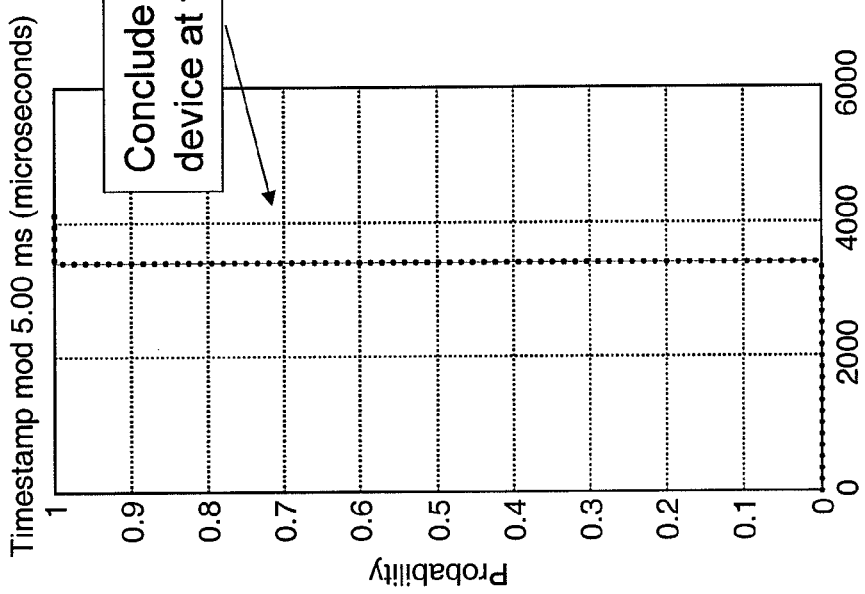
FIGS. 31A and 31B are plots for $Q(\tau)$ and a histogram of phases, respectively, generated at a third iteration in the course of the pulse timestamp analysis algorithm for the simulation of FIGS. 29A and 29B.
Figure 31A:
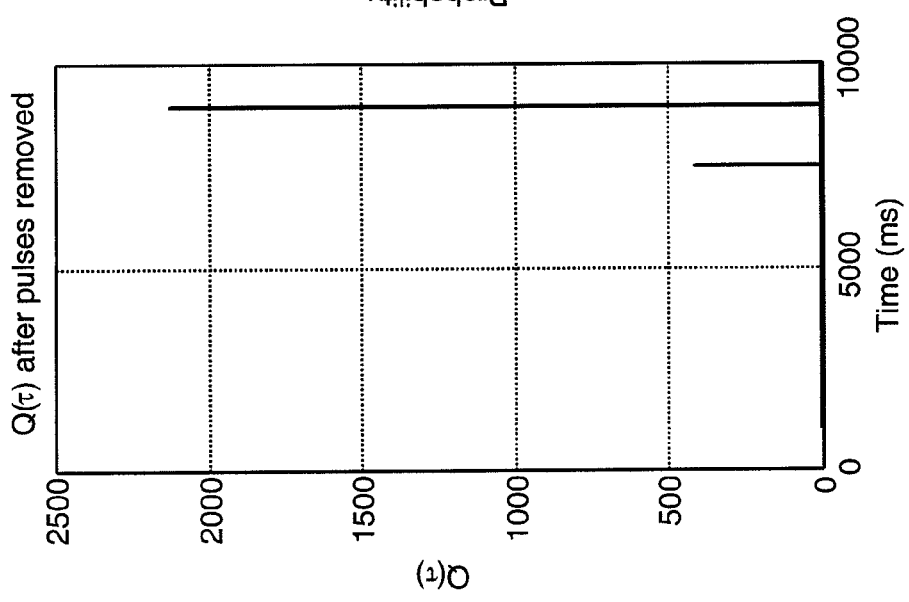
Figure 32B:
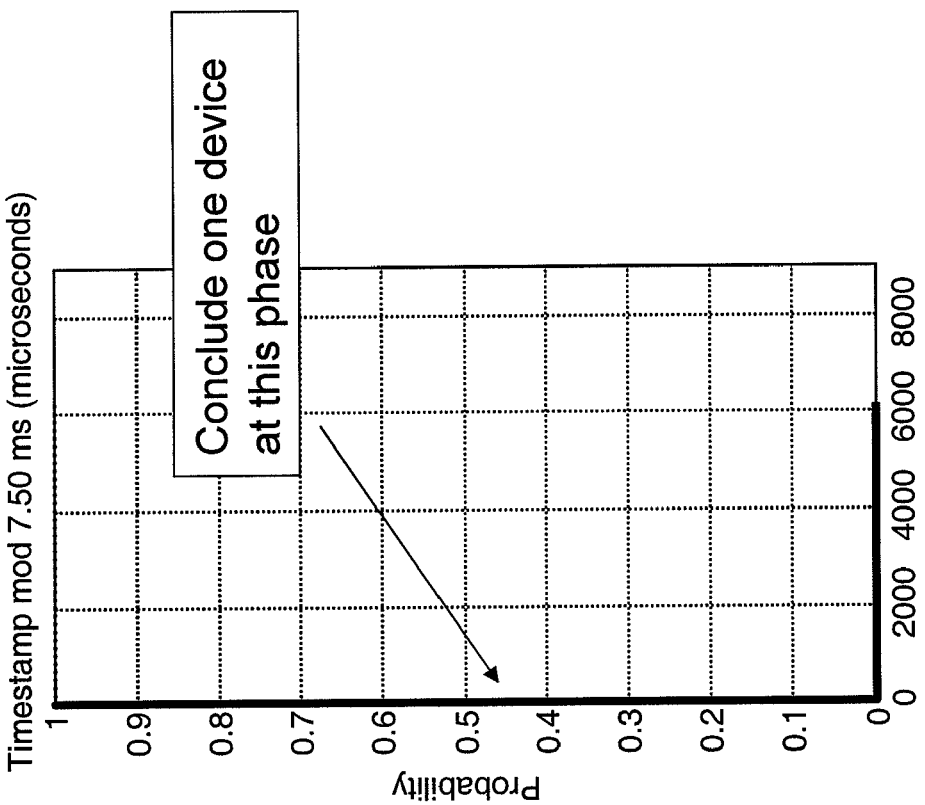
FIGS. 32A and 32B are plots for Q(τ) and a histogram of phases, respectively, generated at a fourth iteration in the course of the pulse timestamp analysis algorithm for the simulation of FIGS. 29A and 29B.
Figure 32A:
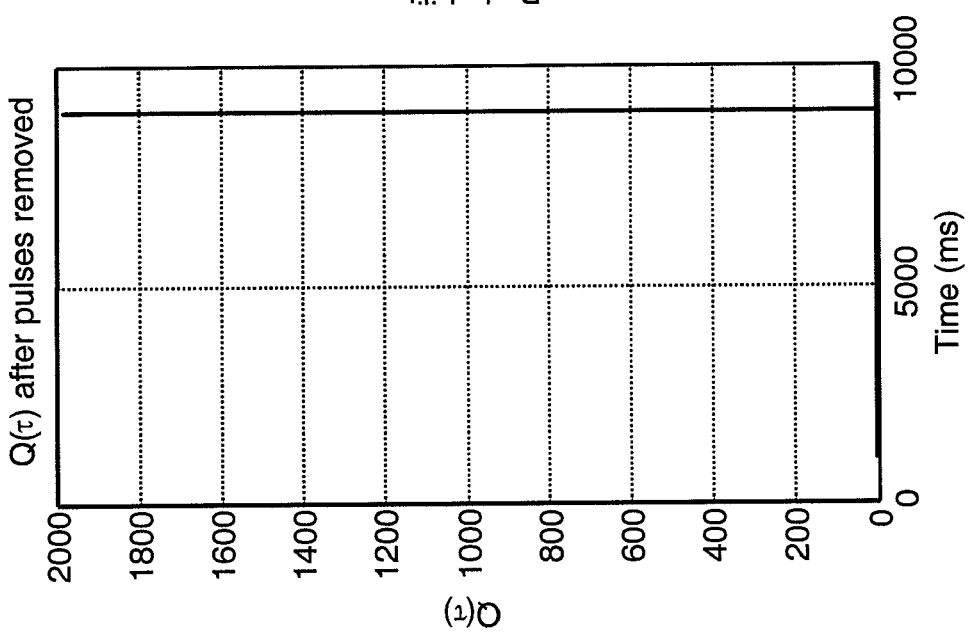

The following is an example to explain the operation of the algorithm depicted in FIG. 28. In this example, there are seven transmitter devices having periods: T1=2.01 ms, T2=T3=4.5 ms, T4=5 ms, T5=7.5 ms, T6=T7=9 ms. The transmission phase for each device is selected at random and it is assumed that the sensor detects 1000 pulses from each device over a period of 9 seconds. There are 7000 timestamps spanning 10 seconds after the pulse removal steps. In each of the following 4 figures, the "A" figure shows Q(τ) after the pulse removal step 540 and the "B" figure shows graphs for the histogram of mod($t_n(i_n)$,Ti) computed in step 550, where:

FIGS. 29A and 29B are for after the T1=2.01 ms pulses are removed (there were 1006 pulses matching the removal criteria);

FIGS. 30A and 30B are for after the T2=T3=4.5 ms pulses are removed (there were 2000 pulses matching the removal criteria);

FIGS. 31A and 31B are for after the T4=5 ms pulses are removed (there were 998 pulses matching the removal criteria); and FIGS. 32A and 32B are for after the T5=7.5 ms pulses are removed, of which there were 996 pulses that matched the removal criteria.

Figure 33:
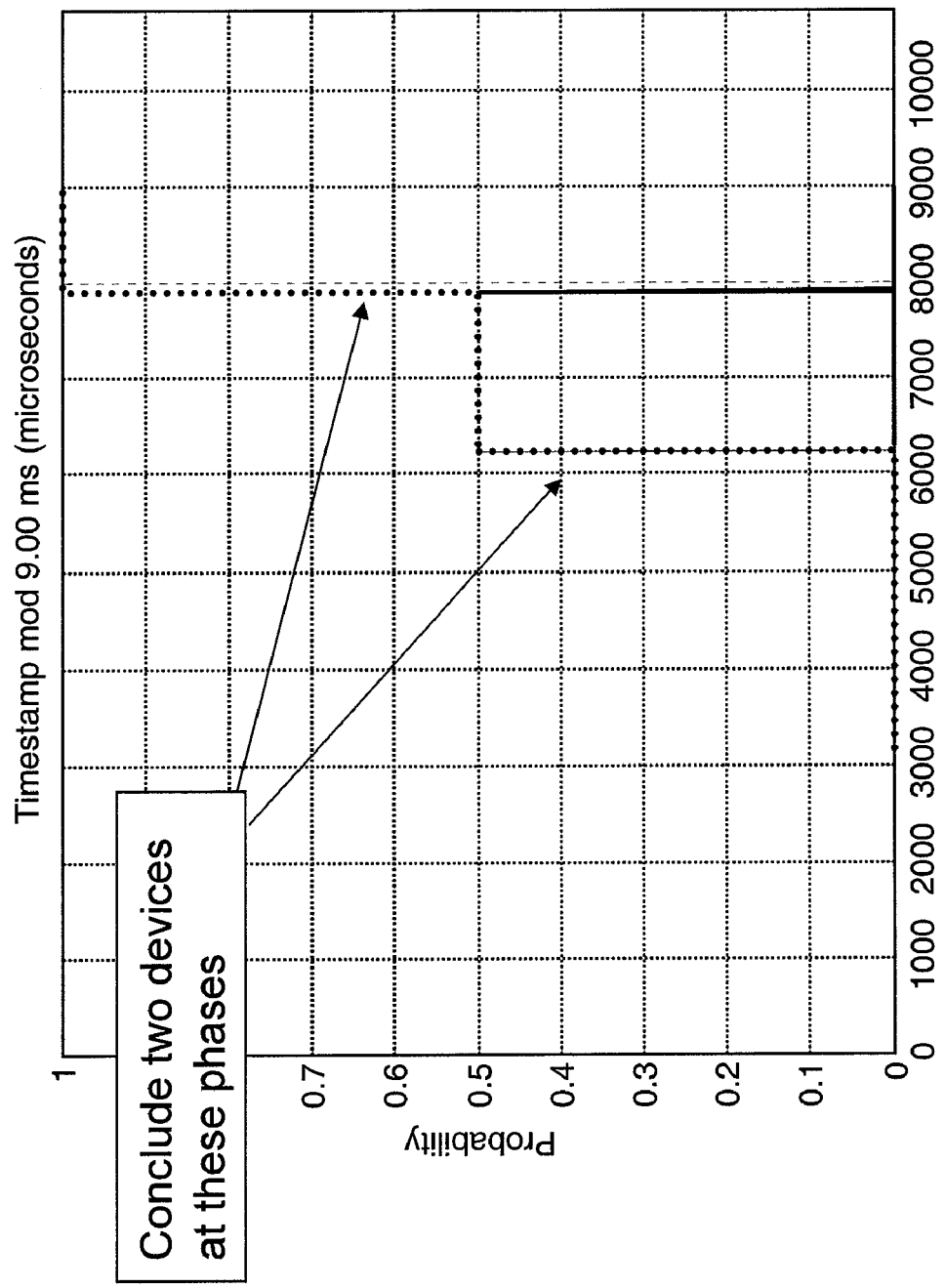
FIG. 33 illustrates a plot for a histogram of timestamps for certain pulses remaining after iterations of the pulse timestamp analysis algorithm for the simulation of FIGS. 29A and 29B.

FIG. 33 illustrates histograms of timestamps mod 9 ms for the remaining 2000 pulses as would be computed at step 550 in FIG. 28.

A further example is described that is similar to the one above, except an asynchronous network that transmits every 1-9 ms (uniformly distributed) is added. In addition, to simulate the effects of frequency hopping and sensor scanning, only 50% of the pulses (selected randomly to simulate frequency hopping) are accepted for the first 100 ms of each second (thereby simulating a 1 second scan interval). Note that 95% of the pulses are discarded using this approach. After pulse removal, start out with 668 timestamps over 10 seconds.

Figure 35B:
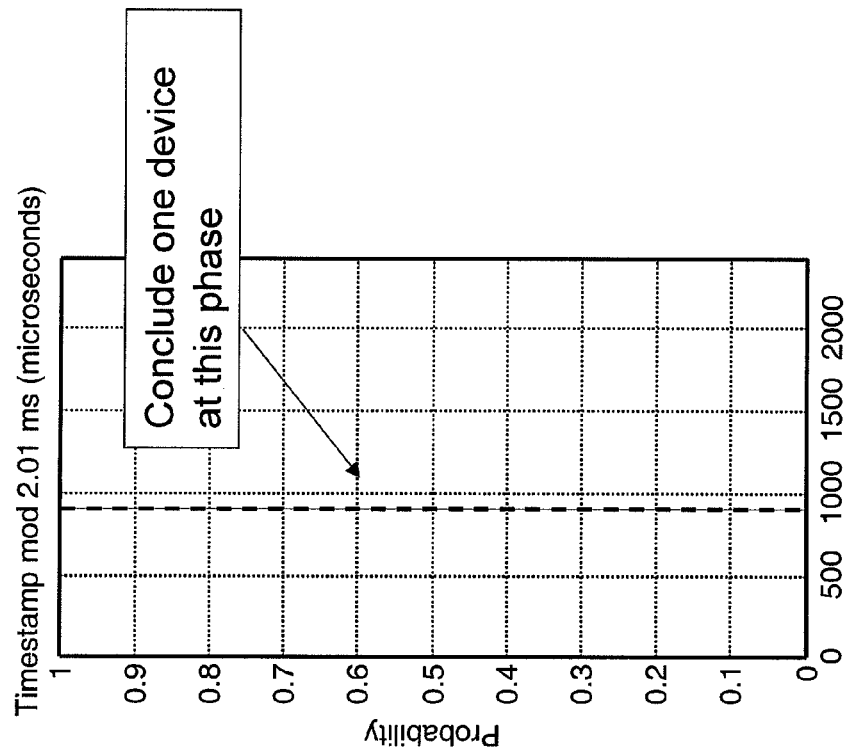
FIGS. 35A and 35B illustrate plots for Q(τ) and a histogram of phases, respectively, after a first set of pulses are removed in the course of the pulse timestamp analysis algorithm for the simulation of FIG. 34.
Figure 35A:
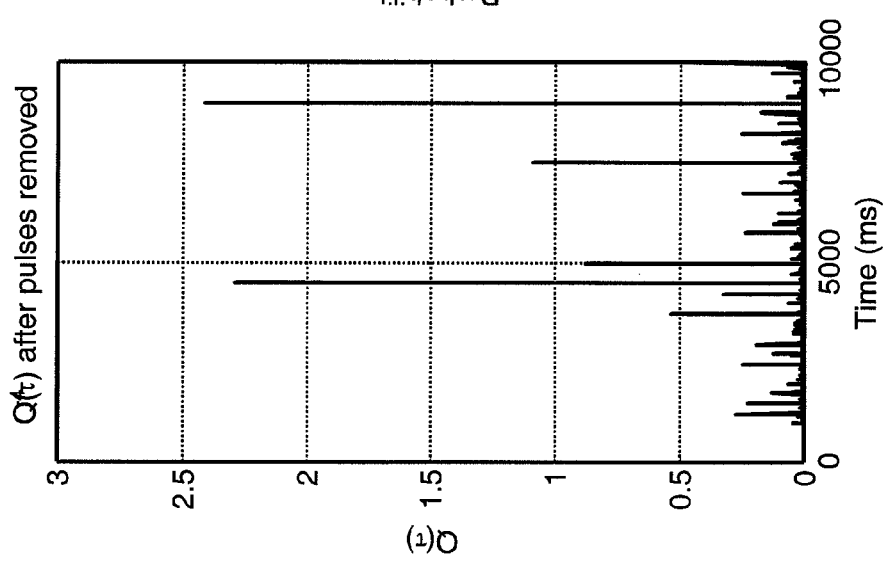
Figure 36B:
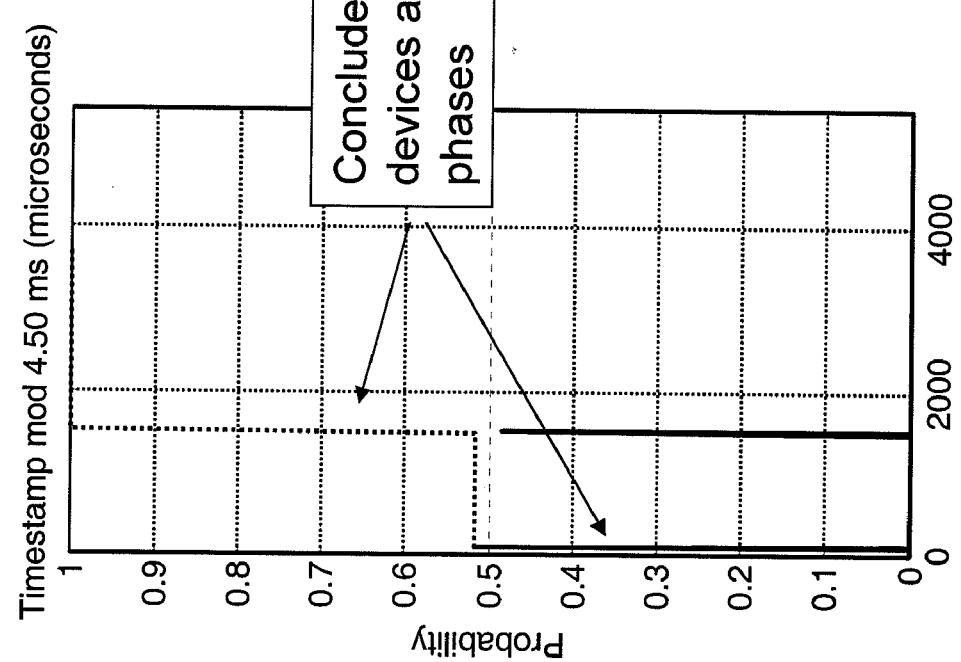
FIGS. 36A and 36B illustrates plot for Q(τ) and a histogram of phases, respectively, after a second set of pulses are removed in the course of the pulse timestamp analysis algorithm for the simulation of FIG. 34.
Figure 36A:
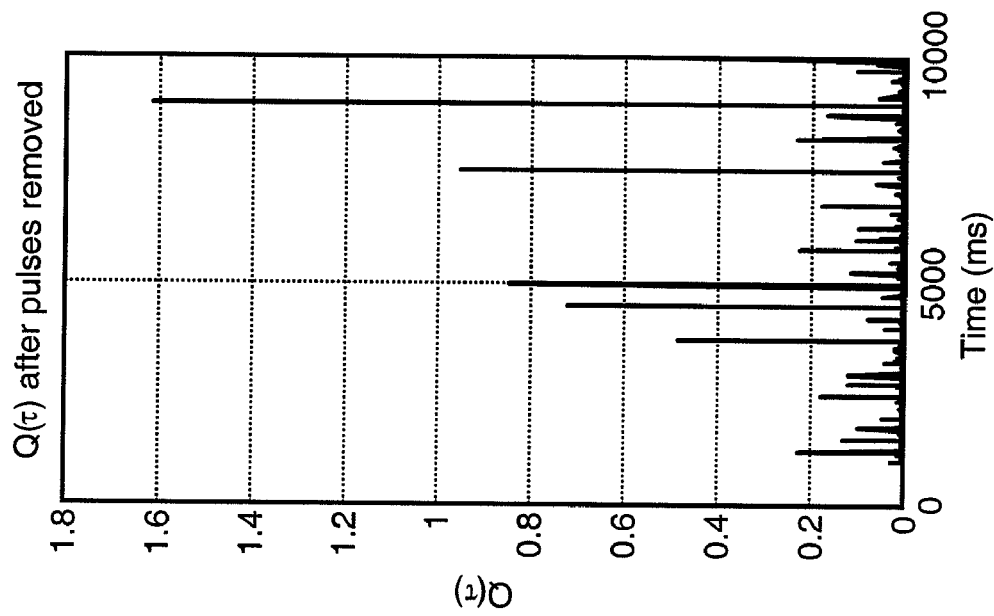
Figure 37B:
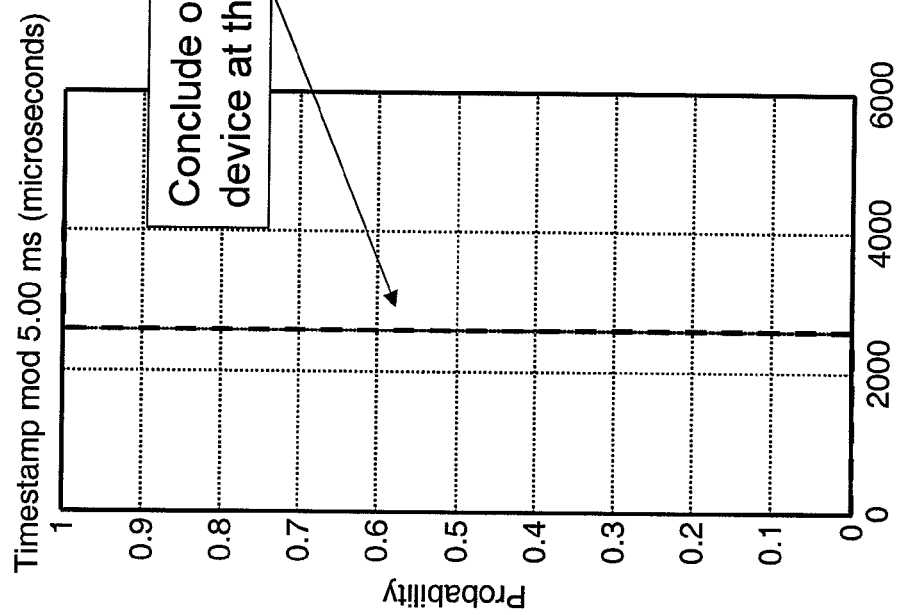
FIGS. 37A and 37B illustrates plot for Q(τ) and a histogram of phases, respectively, after a third set of pulses are removed in the course of the pulse timestamp analysis algorithm for the simulation of FIG. 34.
Figure 37A:
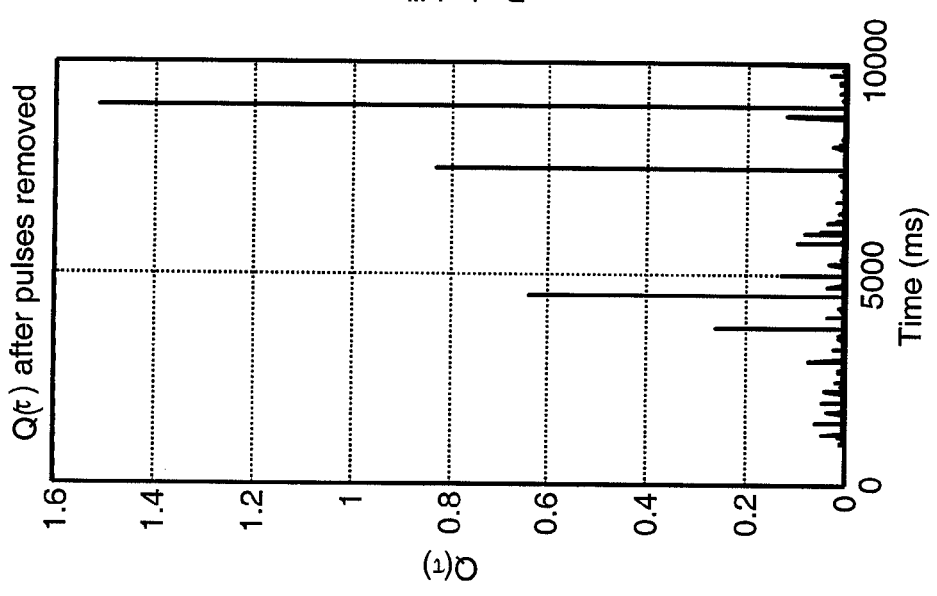

FIG. 34 illustrates Q(τ) before any pulses are removed. Similar to FIGS. 29A,29B through 32A,32B, the "A" figure shows Q(τ) after the pulse removal step 540 and the "B" figure shows graphs for the histogram of mod($t_n(i_n)$,Ti) computed in step 550, where:

FIGS. 35A and 35B are for after the 2.01 ms pulses are removed (72 pulses matching the removal criteria);

FIGS. 36A and 36B are for after the 4.5 ms pulses are removed (159 pulses matching the removal criteria);

FIGS. 37A and 37B are for after the 5 ms pulses are removed (69 pulses matching the removal criteria).

Figure 38A:
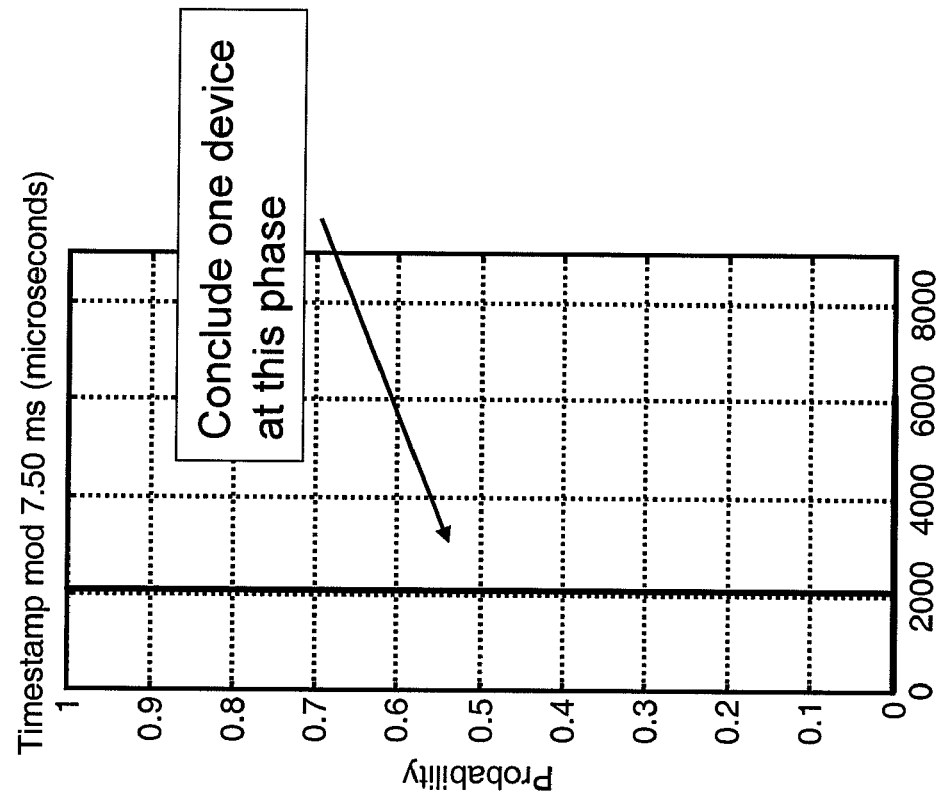
FIGS. 38A and 38B illustrates plot for Q(τ) and a histogram of phases, respectively, after a fourth set of pulses are removed in the course of the pulse timestamp analysis algorithm for the simulation of FIG. 34.
Figure 38B:
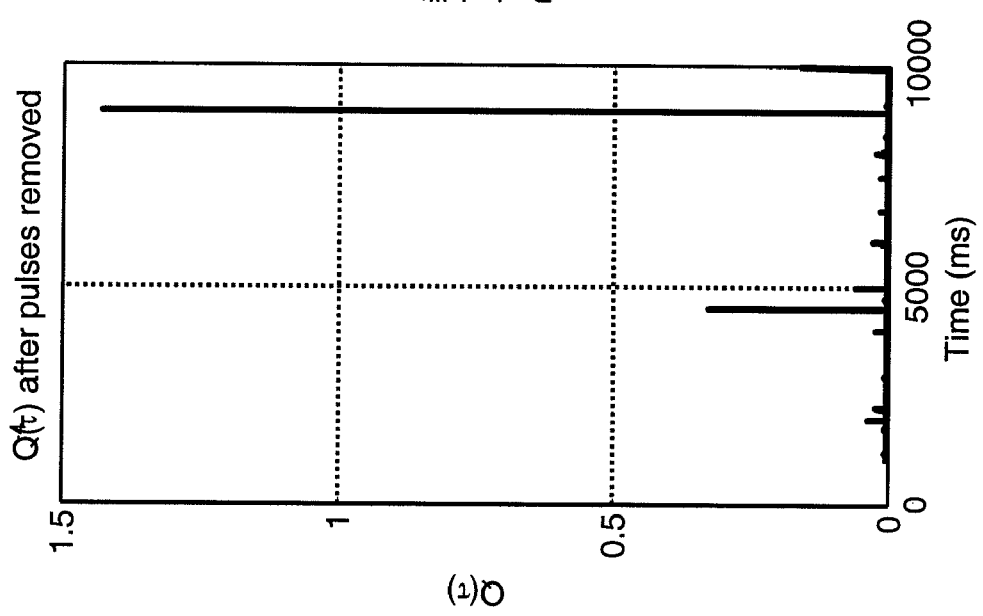

FIGS. 38A and 38B are for after the 7 ms pulses are removed (63 pulses matching the removal criteria).

Figure 39A:
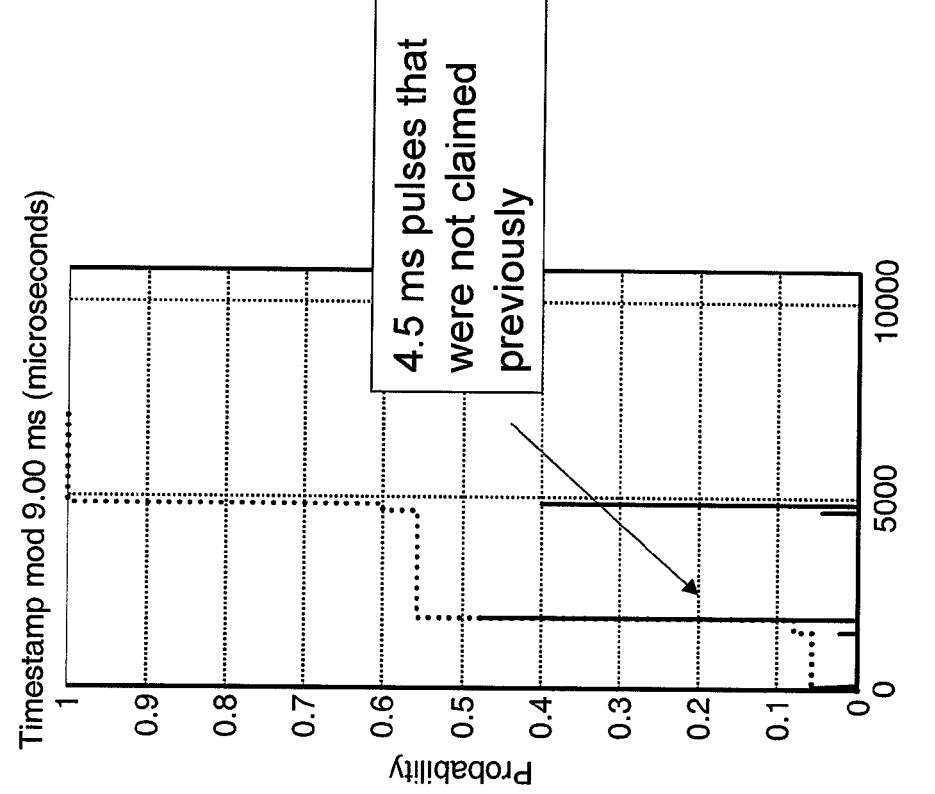
FIGS. 39A and 39B illustrates plot for Q(τ) and a histogram of phases, respectively, after a fifth set of pulses are removed in the course of the pulse timestamp analysis algorithm for the simulation of FIG. 34.
Figure 39B:
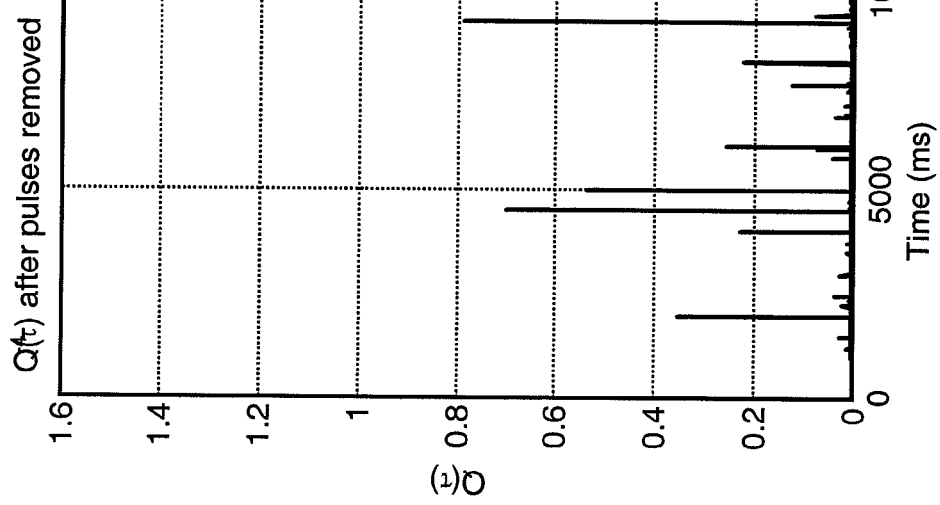

FIGS. 39A and 39B are for after the 9 ms pulses are removed (88 pulses matching the removal criteria).

FIG. 40 illustrates Q(.) after all the pulses are removed for the remaining timestamps.

The examples above demonstrate that the technique depicted by the flowchart shown in FIG. 28 works very well for estimating period and phase for each synchronous transmitter device. The Q(.) plot shown in FIG. 40 indicates that not all pulses were claimed during each step of the process due to the removal of some of the pulses resulting from the scanning receiver in the sensor. However, enough of the pulses were claimed to make good estimates on period and phase. Also noteworthy is that the 9 ms pulses did not interfere with the 4.5 ms pulses.

The following are explanations of certain special cases for the timestamp analysis technique according to the embodiments of the present invention.

Consider a situation where there are two T-synchronous devices transmitting 180 degrees out-of-phase and one T/2-synchronous transmitter device (for example, two 9 ms transmitters 180 degrees out of phase, and one 4.5 ms transmitter). There are several analysis possibilities. The phase offset between the two transmitters must be exactly 180 degrees, otherwise the Q(.) function approach will characterize them as T-synchronous devices. The two devices are likely to have other distinguishing physical layer characteristics, e.g., power, or carrier frequency error. As described herein in connection with other embodiments of the present invention, the carrier frequency error is the difference between a device's intended carrier frequency and its actual carrier frequency, as measured by the sensor. Carrier frequency errors are caused by inaccuracies in the reference oscillators in the device's radio transmitter.

Figure 41:
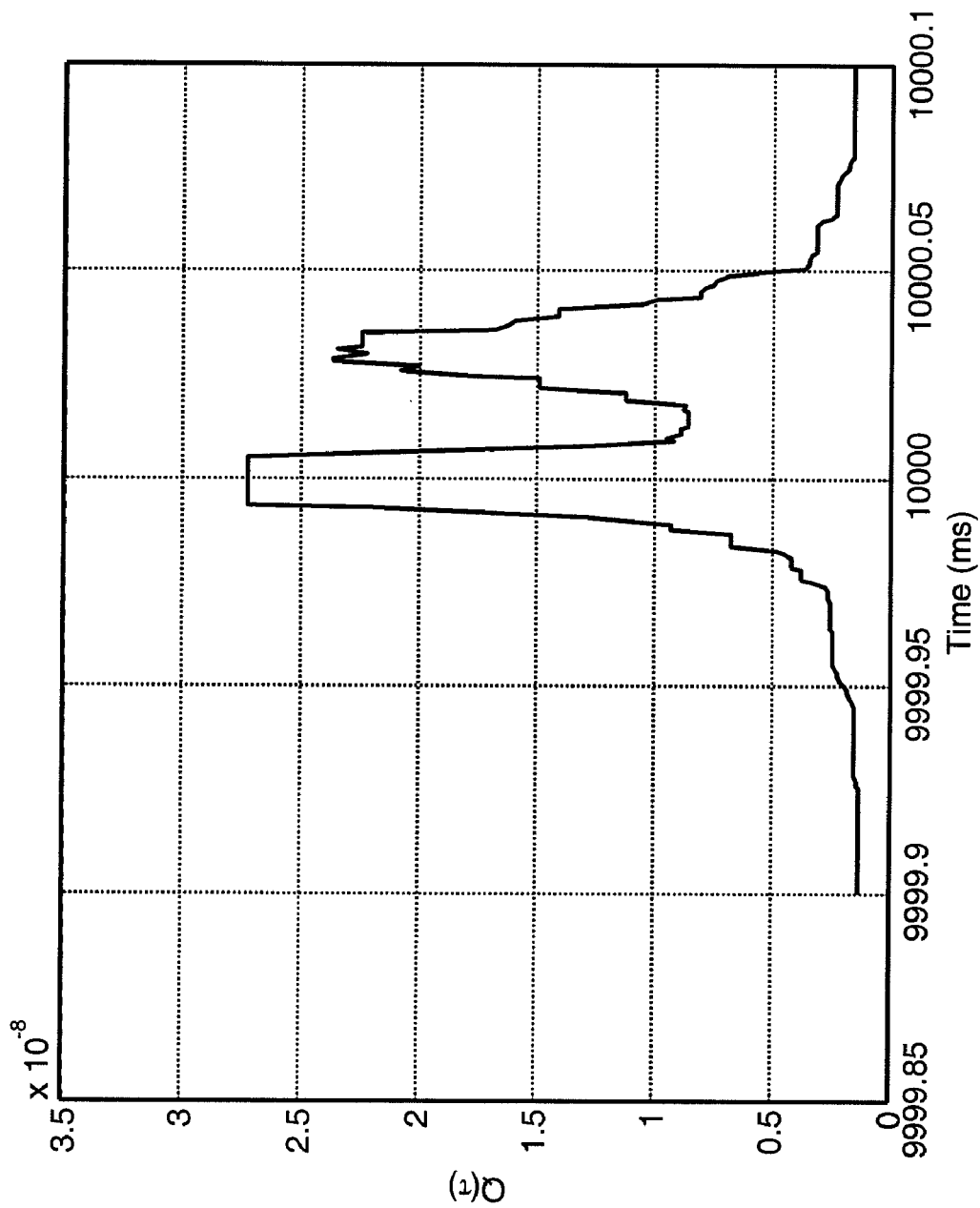
FIG. 41 illustrates a plot for Q(.) for timestamps taken for a simulation involving several periodic devices.
Figures 43A, 43B:
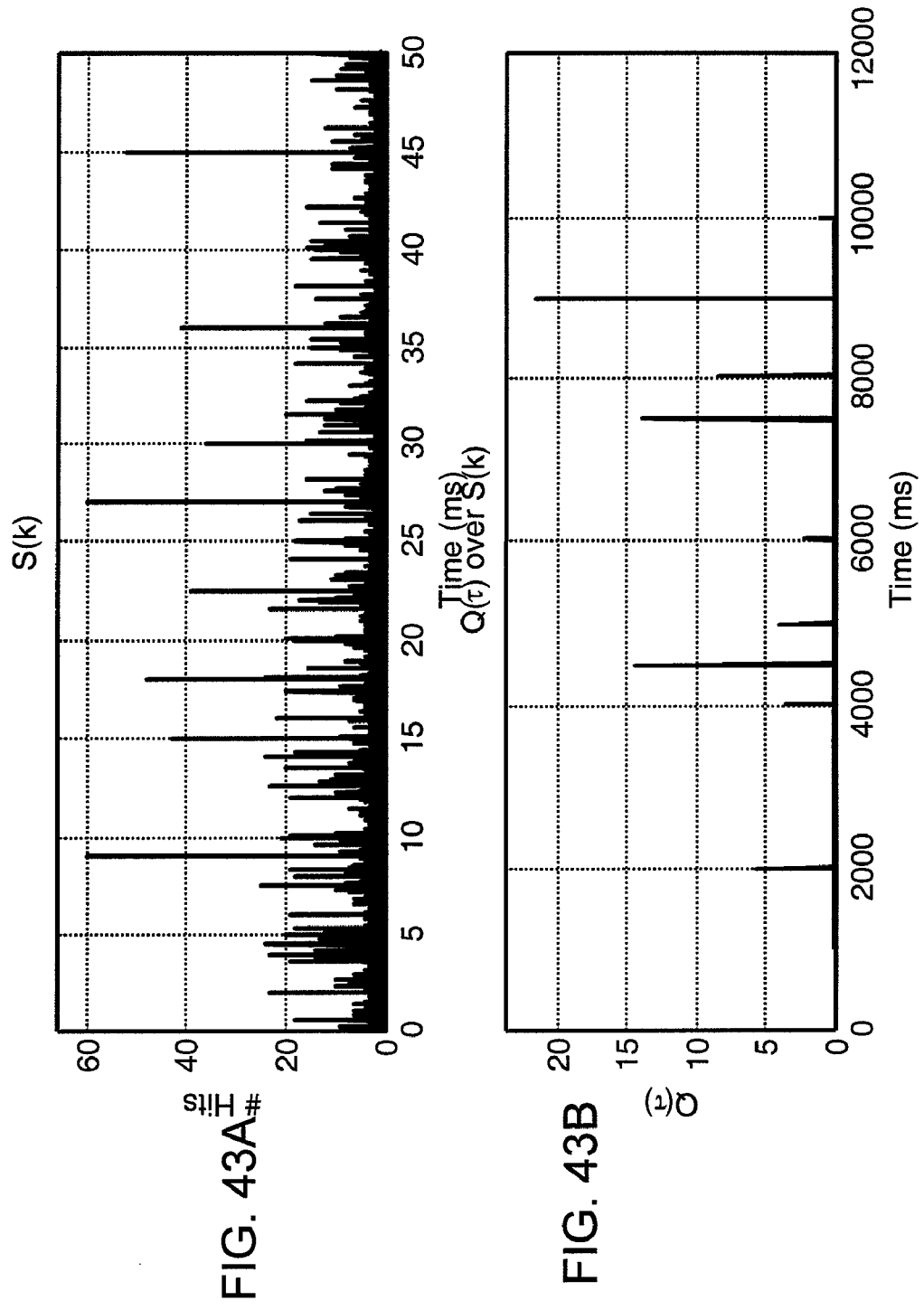
FIGS. 43A and 43B illustrates plot for S(k) and a histogram of Q(τ) over S(k), respectively, after a second set of pulses are removed in the course of the pulse timestamp analysis algorithm executed using alternative computations for the simulation of FIGS. 24A and 24B.

Consider another situation in which there are two periodic FHSS networks that have the same nominal period (for example, 10 ms), but that drift slowly in frequency. Assuming, without loss of generality, that one FHSS network of devices has a 10 ms period exactly, and that the other FHSS network has a small offset, say, 10.00003 ms (3 ppm). When the pulses are partitioned into atomic groups using the histogram of their timestamps mod 10 ms, a very accurate estimate of the pulse period for each atomic group is determined by finding the period T that minimizes the variance of the timestamps in the group modulo T (as described above). It is then is possible to conclude that there are two different 10 ms networks, and the consequently possible to identify which devices belong to which FHSS network. Another interesting fact is that the Q(.) function itself can be used to produce very accurate pulse period measurements. For example, the plot shown in FIG. 41 shows Q(.) for timestamps taken from 4 periodic devices over 10 seconds, one with a period of exactly 10 ms, the other with a period of 10.00003 ms.

There is a possibility that the T/N pulses may "leak" into the T pulses. In the example of FIGS. 34-40 above, pulses from the 4.5 ms could leak into the 9 ms pulse group. To compensate for this, when there are a group of T/N pulses for some integer N>1, the pulses from the T group that are phase aligned with the T/N pulses mod T/N are removed and discarded.

Consider the situation when a FHSS device transmits (1) periodic voice in one time slot and sporadic data in another, or (2) transmits voice in two different time slots for time/frequency diversity. The timestamp device identification will conclude that there are two devices that belong to the same network, since their pulse periods are identical and their phases do not overlap. Pulse metrics described above, such as carrier frequency error, modulation type, pulse power, etc., may be used to conclude that the pulses actually belong to the same device.

The autocorrelation is computed using the timestamps themselves. In the example depicted in FIGS. 34-40 described above, 668 timestamps were taken over a 10 second period. To compute the autocorrelation in the timestamp domain, one technique is to add the shift time $\tau$ to each of the timestamps, and count the number of timestamps that overlap within one sampling interval. If the timestamp array is sorted (which it naturally is in the real-world), this would obviously simplify the computation.

It will take approximately 50*668 cycles to compute one correlation point. $R(\tau)$ needs to be computed for all integer multiples of $\tau=n*1$ ms, $n=1, \ldots, 10,000$ and $\tau=0.625$ ms, $n=1, \ldots, 16,000$. This will require approximately 50*668*26,000=88.4 million cycles. $Q(\tau)$ needs to be computed for $\tau=n*1$ ms, $n=1, \ldots, 100$ and $\tau=n*625$ µs, $n=1, \ldots, 6$. The computation for Q(.) may be implemented as a sum of logarithms over the harmonics of R(k) rather than a product. For $\tau$ as defined above, this means that approximately 60,000 logarithms need to be computed. If it is assumed that 100 cycles are required to compute a logarithm, then the total computation for Q(.) adds an additional 6 million cycles to the total workload.

The mod( ) operation may be implemented with two multiplies, a floor function, and a subtract function. Assuming 20 cycles per timestamp, this yields only 668*20=14K cycles for the example of FIGS. 34-40. At most approximately 100 of these 14K computations need to be run to process a 10 second measurement duration, for a total of approximately 1.4M instructions.

Thus, a real-world scenario such as the example of FIGS. 34-40 would require about 100 million cycles to process 10 seconds of data, or 10 MIPS. This number can be reduced by a factor of 10 or so with a hardware accelerator that computes the autocorrelation sequence from the timestamps.

Approximately 90% of the computational workload comes from computing the autocorrelation sequence. Another technique that can be shown to produce an output sequence that is very similar to the autocorrelation sequence output is to compute a histogram over the set of differences between timestamps. Let $\{d(n)\}$ be the set of timestamp differences, i.e., $d(n)=ts(m)-ts(n), n=1, \ldots, N; m=n+1, \ldots, N$, where N is the number of timestamps. Let S(k) be the histogram over $\{d(n)\}$. The spacing between histogram cells can be any desired time duration, for example, 10 µs. Q(k) is computed over S(k) instead of over the autocorrelation sequence R(k) to save CPU time and resources. FIGS. 42A,42B and 43A,43B show plots for S(k) and Q(k) over S(k) for the examples shown in FIGS. 25A,25B and FIGS. 26A,26B, respectively. Note the similarity between the plots.

The follow describes the requirements for the histogram computation implementation. For this explanation, it is assumed there are N=668 timestamps, per the example of FIGS. 29-35. There are N*(N−1)/2=about 200K subtractions required to compute the $\{d(n)\}$. The operation can be expedited by computing only those differences between approximately 0 and 100 ms. Since the timestamps are sorted, one can jump out of the inner loop over m in the equation for d(n), defined above. Using this enhancement, the number of subtractions in the simulation for the example of FIGS. 34-40 is reduced from 20°K to approximately 20K. There are an additional 200K instructions required to compute the histogram over d(n), for a total of about 220K instructions. The histogram computation technique reduces the CPU load for the example of FIGS. 29-35 from 10 MIPS to less than 1 MIPS.

Using the timestamp information described above, the pulse sequence analysis module 230 (FIG. 2) sorts the pulses into groups based on their periods, and then for each group, further sub-groups the pulses based on their phases.

The pulse timestamp analysis algorithm can be summarized as follows. Pulses of RF energy are detected. The arrival times (timestamps) of the pulses are determined. Candidate periods for pulses are determined based on the arrival times. The pulses are partitioned into groups based on their candidate periods such that pulses with similar candidate periods are grouped together. Next, phases are derived for the pulses in each of the groups. Then, each of the groups is further partitioned into subgroups based on their phases, such that each subgroup comprises pulses (having the same candidate period) and same phase. Finally, sources of wireless signals are identified based on the subgroups formed by partitioning based on phase and other remaining pulses that were not grouped based on candidate period. Furthermore, asynchronous sources are identified from those pulses that were not included in a group formed based on candidate periods. Synchronous sources are identified as corresponding to pulses contained in a group formed based on candidate periods. The candidate periods are derived by computing autocorrelation values from the arrival times of the sequence of pulses and analyzing the autocorrelation values to identify the candidate periods. Moreover, in one embodiment, a function is computed that is a normalized product of harmonics of the autocorrelation values. The results of this function are analyzed for peaks such that the peaks correspond to said candidate periods.

This pulse timestamp analysis algorithm may also be embodied in a computer readable medium encoded with instructions that, when executed by computer or processor, cause the computer or processor to identify sources of wireless signals from data representing received radio frequency (RF) energy, the instructions comprising instructions for: deriving candidate periods for pulses of received RF energy based on arrival times of the pulses; partitioning pulses into groups on their candidate periods; deriving phases for each of the groups of pulses that have been formed based on candidate periods; partitioning the groups into subgroups based on their phases; and identifying sources of wireless signals based on the subgroups formed by partitioning based on phase and other pulses remaining that were not grouped based on candidate period.

Similarly, this pulse timestamp analysis algorithm may be embodied in a device that receives radio frequency (RF) energy and identifies devices that are sources of wireless signals in the RF energy. The device comprises a receiver that receives RF energy, an analog-to-digital converter that converts received RF energy to a digital data; and a processor coupled to the analog-to-digital converter that analyzes the digital data by: deriving candidate periods for pulses of received RF energy based on arrival times of the pulses; partitioning pulses into groups on their candidate periods; deriving phases for each of the groups of pulses that have been formed based on candidate periods; partitioning the groups into subgroups based on their phases; and identifying sources of wireless signals based on the subgroups formed by partitioning based on phase and other pulses remaining that were not grouped based on candidate period.

The Carrier Frequency Pulse Metric

According to another embodiment of the present invention, a technique is provided for distinguishing a group of wireless transmitters based on multiple observations of their estimated carrier frequencies. This technique exploits small frequency differences among the transmitters caused by manufacturing inaccuracies in their reference oscillators. If the frequency estimation error variance is significantly less than the carrier frequency differences between devices (which in many applications, it often is), this technique can readily distinguish transmissions from a plurality of devices.

The term "carrier frequency" may also be the center frequency for certain types of signals depending on their modulation type. However, it should be understood there are also modulation schemes where the carrier frequency and center frequency are not the same, such as signals that use sideband modulation techniques in which case the carrier frequency is offset from the carrier frequency of a signal.

The term "channelization scheme" is introduced to represent a set of one or more transmit frequencies that are used by devices in accordance with a transmit protocol. For example, a frequency hopping channelization scheme uses a set of frequencies (called a frequency hopset) that reside in a frequency range specified by a start frequency (lowest frequency in the set), stop frequency (highest frequency in the set) and frequency step or increment. The frequency step or increment specifies the spacing between frequencies in the hopset within the start-stop frequency range. In the case of a fixed frequency channelization scheme, the start frequency is the same as the stop frequency and is equal to the fixed transmit frequency, and the frequency step is zero.

The frequency analysis algorithm can be used either by itself or used in the pulse grouping algorithm described above in connection with FIGS. 3-9. In the latter case, pulse frequency analysis may be used in combination with other RF fingerprinting parameters such as timing period and phase, RF bandwidth, and modulation type. As suggested in the foregoing, in some cases the analysis based on the other parameters by themselves is insufficient, and pulse frequency analysis is necessary. For example, when multiple asynchronous devices from the same manufacturer are present on the same frequency, one cannot partition pulses from such devices based on timing period and phase (since it is assumed that they are asynchronous)—in this case we need their carrier frequency error to partition them. A more complicated example would be when there are multiple asynchronous frequency-hopped devices present, such as 802.11FH devices. To partition pulses from these devices, we cannot use timing period and phase (again, because it is assumed that they are asynchronous), so we must first determine their nominal carrier frequencies (in this case there are multiple frequencies), and then partition them by their measured carrier frequency error relative to the nominal frequencies.

Many devices that use an unlicensed frequency band use temperature compensated crystal oscillators that have a guaranteed frequency accuracy of +/−20 ppm over time and temperature. According to a well-known manufacturer of such crystal oscillators, a good way to model these crystals after they are about 1 year old is to assume their frequency error obeys a Gaussian distribution w/a 7.5 ppm standard deviation. For a 2.4 GHz device, this corresponds to a carrier frequency error standard deviation of 7.5 ppm*2.4 GHz=18 kHz.

Suppose a sensor device with a scanning receiver captures and fingerprints pulses from one or more wireless devices. Given a sequence of measured pulse center frequencies for each received pulse at the sensor, it is desirable to identify: the number of wireless transmitters; which transmitters use a fixed transmit frequency and which are frequency-hopped; the frequency hopset (i.e., hop channel frequencies) for each of the frequency-hopped devices and estimate carrier frequency for fixed-frequency devices (with carrier frequency estimates accuracy of within +/−1 ppm); and which pulses belong to which device.

With reference to FIG. 44, the frequency analysis device identification algorithm shown at 600 is described. This algorithm is initially described at a relatively high level and then will be described hereinafter in more detail. At 610, a group of RF pulses from the wireless devices and the estimated RF carrier frequency for each pulse is obtained from the pulse fingerprint analysis module. At 620, the candidate frequency spacings for the FHSS hop channels are found based on the carrier frequency estimates. At 630, histograms are computed for the carrier frequency estimates. Next, the histograms are analyzed to identify FHSS signals and fixed-frequency signals. In particular, at 640, FHSS signals are identified as a "comb" of peaks (with potentially some missing teeth) in the histograms, Different FHSS devices using the same protocol and nominal hop frequencies appear as "combs" that are spaced by a small frequency offset due to oscillator error. The so-called "comb" parameters associated with frequency hopping pulses comprise one or more of start frequencies, stop frequencies and step frequencies of the FH signal pulses. At 650, fixed-frequency signals are identified as relatively large standalone peaks in the histograms. Different fixed-frequency devices using the same protocol and nominal carrier frequency (e.g., FF time-division-duplex (TDD) cordless handset and base station) appear at the same nominal frequency in the histogram, but are be spaced by a small frequency offset due to reference oscillator inaccuracies.

Thus, for pulses determined to be associated with fixed frequency signals, sources of pulses are distinguished from each other based on their carrier frequency represented by relatively large stand-alone peaks in the histogram. Sources of fixed frequency pulses having similar carrier frequencies are distinguished from each other based on carrier frequency offset (caused by oscillator errors) represented by relatively small stand-alone peaks in the histogram.

For pulses determined to be associated with frequency hopping sources, pulses from different sources are distinguished based on their distinctive "comb" parameters in the histogram comprising one or more of start frequencies, stop frequencies and step frequencies. Sources of pulses having similar "comb" parameters are distinguished from each other based on small frequency shifts in the "combs" associated with those pulses.

Once the pulses are divided into groups based on their "coarse channelization", i.e., pulses from fixed-frequency devices are separated from FHSS pulses, pulses from FHSS devices with different hopsets are separated from one another, the pulses are further subdivided based on their carrier frequency error i.e., the difference between their measured and nominal carrier frequencies. At this point, each of the pulse groups are tested to see if they are atomic (i.e., contain pulses from only one device). If not, they are either subdivided further using another technique described earlier (e.g., based on time period and phase) or discarded.

Consider an example in which the following devices are assumed to be active: 2 FHSS RFID readers from the same manufacturer that transmit at hop frequencies 903, 904, . . . , 908 MHz, 1 unknown FHSS device that transmits at hop frequencies 904, 904.3, 904.6, . . . , 909.7 MHz, 1 fixed-frequency TDD cordless handset and base station that transmit at 905.0 MHz. It is assumed that all devices have small frequency offsets due to oscillator inaccuracies.

Figure 45:
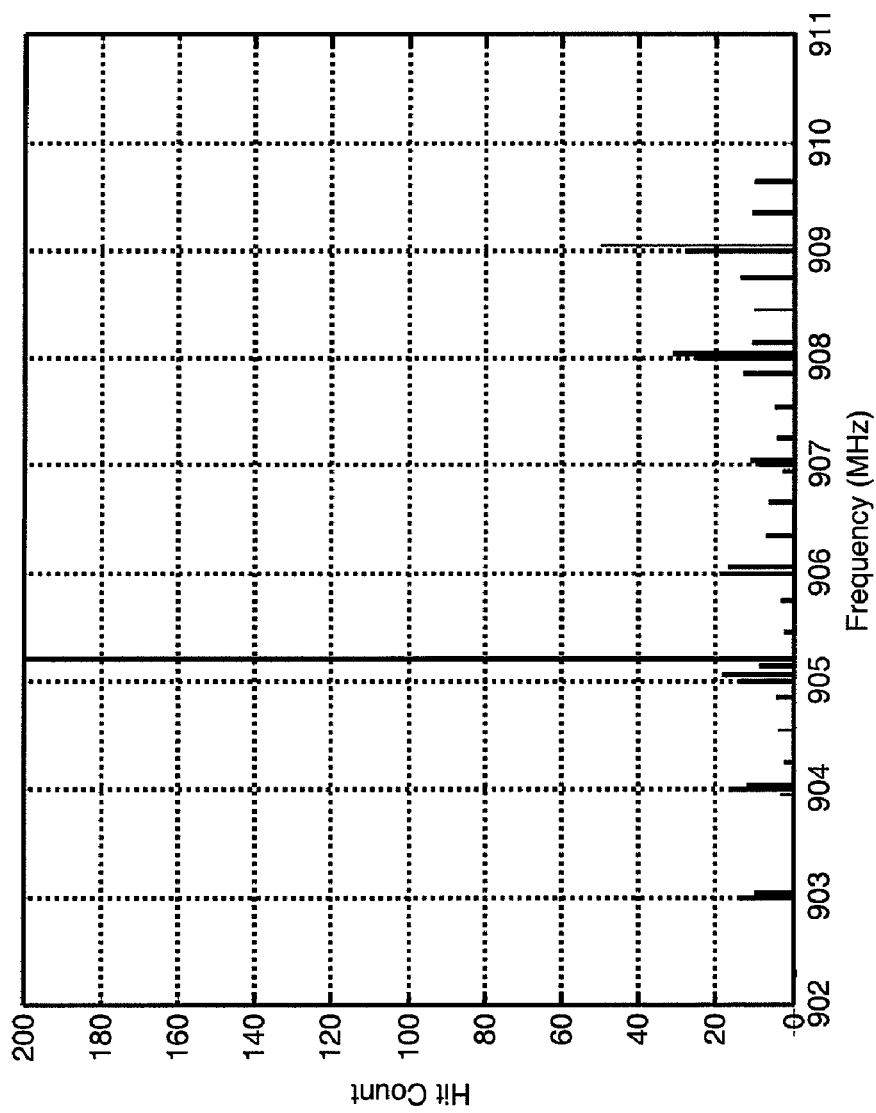
FIGS. 45 and 46 illustrate histograms for carrier frequencies generated by the pulse frequency analysis algorithm for a simulation.
Figure 46:
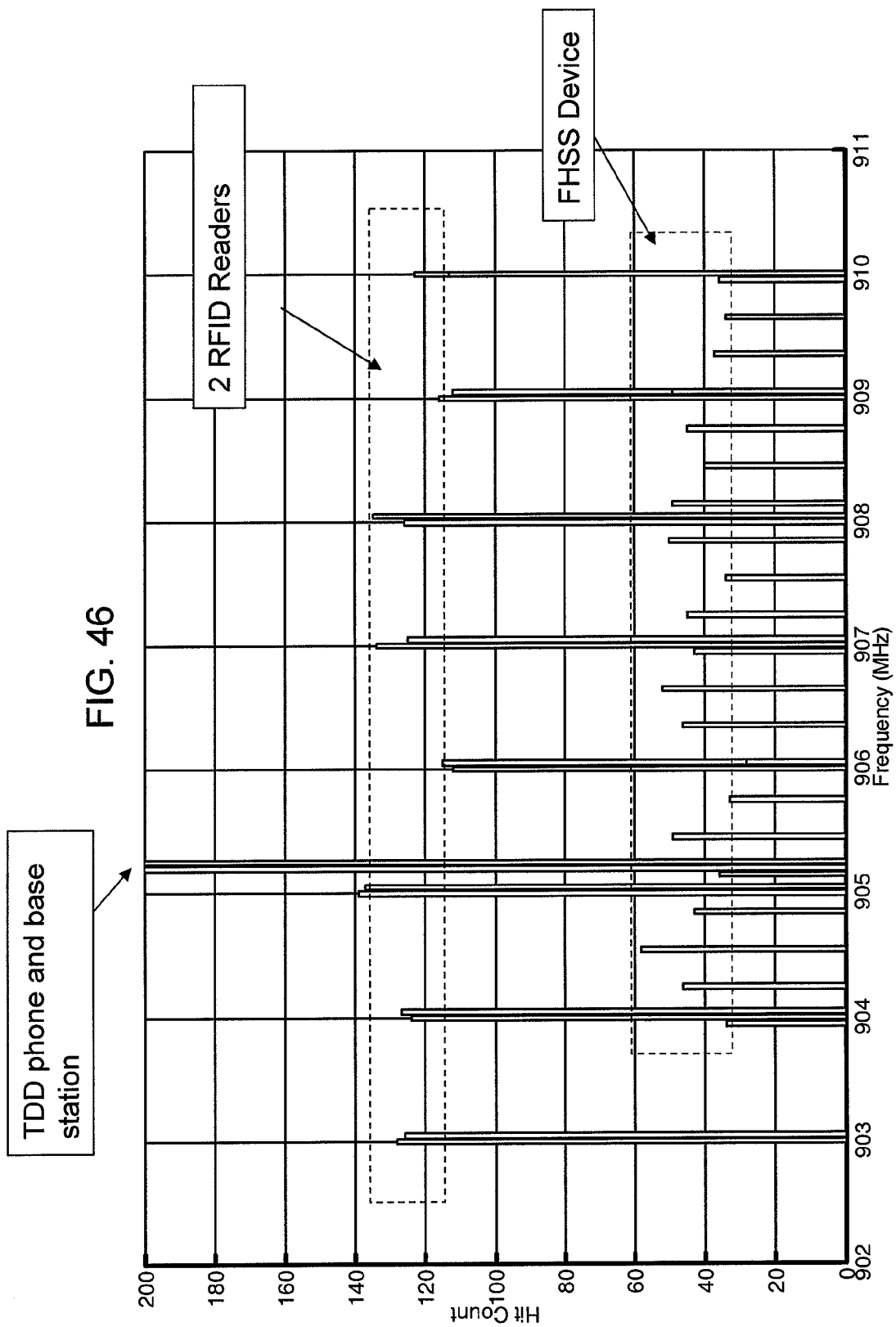

FIG. 45 illustrates a histogram over center frequencies for 1000 pulses from the 5 devices. FIG. 46 illustrates carrier frequency histograms for each of the 5 devices overlaid on top of one another. In FIG. 46, one can almost visually distinguish between the 2 FHSS networks, and between the fixed-frequency network and either of the FHSS networks.

The following sets forth a pseudo-code description of the algorithm 600. The input is a group of pulse carrier frequency measurements and the outputs are an estimate of the number of wireless devices; a determination of whether each device is FF or FH, and a grouping of pulses for each device.

```
1.  PROCEDURE groupPulseFrequencies
2.  INPUT: pulses p(n), n = 0,...,NP-1 w/pulse center frequencies p.fc(n)
3.  OUTPUTS: nGroups = number of pulse groups, groups.pulseIndices[0...nGroups-1]
    = indices of pulses in each group
4.  Identify candidate channel spacings Df0 < ... Df1 < ... < DfNF-1 (in Hz). An
    algorithm for doing so is shown on the next page.
5.  Compute histogram h(k) over pulse center frequencies p.fc(n). The bin width S (in
    Hz) should be equal to the peak-to-peak carrier frequency estimation error for the
    p.fc(n). When computing the histogram (histo), also keep track of which pulses fall in
    which bins. Assume p.fc[nb[k,m]], m=0,...,NB(k)-1 fall in bin k.
6.  Find the frequencies kh[n], n=0,...,NH-1 at which there are hits in the histo, i.e.,
    h[kh[n]] > 0, n = 0,...,NH-1; all other h[k] are zero.
7.  FOR n = 0,...,NH-1         // for each histo hit frequency
8.      IF kh[n] == 0, CONTINUE; // this histo bin may have been set to zero by the
            algorithm; if so, ignore it
9.      FHSS = FALSE;
10.     FOR k = 0,...,NF-1     // for each candidate channel spacing
11.         IF h[kh[n] + round(mDfk/S)] > 0, for a significant number of m in
            {0,...,M-1} & for some integer M that's significantly large
12.             // Have a FHSS signal w/start freq kh[n], channel spacing Dfk
                    and (at least) M hop channels. Zero out histo &
13.             // group associated pulses at these frequencies
14.             let k0[m] = kh[n] + round(mDfk/S), for m=0,...,M-1
15.             h[k0[m]] = 0;
16.             groups.pulseIndices[nGroups] = {nb[k0[m],p], m=0,...,M-1;
                    p= 0,...,NB(k0[m])-1};
17.             FHSS = TRUE;
18.             BREAK;          // break out of loop
19.         END IF
20.     END FOR
21.     IF FHSS == FALSE
22.         // Have a fixed-frequency signal at frequency kh[n]. Zero out histo &
                group associated pulses
23.         h[k0[n]] = 0;
24.         groups.pulseIndices[nGroups] = {nb[k0[n],p], p=0,...,NB(k0[n])-1};
25.     END IF
26.     groups.isFHSS = FHSS;
27.     nGroups = nGroups + 1;
```

-continued

```
28. END FOR
29. FOR n = 1,...,nGroups
        Subdivide each group based on carrier frequency error (i.e., measured minus
        nominal carrier frequency). nGroups and groups.pulseIndices[ ] for each group
        will obviously be modified in the process.
30. END FOR
31. RETURN
```

The carrier frequency analysis algorithm outlined by the foregoing pseudo-code (as well as depicted in FIG. 44) may be summarized as follows. Pulses of RF energy are detected and the carrier frequencies for those pulses are determined. The carrier frequencies are analyzed to determine a set of zero or more candidate frequency spacings to be used for identifying a hopset of a frequency hopping channelization scheme. One or more channelization schemes (fixed frequency and/or frequency hopping schemes) associated with the pulses are determined using the set of candidate frequency spacings and the carrier frequencies for the pulses, wherein a channelization scheme comprises a set of one or more transmit frequencies. Pulses are partitioned into groups, wherein each group corresponds to a channelization scheme. Each group of pulses is subdivided into subgroups based on differences between the carrier frequencies for pulses in the group and a particular one of the transmit frequencies for the corresponding channelization scheme. Finally, sources of wireless signals are identified based on the subgroups formed by said (f) subdividing. Each subgroup is analyzed to determined whether it contains pulses that are from a single source for a channelization scheme. If so, that subgroup is said to be an atomic group and appropriate ("device up" or "device still up" output can be made for that subgroup. Determining the one or more channelization schemes involves determining start frequency, stop frequency and frequency increment for a frequency hopping channelization scheme determined to be associated with the pulses. In the case of the fixed frequency channelization scheme, the start frequency and stop frequency are equal and the frequency increment is zero.

In order to subdivide the groups of pulses, differences between carrier frequencies for a group pulses and a nearest transmit frequency of the corresponding channelization scheme for that group of pulses are computed. In the case of a frequency hopping channelization scheme, the nearest transmission frequency is the transmit frequency that is closest (in absolute difference—either in higher or lower) to a carrier frequency of a pulse in the group. The group is thus subdivided into subgroups based on those differences in order to distinguish (based on the carrier frequency error concept described above) between different source devices using the same type of channelization scheme. The intent is to form subgroups comprised of pulses that appear to be from different source devices (using the same type of channelization scheme) as displayed by relatively small frequency offsets with respect to a so-called nominal transmit frequency of a corresponding channelization scheme. In the case of a fixed frequency channelization scheme, the nearest transmit frequency is simply the fixed frequency of that channelization scheme.

A histogram may be computed on the carrier frequencies and the histogram is analyzed to determine zero or more (candidate) frequency spacings. For each candidate frequency spacing, it is determined whether there is a peak in the histogram at an integer multiple of the candidate frequency spacing in order to identify frequency hops associated with a frequency hopping channelization scheme. When partitioning the pulses into groups, a pulse is assigned to a group associated with a frequency hopping channelization scheme when it is determined from the histogram that the carrier frequency of that pulse is at an integer multiple of a candidate frequency spacing. In partitioning the pulses into groups, it should be understood that zero or more groups of pulses associated with a fixed frequency channelization scheme may be formed and zero or more groups of pulses associated with a frequency hopping channelization scheme may be formed. Subdividing the groups of pulses into subgroups allows for distinguishing different source devices using a fixed frequency channelization scheme and different source devices using a frequency hopping channelization scheme.

The pulse sequence analysis module 230 may perform the frequency analysis algorithm described herein.

The following is a description of how candidate frequency spacings are found for FHSS hop channels based on the carrier frequency estimates. This is the computation performed at 620 in FIG. 44. Let $\{d(n)\}$ be the set of pulse carrier frequency differences, i.e., $d(n)=fc(m)-fc(n)$, $n=1, \ldots, N$; $m=n+1, \ldots, N$, where N is the number of pulses. Let $S(k)$ be the histogram over $\{d(n)\}$. The spacing between histogram cells should be equal to twice the peak-to-peak carrier frequency estimation error.

The following definition is made:

$$H(\Delta f) = \prod_{k=1}^{M} |S(\lfloor k \cdot \Delta f / B + 0.5 \rfloor)|^{1/M}$$

where B is the bin spacing for $S(k)$, and M is an appropriate upper limit constant. $H(f)$ is computed for $\Delta f_{Min}$, $\Delta f_{Min}+\Delta f_{step}$, ..., $\Delta f_{Max}$. The candidate frequency spacings $F_1 < F_2 < \ldots < F_M$ can be found by simply identifying the peaks in $H(.)$. This is very similar to the way candidate timing periods are identified from the $Q(.)$ function defined earlier.

Figure 47A:
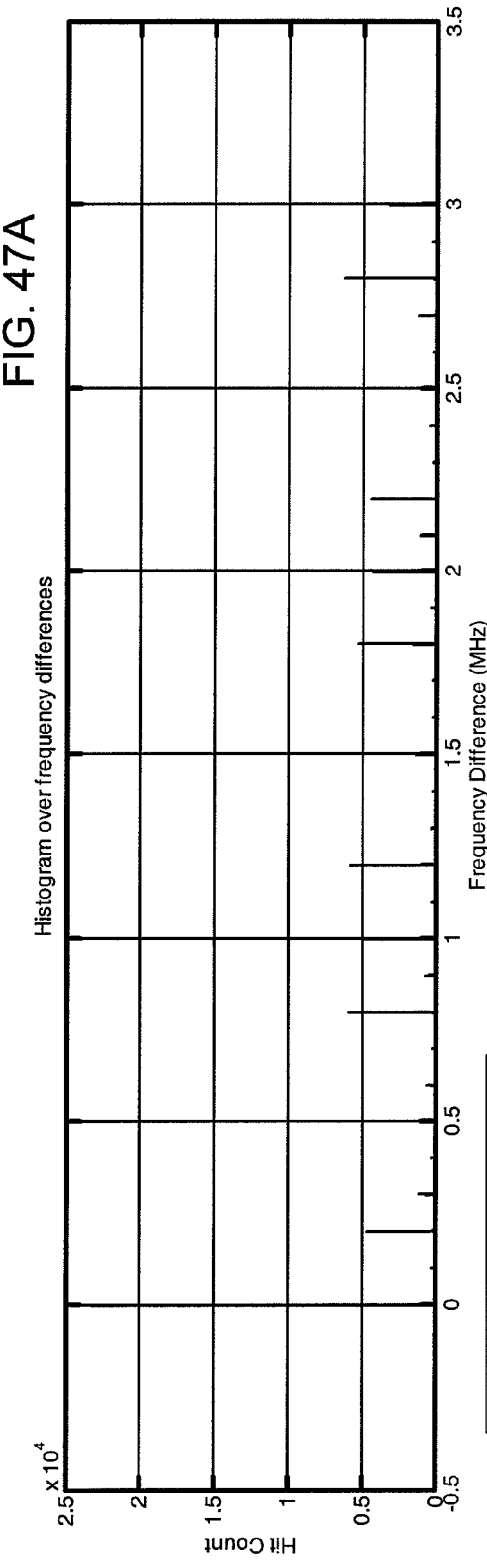
FIGS. 47A and 47B illustrate plots for a histogram over candidate frequency spacings and an autocorrelation computation H(.) generated during the course of the pulse frequency analysis algorithm for the simulation shown in FIGS. 45 and 46.
Figure 47B:
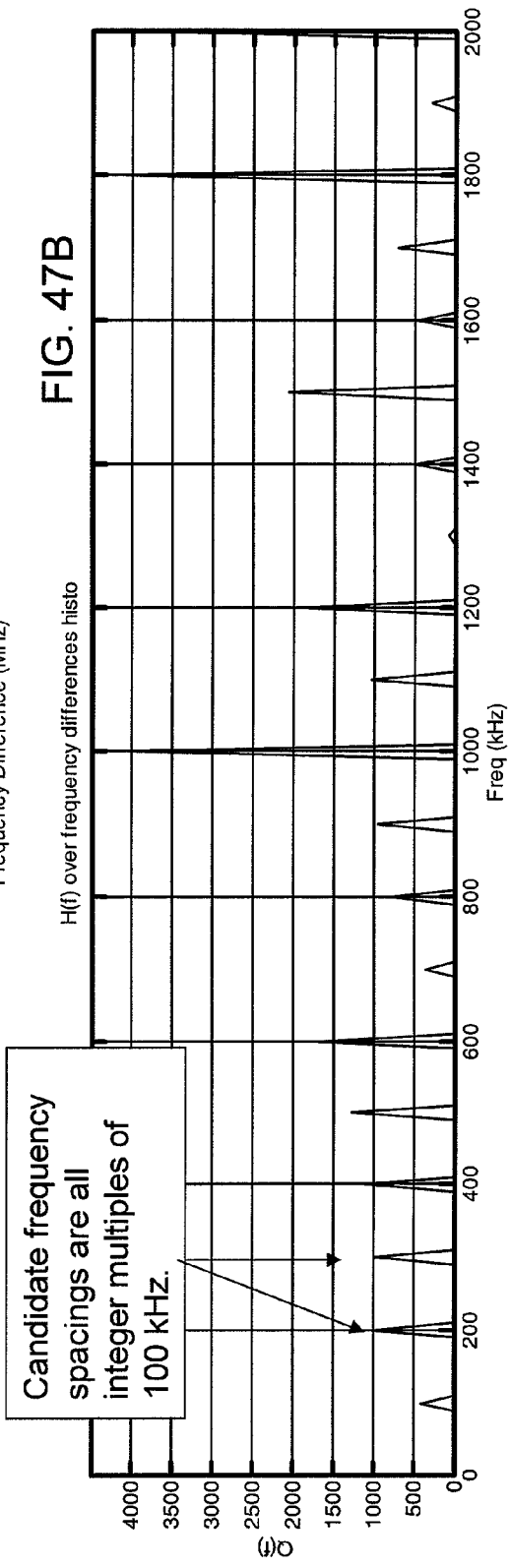

FIGS. 47A and 47B show $S(k)$ and $H(f)$, respectively, for the example described above. Observe from the chart for $H(f)$, that the candidate frequency spacings are all integer multiples of 100 kHz.

The accuracy of the carrier frequency estimate depends on the observation interval, SNR of the sensor, modulation type of the transmitting device, and frequency estimation algorithm used. For most real-world digitally modulated burst signals (e.g., BT, WiFi™, DECT), one can estimate carrier frequency to within +/−500 Hz fairly easily. In many cases, especially when a pure continuous wave carrier is transmitted for periods of time (such as with an RFID reader), it can be estimated to within +/−100 Hz or less.

Figure 48:
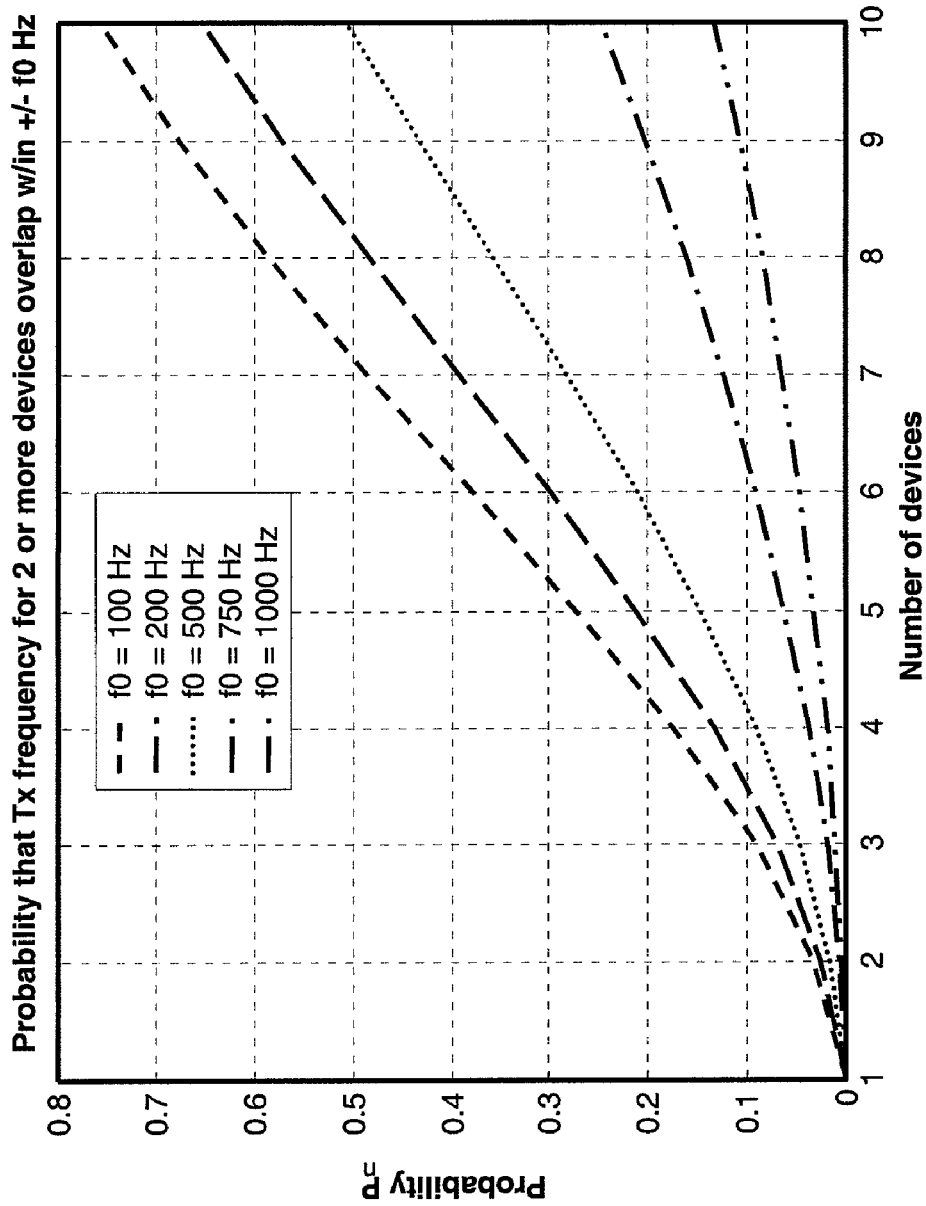
FIG. 48 illustrates a plot of probability for yet another simulation to demonstrate operation of the pulse frequency analysis algorithm.

As the number of devices increases in a frequency band and region of interest, there is a chance that two or more signals may be confused as being from the same device. FIG. 48 illustrates a probability plot for an example where there are 10 devices and +/−500 Hz frequency error. The issue depicted in this example concerns the probability that 2 or more devices out of N will have a transmit frequency modulus that falls within the same detection window such that 2 or more devices out of N will be confused for 1 based on a carrier frequency error test. In this example, it is assumed that N devices have crystals with Gaussian +/−7.5 ppm error sdev. The analysis for probability PN for various values of N and $f_0$ are given below, and a plot is shown in FIG. 48.

$$P_N = P(\text{none out of } N \text{ fall w/in } f0 \text{ Hz of one another})$$
$$= P_{N-1} \cdot P(|X_N - X_1| > f0, \ldots, |X_1 - X_{N-1}| > f0)$$
$$= P_{N-1} \cdot \int_{-\infty}^{\infty}\left[1 - \int_{x-f0}^{x+f0} f(u)du\right]^{N-1} f(x)dx,$$

where f(x) is the PDF of a zero mean Gaussian RV w/sdev 7.5·2400 Hz

This analysis and FIG. 48 indicate that chances are small for low $f_0$, but non-negligible (e.g., probability=0.25 for $f_0$=200 Hz, N=10 devices).

"Learn" Mode

Figure 49:
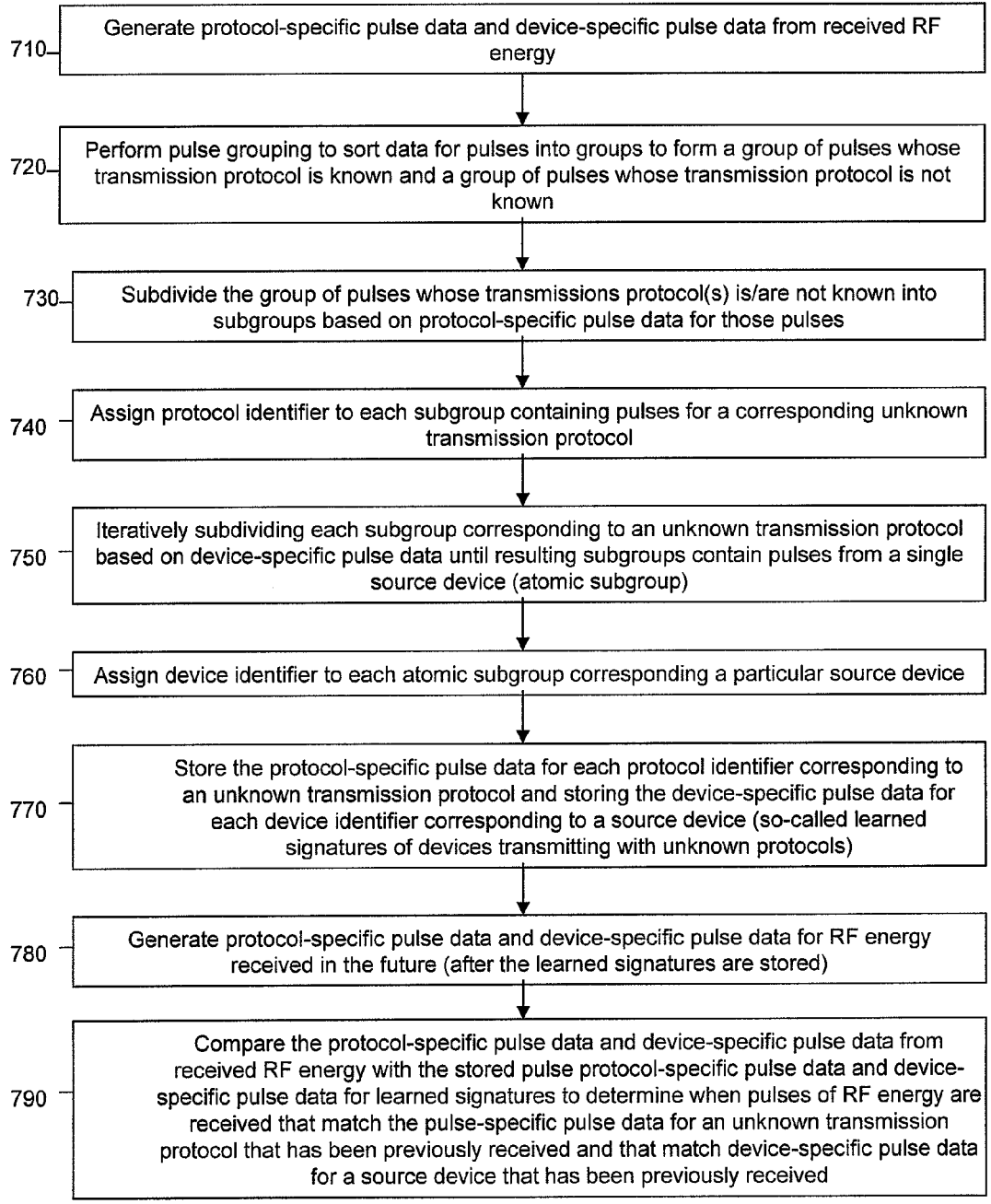
FIG. 49 is a flow chart for a process to group received pulses having an unknown transmission protocol according to an embodiment of the present invention.
Figure 50:
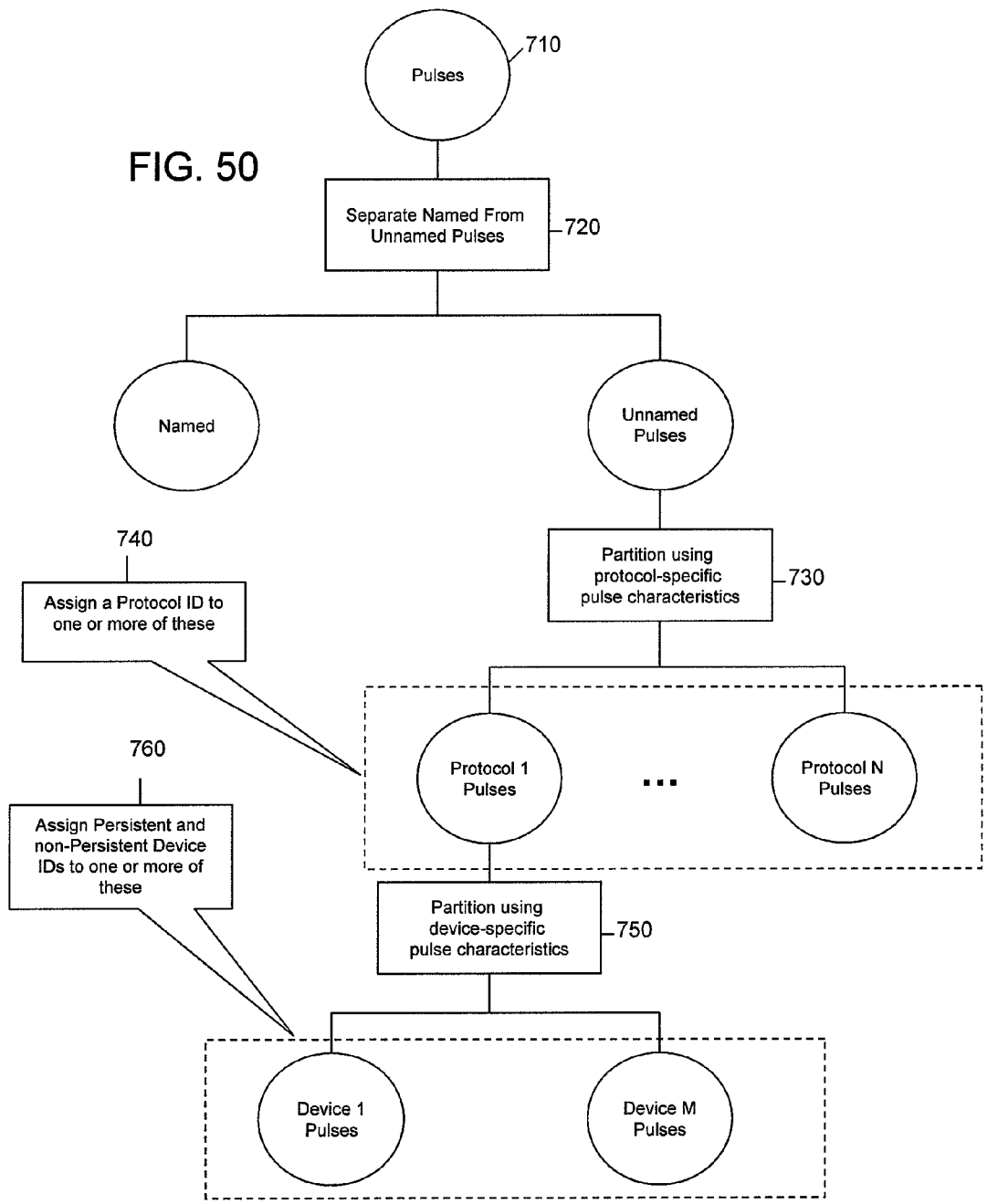
FIG. 50 is a tree-like diagram to illustrate the pulse grouping process shown in FIG. 49.

Reference is now made to FIGS. 49 and 50 for a description of a learning mode process shown at 700. This learning mode process is useful when sources of devices using an a priori unknown transmission protocol, so-called so-called unnamed devices, are present.

At 710, protocol-specific and device-specific pulse metric data is generated from received RF energy, as described in detail above. At 720, the pulses are partitioned into two groups, a first group for named pulses and a second group for unnamed pulses. The group of named pulses can be further subdivided using the pulse grouping techniques described above. The group of unnamed pulses is subdivided and analyzed as set forth in 730-790.

At 730, the group of unnamed pulses is subdivided into individual subgroups based on protocol-specific pulse data. Examples of the protocol-specific pulse data are at least one of: pulse type and protocol type, wherein the protocol type is indicated by one or more of a synchronization pattern, modulation type, data rate, frequency bandwidth, pulse duration, carrier frequency, peak-to-average power ratio and frequency deviation. Once the partitioning or subdividing reaches a point where each subgroup comprises pulses from one or more source devices using a unique transmission protocol, then at 740 a protocol identifier (ID) is assigned to each resulting subgroup that contains pulses for a corresponding unknown transmission protocol.

Next, at 750, each subgroup is further iteratively subdivided based on device-specific pulse data until the resulting subgroups contain pulses from a single source device, i.e., the subgroups are atomic subgroups. Then, at 760, a device identifier is assigned to each atomic group corresponding to a particular source device that operates using what was previously an unknown transmission protocol (but which now a protocol identifier has been assigned).

There are two types of device identifiers that may be assigned at 760. The first is referred to as a persistent device identifier. A persistent device identifier is used to identify a specific source device at any time, i.e., even after the device turns off and is no longer transmitting, but then turns on again at a later time. Examples of persistent device identifiers are a MAC address or a pseudo-MAC address (described below), modulation start/stop times, and modulation signature. This identifier is called "persistent" because it does not change between communication (turn-on) sessions of a device. By contrast, non-persistent device-specific pulse characteristics remain constant during a particular communication session in which a device is turned on, but generally not across communication (turn-on) sessions. Non-persistent device-specific pulse characteristics are used to separate pulses transmitted by a first device from pulses transmitted other device having the same protocol identifier (and both devices are transmitting generally at the same time). The non-persistent device-specific pulse characteristics can only be used, however, while the device is turned on. Examples of non-persistent device-specific pulse characteristics are pulse timing period and timing phase, pulse center/carrier frequency, and pulse power. Thus, a device identifier assigned to an atomic group may be a persistent device-identifier or a non-persistent device identifier depending on the type of device-specific pulse metric for which the atomic group is formed. A persistent device identifier is assigned to a subgroup for a single device that is formed on the basis of device-specific pulse data that is substantially the same each time the corresponding device turns on and the non-persistent device identifier is assigned to a subgroup for a single device that is formed on the basis of device-specific pulse data that changes each time the corresponding device turns on.

At 770, a storing operation is made whereby protocol-specific data for each protocol identifier corresponding to an unknown transmission protocol is stored along with device-specific pulse data for each device identifier corresponding to a source device. This stored data may be referred to as so-called learned signatures of transmission protocols and devices.

Thereafter, at 780, protocol-specific pulse data and device-specific pulse data are generated for RF energy received in the future. At 790, a comparison is made between the protocol-specific pulse data and device-specific pulse data corresponding to newly received RF energy to determine when there is a match with the learned signatures of protocols and devices. The next time pulses are detected that match what had been an unknown transmission protocol, those pulses are labeled with the corresponding protocol identifier. Similarly, the next time pulses are detected that match what had been an unknown device, those pulses are labeled with the corresponding device identifier.

When a match is made to a protocol identifier or a device identifier in the process 700, an alert may be generated containing the corresponding protocol identifier and/or device identifier. This alert may comprise an audio and/or visual indication.

According to a further aspect of the invention, there is a special type of protocol-specific pulse data and a special type of device-specific pulse data that may be generated and used with the learning process 700 for unnamed devices. Pulses that are grouped as unnamed are grouped as such because their transmission protocol is not known, thus the pattern for a synchronization word and the format for a medium access control (MAC) address or identifier are not a priori known for devices operating with unnamed protocols. However, a technique is provided to analyze patterns in the demodulated data for multiple instances of pulses from different source devices using the same unknown protocol, and from multiple instances of pulses from the same device using an unknown protocol. This special protocol-specific pulse data is referred to herein as a pseudo-synchronization pattern and the special device-specific pulse data is referred to herein as a pseudo-MAC address.

Figure 51:
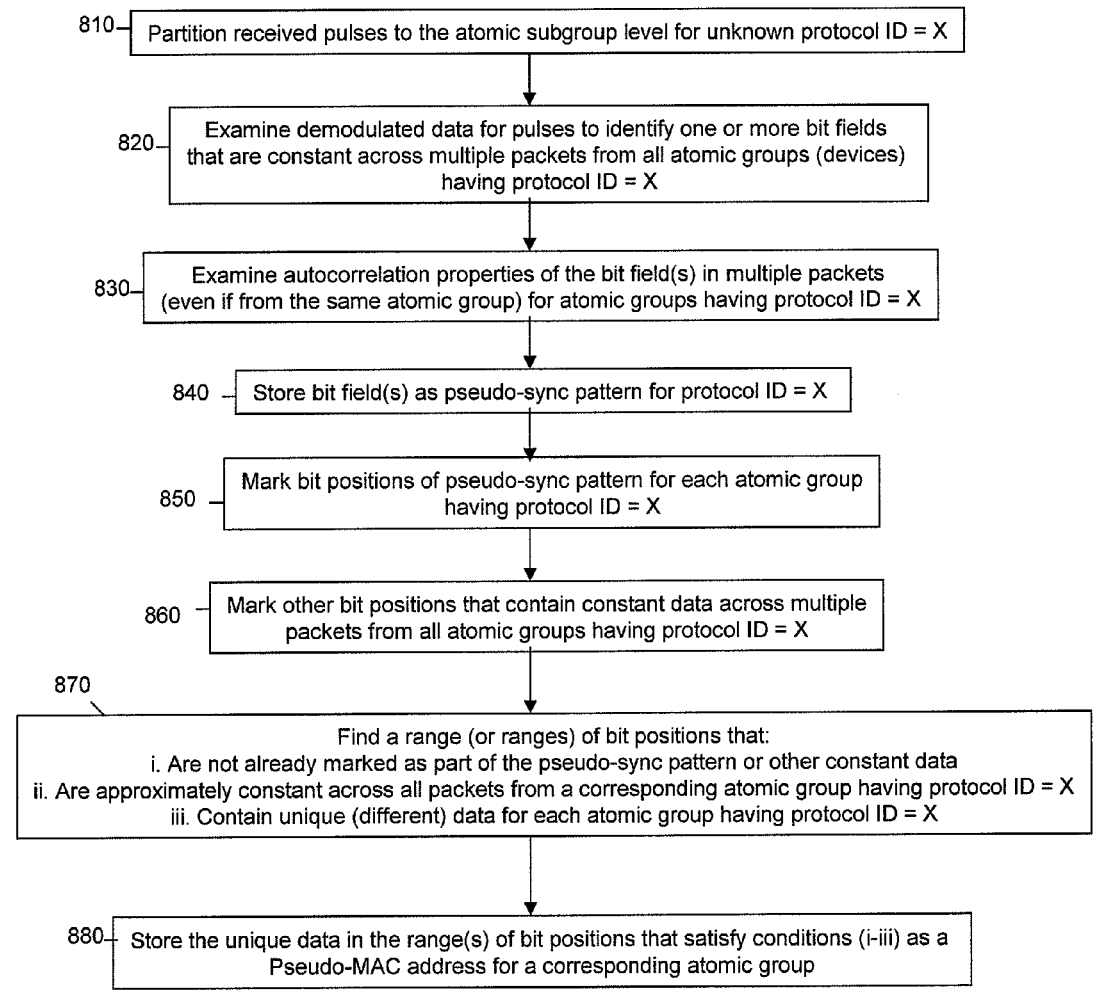
FIG. 51 is a flow chart for a process to derive a pseudo-synchronization pattern and a pseudo-MAC address for pulses having an unknown transmission protocol according to an embodiment of the present invention.

Reference is now made to FIG. 51 for a description of a process 800 that can derive a pseudo-synchronization pattern and a pseudo-MAC address. At 810, a process such as that shown in FIG. 49 is performed to partition received pulses into atomic subgroups for each unknown protocol. For the sake of explanation, one particular unknown protocol is referred to hereinafter as protocol X (protocol ID=X). At 820, the demodulated data for pulses across multiple packets from all atomic groups (those subgroups comprising pulses determined to be from a single device or source) having the same unknown protocol (e.g., protocol X). Next, at 830, the autocorrelation properties are computed and examined for the bit fields from multiple packets of a single atomic group or multiple atomic groups having protocol ID=X. If those autocorrelation properties are good, then this is a further indication that those bit field(s) is/are used a synchronization pattern for protocol X. The function at 830 may be useful to determine from multiple pulses associated with an atomic group (a single device) whether a bit field is a synchronization pattern. Thus, the function 830 is optional. At 840, the one or more bit fields that meet the condition stated at 820 (and/or 830) is/are identified as a synchronization pattern (e.g., pseudo-sync pattern) for protocol X and are stored. This pseudo-sync pattern may be stored (together with the corresponding protocol identifier) and used in the future to identify pulses of RF energy that use the corresponding protocol (protocol X). Next, 850-880 are performed in order to derive a pseudo-MAC address for each atomic group.

At 850, the bit positions for the synchronization pattern are marked as being "used" within the packet. In other words, those bit positions could not be used for a pseudo-MAC address. At 860, other bit positions that contain constant data across multiple packets from all atomic groups (using the same protocol, e.g., protocol X) are also marked as being "used"; those bit positions also could not be used for a pseudo-MAC address if they are constant across devices.

Thus, at 870, the range or ranges of bit positions that satisfy criteria (i-iii) contain the pseudo-MAC address for a corresponding device. That is, the range or ranges of bit positions that: (i) are not already marked as being part or the pseudo-sync pattern or other constant data (from 840 and 85); (ii) are approximately constant across all packets from an atomic group having the same protocol (protocol ID=X); and (iii) contain unique (different) data for each atomic group having the same protocol (protocol ID=X). That is, the pseudo-MAC address for a device is the data contained in the bit positions that are constant across all packets for a particular atomic group for a particular protocol, but which is different or unique across atomic subgroups for that same protocol. At 880, the unique data at that/those range(s) of bit positions that satisfy these conditions is stored as a pseudo-MAC address for a corresponding atomic group. This pseudo-MAC address is stored and used in the future as device-specific pulse data to identify pulses of RF energy that are from that particular device using that transmission protocol (e.g., protocol X).

In order to determine whether data at bit positions are constant across multiple packets, the bits in received packets to be compared may need to be time-shifted (advanced or delayed) slightly to remove any time shifts between received packets that may be present during burst acquisition before the bit-for-bit comparison. A bitwise AND function may be used to identify fields that stay the same across multiple received packets. This bitwise ANDing function is repeated over multiple received packets to identify those bit fields that do not change from one packet to the next. One of these fields is determined to be the pseudo-sync pattern or the pseudo-MAC address as the case may be. As describe above in conjunction with FIG. 51, a bit field is determined to be a synchronization field when it remains constant across different devices having the same protocol-specific metrics. A bit field is determined to be a pseudo-MAC address when it varies across devices in the same network or having the same protocol-specific metrics and is also generally longer than other constant bit fields. An alternative approach is to perform these same techniques on the waveform data itself, or in the symbol domain rather than the "bit" domain. For example, symbol vectors from multiple packets may be time-aligned and summed together instead of using a bit-wise comparison approach. The portions of the packet that remain constant (e.g., sync word) will have a large value in the sum.

While the foregoing description has been made with respect to various methods, it should be understood that the present invention may also be embodied in a device (sensor) that receives radio frequency energy and identifies sources of wireless signals in the RF energy. Such a device would comprise a receiver that receives RF energy, an analog-to-digital converter and a processor coupled to the analog-to-digital converter that generates pulse metric data from the digital data, the pulse metric data representing characteristics associated with pulses of RF energy, partitions the pulse metric data for individual pulses into groups based on their characteristics, and identifies sources of wireless signals contained in the RF energy based on the groups. The processor may execute instructions stored in memory (as shown in FIG. 2) to perform the various algorithms described herein. Further still, the methodologies described herein may be embodied as computer readable instructions encoded or stored on a computer readable medium such that, when executed by a processor (computer, microprocessor, microcontroller, digital signal processor, etc.) will cause the processor to perform one or more of the algorithms described herein.

The system and methods described herein may be embodied in other specific forms without departing from the spirit or essential characteristics thereof. The foregoing embodiments are therefore to be considered in all respects illustrative and not meant to be limiting.

What is claimed is:

1. A method for identifying devices that are sources of wireless signals from received radio frequency (RF) energy, comprising:
   receiving RF energy;
   generating pulse metric data from the received RF energy, the pulse metric data representing characteristics associated with pulses of received RF energy;
   partitioning the pulses into groups based on their pulse metric data, wherein partitioning comprises iteratively subdividing each group into subgroups until all resulting subgroups contain pulses determined to be from a single source, and at each iteration, said subdividing being performed based on different pulse metric data than at a prior iteration; and
   identifying the sources of the received wireless signals based on the partitioning and generating as output data that identifies a source of wireless signals for any subgroup that is determined to contain pulses from a single source.

2. The method of claim 1, wherein said generating comprises generating pulse metric data comprising one or more protocol-specific characteristics or device-specific characteristics, and wherein partitioning comprises partitioning the pulse metric data for individual pulses base on the protocol-specific and device-specific characteristics.

3. The method of claim 1, wherein generating pulse metric data comprises generating protocol-specific characteristics comprising one or more of: pulse type, protocol type indicated by one or more of a synchronization pattern, modulation type, data rate, frequency bandwidth, pulse duration, carrier frequency, center frequency, peak-to-average power ratio and frequency deviation.

4. The method of claim 1, wherein partitioning comprises partitioning the pulse metric data into groups based on pulse type to produce a plurality of pulse type specific groups each comprising pulse metric data having the same pulse type, and further subdividing each pulse type specific group into subgroups using partitioning rules that are unique to each pulse type.

5. The method of claim 4, wherein generating comprises generating pulse metric data comprising device-specific characteristics comprising one or more of: pulse timestamp or start time, pulse power, carrier frequency, pulse ramp up time, pulse ramp down time, pulse timing period and phase if the pulse is synchronous or periodic, modulation start/stop times and modulation signature.

6. The method of claim 5, wherein said further subdividing comprises subdividing each pulse type specific group into subgroups based on protocol-specific characteristics or device-specific characteristics.

7. The method of claim 4, and further comprising examining the pulse metric data for each subgroup resulting from said further subdividing to determine whether the pulses after said subdividing were received from a single wireless transmitter.

8. The method of claim 7, wherein said examining comprises applying a test to the pulse metric data for a subgroup to determine whether the pulse metric data for a subgroup comprises pulses from a single source.

9. The method of claim 8, wherein identifying comprises generating as output data that identifies a source of wireless signals for any subgroup that is determined to contain pulse metric data for a single source.

10. The method of claim 7, wherein generating comprises generating a synchronicity pulse metric that represents a measure of synchronicity of pulses derived from arrival times of the pulses in a sequence, and wherein examining comprises examining the synchronicity pulse metric to determine whether a subgroup comprises pulses from a single source.

11. The method of claim 10, wherein generating the synchronicity pulse metric comprising computing $\min_T \text{sdev}\{(t_n/T+0.5) \mod 1, n=1, \ldots, N\}$ for pulse arrival times $t_1, \ldots, t_N$.

12. The method of claim 11, and further comprising determining that pulses are synchronous with period $T_0$ and phase $t_0$ if $T_0$ minimizes the equation $f(T)=\text{sdev}\{(t_n/T+0.5) \mod 1, n=1, \ldots, N\}$ over T with a synchronicity $f(T_0)$ that falls below a pre-determined threshold, where $t_0=\text{mean}\{t_n/T_o \mod 1, n=1, \ldots, N\}$.

13. The method of claim 12, wherein generating comprises generating a periodicity pulse metric that represents a measure of periodicity of pulses derived from arrival times of the pulses.

14. The method of claim 13, wherein generating comprises generating the periodicity pulse metric for pulses with arrival $t_1, \ldots, t_N$, as $\max_{M \text{ in } \{1, 2, \ldots \text{floor}(T/tN)\}} NMT \cdot p/t_N$, where p is a probability of detecting a pulse.

15. The method of claim 14, and further comprising determining that pulses are periodic with period MT and phase $t_0$ if (a) the pulses are synchronous with period $T_0$, and (b) M maximizes $\max_{M \text{ in } \{1, 2, \ldots \text{floor}(T/tN)\}} NMT \cdot p/t_N$ with a periodicity that exceeds a pre-determined threshold, and where $t_0=\text{mean}\{t_n/(MT_0) \mod 1, n=1, \ldots, N\}$.

16. The method of claim 1, wherein identifying comprises identifying sources of wireless signals whose transmission protocol is known or unknown.

17. The method of claim 1, wherein receiving, generating and partitioning are performed by each of a plurality of different sensor devices, and wherein identifying is performed at a central computing device based on pulse metric data generated by each of the plurality of sensor devices.

18. The method of claim 17, wherein identifying comprises identifying whether pulses received at multiple sensor devices are from the same source based on similarities of the pulse metric data generated by two or more sensor devices for those pulses.

19. The method of claim 18, and further comprising said central computing device transmitting a message to each of the sensor devices to synchronize them with respect to a common clock such that said receiving generating and partitioning are performed by each of the plurality of sensor devices with respect to a common clock.

20. The method of claim 19, and further comprising said central computing device processing the pulse metric data from the plurality of sensor devices to adjust for offsets of system clocks among the plurality of sensor devices.

21. A method for identifying devices that are sources of wireless signals from received radio frequency (RF) energy, comprising:
  receiving RF energy;
  generating pulse metric data from the received RF energy, the pulse metric data representing characteristics associated with pulses of received RF energy, wherein generating comprises generating pulse metric data representing arrival times for pulses of RF energy and deriving candidate periods for the pulses;
  partitioning the pulses into groups based on their candidate periods;
  deriving phases for each of the groups of pulses that have been formed based on the candidate periods;
  further subdividing the groups into subgroups based on phase; and
  identifying the sources of the received wireless signals based on the subgroups formed by partitioning based on phase and other pulses remaining that were not grouped based on candidate period.

22. The method of claim 21, wherein identifying comprises identifying asynchronous sources from those pulses that were not included in a group formed based on candidate periods.

23. The method of claim 21, wherein identifying comprises identifying synchronous sources as corresponding to pulses contained in a group formed based on candidate periods.

24. The method of claim 21, wherein deriving candidate periods comprises computing autocorrelation values from the arrival times of the sequence of pulses and analyzing the autocorrelation values to identify the candidate periods.

25. The method of claim 24, wherein computing comprises computing a function that is a normalized product of harmonics of the autocorrelation values, and wherein said analyzing comprises analyzing results of said function for peaks where said peaks correspond to said candidate periods.

26. The method of claim 25, and further comprising storing said results of said function in a first buffer, and wherein computing further comprises removing from said results timestamp values that line up with each other after they are time shifted by candidate period Ti, and storing the timestamp values that were removed in a second buffer.

27. The method of claim 26, and further comprising computing a histogram of the timestamp values modulo Ti.

28. The method of claim 27, wherein deriving phases comprises identifying different timing phases as peaks in the histogram to form groups of pulses that appear to be received from a single source device.

29. The method of claim 28, wherein said removing, storing in said second buffer, computing the histogram and identifying phases as peaks are repeated for each candidate period.

30. The method of claim 29, wherein identifying further comprises identifying sources of wireless signals that are on the same time-synchronized wireless network by identifying pulses that have the same pulse period but their pulse phases and pulse durations are such that their transmissions do not overlap in time.

31. The method of claim 21, wherein generating comprises generating pulse metric data further comprising one or more of carrier frequency, modulation type, and power of the pulses, and wherein identifying comprises distinguishing wireless signal sources based further on one or more of carrier frequency, modulation type, and power.

32. A method for identifying devices that are sources of wireless signals from received radio frequency (RF) energy, comprising:
receiving RF energy;
generating pulse metric data from the received RF energy, the pulse metric data representing characteristics associated with pulses of received RF energy comprising carrier frequencies of pulses;
analyzing the carrier frequencies to determine a set of zero or more candidate frequency spacings to be used for identifying a hopset of a frequency hopping channelization scheme;
determining one or more channelization schemes associated with the pulses using the set of candidate frequency spacings and the carrier frequencies for the pulses, wherein a channelization scheme comprises a set of one or more transmit frequencies;
partitioning the pulses into groups based on their pulse metric data, wherein each group corresponds to a channelization scheme, and subdividing each group of pulses into subgroups based on differences between the carrier frequencies for pulses in the group and a particular one of the transmit frequencies for the corresponding channelization scheme; and
identifying a source of received wireless signals based on the one or more subgroups that result from the partitioning.

33. The method of claim 32, and further comprising determining whether a subgroup contains pulses that are from a single source for a channelization scheme.

34. The method of claim 32, wherein determining one or more channelization schemes comprises determining start frequency, stop frequency and frequency increment for a frequency hopping channelization scheme determined to be associated with the pulses.

35. The method of claim 32, and further comprising computing differences between carrier frequencies for a group of pulses and a nearest transmit frequency of the corresponding channelization scheme for that group of pulses, and wherein subdividing comprises subdividing the pulses into subgroups based on the differences.

36. The method of claim 32, and further comprising computing a histogram on the carrier frequencies for the pulses, and wherein said determining one or more channelization schemes comprises, for each candidate frequency spacing, determining whether there is a peak in the histogram at an integer multiple of the candidate frequency spacing, to thereby identify frequency hops associated with a frequency hopping channelization scheme.

37. The method of claim 32, wherein partitioning comprises assigning a pulse to a group associated with a frequency hopping channelization scheme when it is determined from the histogram that the carrier frequency of that pulse is at an integer multiple of a candidate frequency spacing.

38. The method of claim 37, wherein partitioning comprises forming zero or more groups of pulses associated with a fixed frequency channelization scheme and forming zero or more groups of pulses associated with a frequency hopping channelization scheme.

39. The method of claim 37, wherein subdividing comprises subdividing each of the groups of pulses to distinguish different sources using a fixed frequency channelization scheme and different sources using a frequency hopping channelization scheme.

40. A device that receives radio frequency (RF) energy and identifies devices that are sources of wireless signals in the RF energy, comprising:
a receiver that receives RF energy;
an analog-to-digital converter that converts received RF energy to a digital data; and
a processor coupled to the analog-to-digital converter and configured to:
generates generate pulse metric data from the digital data, the pulse metric data representing characteristics associated with pulses of RF energy;
partition the pulse metric data for individual pulses into groups based on their characteristics by iteratively subdividing each group into subgroups until all resulting subgroups contain pulse metric data for pulses determined to be from a single source, wherein at each iteration, subdividing is performed based on different pulse metric data than at a prior iteration; and
identify sources of wireless signals contained in the RF energy based on the groups and generate as output data that identifies a source of wireless signals for any subgroup that is determined to contain pulse metric data for a single source.

41. The device of claim 40, wherein the processor generates pulse metric data comprising one or more one or more protocol-specific characteristics or device-specific characteristics, and the processor partitions the pulse metric data for individual pulses base on the protocol-specific and device-specific characteristics.

42. The device of claim 40, wherein the processor is configured to partition the pulses into groups based on pulse type to produce a plurality of pulse type specific groups each comprising pulse metric data having the same pulse type, and to further subdivide each pulse type specific group into subgroups using partitioning rules that are unique to each pulse type.

43. The device of claim 42, wherein the processor is configured to generate pulse metric data comprising device-specific characteristics comprising one or more of: pulse timestamp or start time, pulse power, carrier frequency, pulse ramp up time, pulse ramp down time, pulse timing period and phase if the pulse is synchronous or periodic, modulation start/stop times and modulation signature.

44. The device of claim 42, wherein the processor is configured to examine the pulse metric data for each subgroup resulting from further subdividing to determine whether the pulses after subdividing were received from a single wireless transmitter.

45. The device of claim 42, wherein the processor is configured to generate pulse metric data comprising data representing arrival times for pulses of RF energy and deriving candidate periods for the pulses, and to partition the pulses into groups based on their candidate periods.

46. A method for identifying devices that are sources of wireless signals from received radio frequency (RF) energy, comprising:

receiving RF energy;

generating protocol-specific pulse data and device-specific pulse data from the received RF energy;

sorting data for pulses into groups to form a group of pulses whose transmission protocol is known and a group of pulses whose transmission protocol is not known;

subdividing the group of pulses whose transmission protocol is not known into subgroups based on protocol-specific pulse data for those pulses to produce one or more subgroups, each subgroup comprising data for pulses having similar protocol-specific pulse data and thus corresponding to the same unknown transmission protocol;

assigning a protocol identifier to each subgroup that comprises pulse data for pulses from one or more devices using the same unknown transmission protocol;

iteratively subdividing each subgroup corresponding to an unknown transmission protocol into further subgroups based on device-specific pulse data until resulting subgroups contain pulses determined to be from a single device;

assigning a device identifier to each resulting subgroup containing pulses from a single device;

storing the protocol-specific pulse data for each protocol identifier;

generating protocol-specific pulse data and device-specific pulse data for RF energy received after said storing; and comparing the protocol-specific pulse data with said stored pulse protocol-specific pulse data to determine when pulses of RF energy are received that match the pulse-specific pulse data for an unknown transmission protocol that has been recognized as a result of said subdividing, assigning and storing.

47. The method of claim 46, wherein generating protocol-specific pulse data comprises generating at least one of: pulse type and protocol type, wherein the protocol type is indicated by one or more of a synchronization pattern, modulation type, data rate, frequency bandwidth, pulse duration, carrier frequency, peak-to-average power ratio and frequency deviation.

48. The method of claim 46, wherein generating protocol-specific pulse data comprises analyzing demodulated data derived from received RF energy to identify at least one pattern that is constant across multiple instances of pulses of RF energy from multiple devices, and wherein storing comprises storing said at least one pattern.

49. The method of claim 46, wherein generating device-specific pulse data comprises generating one or more of: pulse timestamp or start time, pulse power, carrier frequency, pulse ramp up time, pulse ramp down time, pulse timing period and phase if the pulse is synchronous or periodic, modulation start/stop times and modulation signature.

50. The method of claim 46, wherein generating device-specific pulse data comprises analyzing demodulated data derived from received RF energy to identify at least one pattern that is constant for all pulses of RF energy that are determined to be associated with a single device but changes for pulses across multiple devices determined to have the same protocol-specific characteristics, and wherein storing comprises storing said at least one pattern and an associated device identifier assigned to the at least one pattern.

51. The method of claim 46, wherein assigning a device identifier comprises assigning one of a persistent device identifier and a non-persistent device identifier, wherein a persistent device identifier is assigned to a subgroup for a single device that is formed on the basis of device-specific pulse data that is substantially the same each time the corresponding device turns on and the non-persistent device identifier is assigned to a subgroup for a single device that is formed on the basis of device-specific pulse data that changes each time the corresponding device turns on.

52. A method for identifying devices that are sources of wireless signals from received radio frequency (RF) energy, comprising:

receiving RF energy;

generating protocol-specific pulse data and device-specific pulse data from the received RF energy;

sorting data for pulses into groups to form a group of pulses whose transmission protocol is known and a group of pulses whose transmission protocol is not known;

subdividing the group of pulses whose transmissions protocol is not known into subgroups based on protocol-specific pulse data to produce one or more subgroups, each subgroup comprising data for pulses having similar protocol-specific pulse data and thus corresponding to the same unknown transmission protocol;

assigning a protocol identifier to each subgroup that comprises pulse data for pulses from one or more devices using the same unknown transmission protocol;

iteratively subdividing each subgroup corresponding to an unknown transmission protocol into further subgroups based on device-specific pulse data until resulting subgroups contain pulses determined to be from a single device;

examining demodulated data for pulses from multiple subgroups determined to be from a single device and having the same protocol identifier to identify one or more bit fields that are constant across multiple packets from multiple subgroups having the same protocol identifier; and storing said one or more bit fields as a synchronization pattern for a corresponding transmission protocol for use as one type of protocol-specific pulse data to group pulses for subsequently received RF energy.

53. The method of claim 52, and further comprising deriving a device address for a particular device from pulses for subgroups determined to be from a single device and which subgroups have the same protocol identifier, and storing the device address for use as device-specific pulse data to group pulses for subsequently received RF energy.

54. The method of claim 53, wherein deriving comprises analyzing demodulated data from pulses for subgroups determined to be from a corresponding single device and which subgroups have the same protocol identifier to identify a device address comprising data in a range or ranges of bit positions in the demodulated data that (i) does not correspond to the synchronization pattern, (ii) are constant across all packets from a subgroup determined to be from a corresponding single device having the same protocol identifier, and (iii) is unique across subgroups determined to be from a corresponding single device having the same protocol identifier.

55. A method for identifying sources of wireless signals from received radio frequency (RF) energy, comprising:
- detecting pulses of RF energy;
- determining carrier frequencies of the pulses;
- analyzing the carrier frequencies to determine a set of zero or more candidate frequency spacings to be used for identifying a hopset of a frequency hopping channelization scheme;
- determining one or more channelization schemes associated with the pulses using the set of candidate frequency spacings and the carrier frequencies for the pulses, wherein a channelization scheme comprises a set of one or more transmit frequencies;
- partitioning pulses into groups, wherein each group corresponds to a channelization scheme;
- subdividing each group of pulses into subgroups based on differences between the carrier frequencies for pulses in the group and a particular one of the transmit frequencies for the corresponding channelization scheme; and
- identifying sources of wireless signals based on the subgroups formed by said subdividing.

56. The method of claim 55, and further comprising determining whether a subgroup contains pulses that are from a single source for a channelization scheme.

57. The method of claim 55, wherein determining one or more channelization schemes comprises determining start frequency, stop frequency and frequency increment for a frequency hopping channelization scheme determined to be associated with the pulses.

58. The method of claim 55, and further comprising computing differences between carrier frequencies for a group of pulses and a nearest transmit frequency of the corresponding channelization scheme for that group of pulses, and wherein subdividing comprises subdividing the pulses into subgroups based on the differences.

59. The method of claim 55, and further comprising computing a histogram on the carrier frequencies for the pulses, and wherein determining one or more channelization schemes comprises, for each candidate frequency spacing, determining whether there is a peak in the histogram at an integer multiple of the candidate frequency spacing, to thereby identify frequency hops associated with a frequency hopping channelization scheme.

60. The method of claim 55, wherein partitioning comprises assigning a pulse to a group associated with a frequency hopping channelization scheme when it is determined from the histogram that the carrier frequency of that pulse is at an integer multiple of a candidate frequency spacing.

61. The method of claim 60, wherein partitioning comprises forming zero or more groups of pulses associated with a fixed frequency channelization scheme and forming zero or more groups of pulses associated with a frequency hopping channelization scheme.

62. The method of claim 60, wherein subdividing comprises subdividing each of the groups of pulses to distinguish different sources using a fixed frequency channelization scheme and different sources using a frequency hopping channelization scheme.

63. A method for identifying sources of wireless signals from received radio frequency (RF) energy, comprising:
- detecting pulses of RF energy;
- determining arrival times for the pulses;
- deriving candidate periods for the pulses based on the arrival times, wherein deriving candidate periods comprises computing autocorrelation values from the arrival times of the sequence of pulses and analyzing the autocorrelation values to identify the candidate periods;
- partitioning pulses into groups on their candidate periods;
- deriving phases for each of the groups of pulses that have been formed based on candidate periods;
- partitioning the groups into subgroups based on their phases; and
- identifying sources of wireless signals based on the subgroups formed by partitioning based on phase and other pulses remaining that were not grouped based on candidate period.

64. The method of claim 63, wherein identifying comprises identifying asynchronous sources from those pulses that were not included in a group formed based on candidate periods.

65. The method of claim 63, wherein identifying comprises identifying synchronous sources as corresponding to pulses contained in a group formed based on candidate periods.

66. The method of claim 63, wherein computing comprises computing a function that is a normalized product of harmonics of the autocorrelation values, and wherein said analyzing comprises analyzing results of said function for peaks where said peaks correspond to said candidate periods.

67. The method of claim 66, and further comprising storing said results of said function in a first buffer, and wherein computing further comprises removing from said results timestamp values that line up with each other after they are time shifted by candidate period Ti, and storing the timestamp values that were removed in a second buffer.

68. The method of claim 67, and further comprising computing a histogram of the timestamp values modulo Ti.

69. The method of claim 68, wherein deriving phases comprises identifying different timing phases as peaks in the histogram to form groups of pulses that appear to be received from a single source device.

70. The method of claim 69, wherein said removing, storing in said second buffer, computing the histogram and identifying phases as peaks are repeated for each candidate period.

71. The method of claim 70, wherein identifying further comprises identifying sources of wireless signals that are communicating on the same time-synchronized wireless network by identifying pulses that have the same pulse period but their pulse phases and pulse durations are such that their transmissions do not overlap in time.

72. The method of claim 63, wherein generating comprises generating pulse metric data further comprising one or more of carrier frequency, modulation type, and power of the pulses, and wherein identifying comprises distinguishing wireless signal sources based further on one or more of carrier frequency, modulation type, and power.

* * * * *